(12) United States Patent
Kitamura et al.

(10) Patent No.: US 11,774,303 B2
(45) Date of Patent: *Oct. 3, 2023

(54) ACCELERATOR, STEERING WHEEL, SIX-AXIS SENSOR, ENGINE, BUMPER AND THE LIKE

(71) Applicant: MINEBEA MITSUMI Inc., Nagano (JP)

(72) Inventors: Atsushi Kitamura, Shizuoka (JP); Shigeyuki Adachi, Nagano (JP); Toshiaki Asakawa, Shizuoka (JP); Eiji Misaizu, Kanagawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 347 days.

This patent is subject to a terminal disclaimer.

(21) Appl. No.: 17/286,875

(22) PCT Filed: Oct. 18, 2019

(86) PCT No.: PCT/JP2019/041164
§ 371 (c)(1),
(2) Date: Apr. 20, 2021

(87) PCT Pub. No.: WO2020/085247
PCT Pub. Date: Apr. 30, 2020

(65) Prior Publication Data
US 2021/0381913 A1 Dec. 9, 2021

(30) Foreign Application Priority Data

Oct. 23, 2018 (JP) .................... 2018-199285

(51) Int. Cl.
*G01L 1/00* (2006.01)
*G01L 1/22* (2006.01)
(Continued)

(52) U.S. Cl.
CPC ........ *G01L 1/2287* (2013.01); *B60R 21/0136* (2013.01); *E05F 15/44* (2015.01); *G01B 7/16* (2013.01); *B62D 1/046* (2013.01)

(58) Field of Classification Search
CPC .... G01L 1/2287; E05F 15/44; B60R 21/0136; G01B 7/16; B62D 1/046
See application file for complete search history.

(56) References Cited

U.S. PATENT DOCUMENTS 3,867,231 A 2/1975 Casey
4,658,233 A 4/1987 Uchida et al.
(Continued)

FOREIGN PATENT DOCUMENTS

CN 1467757 1/2004
CN 1701219 11/2005
(Continued)

OTHER PUBLICATIONS

Office Action dated Jun. 7, 2022 with respect to the corresponding Japanese patent application No. 2020-553353.
(Continued)

*Primary Examiner* — Max H Noori
*Assistant Examiner* — Masoud H Noori
(74) *Attorney, Agent, or Firm* — IPUSA, PLLC

(57) ABSTRACT

An accelerator is an automobile accelerator. The accelerator includes a sensor configured to detect a force to press the accelerator. The sensor includes a flexible substrate and a resistor formed of a film containing Cr, CrN, and $Cr_2N$, on or above the substrate. The sensor is configured to detect the force to press the accelerator as a change in a resistance value of the resistor.

14 Claims, 32 Drawing Sheets

(51) Int. Cl.
  *E05F 15/44* (2015.01)
  *B60R 21/0136* (2006.01)
  *G01B 7/16* (2006.01)
  *B62D 1/04* (2006.01)

(56) References Cited

U.S. PATENT DOCUMENTS

| | | | |
|---|---|---|---|
| 4,737,757 | A | 4/1988 | Senda et al. |
| 4,758,816 | A | 7/1988 | Blessing et al. |
| 4,786,887 | A | 11/1988 | Bringmann et al. |
| 4,876,893 | A | 10/1989 | Kato et al. |
| 4,894,635 | A | 1/1990 | Yajima et al. |
| 4,937,550 | A | 6/1990 | Tawada et al. |
| 5,154,247 | A | 10/1992 | Nishimura et al. |
| 5,328,551 | A | 7/1994 | Kovacich |
| 5,349,746 | A | 9/1994 | Gruenwald et al. |
| 5,455,453 | A * | 10/1995 | Harada ............... H01L 21/4835 257/500 |
| 5,622,901 | A | 4/1997 | Fukada |
| 5,914,168 | A | 6/1999 | Wakamatsu et al. |
| 6,512,510 | B1 | 1/2003 | Maeda |
| 7,347,464 | B2 | 3/2008 | Tanabe |
| 7,649,278 | B2 | 1/2010 | Yoshida et al. |
| 8,232,026 | B2 | 7/2012 | Kumar et al. |
| 9,256,119 | B2 | 2/2016 | Nam et al. |
| 9,306,207 | B2 | 4/2016 | Woo et al. |
| 9,827,951 | B2 | 11/2017 | Toda |
| 11,087,905 | B2 | 8/2021 | Asakawa et al. |
| 11,131,590 | B2 | 9/2021 | Inamori et al. |
| 11,543,309 | B2 * | 1/2023 | Misaizu ............... G01L 1/2287 |
| 2003/0016116 | A1 | 1/2003 | Blaha |
| 2004/0056321 | A1 | 3/2004 | Parsons |
| 2004/0140868 | A1 | 7/2004 | Takeuchi et al. |
| 2005/0160837 | A1 | 7/2005 | Tellenbach et al. |
| 2005/0188769 | A1 | 9/2005 | Moelkner et al. |
| 2005/0276990 | A1 | 12/2005 | Kohara et al. |
| 2006/0162434 | A1 | 7/2006 | Saito et al. |
| 2008/0253085 | A1 | 10/2008 | Soffer |
| 2009/0178877 | A1 | 7/2009 | Keller et al. |
| 2011/0109701 | A1 | 5/2011 | Ohashi |
| 2012/0190166 | A1 | 7/2012 | Okuda |
| 2013/0082970 | A1 | 4/2013 | Frey et al. |
| 2013/0181808 | A1 | 7/2013 | Chen et al. |
| 2013/0300254 | A1 | 11/2013 | Fujii et al. |
| 2015/0188769 | A1 | 7/2015 | Gu |
| 2015/0276517 | A1 | 10/2015 | Ashida et al. |
| 2015/0296607 | A1 | 10/2015 | Yang et al. |
| 2015/0348900 | A1 | 12/2015 | Nishimura et al. |
| 2016/0114584 | A1 | 4/2016 | Abbot, Jr. et al. |
| 2016/0282205 | A1 | 9/2016 | Huo et al. |
| 2016/0334289 | A1 | 11/2016 | Kieffer et al. |
| 2016/0372606 | A1 | 12/2016 | Ito et al. |
| 2017/0123548 | A1 | 5/2017 | Shih et al. |
| 2017/0199096 | A1 | 7/2017 | Miyajima |
| 2017/0261388 | A1 | 9/2017 | Ma et al. |
| 2017/0294387 | A1 | 10/2017 | Kawabata et al. |
| 2017/0336900 | A1 | 11/2017 | Lee et al. |
| 2017/0363486 | A1 | 12/2017 | Okulov |
| 2017/0370796 | A1 | 12/2017 | Dusing et al. |
| 2018/0080842 | A1 | 3/2018 | Otsu et al. |
| 2018/0217016 | A1 | 8/2018 | Inamori et al. |
| 2018/0275001 | A1 | 9/2018 | Tokuda |
| 2020/0076016 | A1 | 3/2020 | Riemer et al. |
| 2020/0271533 | A1 | 8/2020 | Yuguchi et al. |
| 2020/0292294 | A1 | 9/2020 | Misaizu et al. |
| 2020/0333199 | A1 | 10/2020 | Asakawa et al. |
| 2021/0003378 | A1 | 1/2021 | Asakawa et al. |
| 2021/0018382 | A1 | 1/2021 | Misaizu et al. |
| 2021/0033476 | A1 | 2/2021 | Toda et al. |
| 2021/0063259 | A1 | 3/2021 | Misaizu et al. |
| 2021/0247210 | A1 | 8/2021 | Asakawa et al. |
| 2021/0270683 | A1 | 9/2021 | Kitamura et al. |

FOREIGN PATENT DOCUMENTS

| | | |
|---|---|---|
| CN | 105755438 | 7/2016 |
| CN | 106461484 | 2/2017 |
| CN | 106768524 | 5/2017 |
| CN | 111417830 | 7/2020 |
| EP | 0171467 | 2/1986 |
| EP | 0725392 | 8/1996 |
| EP | 1197737 | 4/2002 |
| EP | 1530708 | 5/2005 |
| EP | 1557653 | 7/2005 |
| EP | 3690385 | 8/2020 |
| JP | S49-042780 | 4/1974 |
| JP | S58-097607 | 6/1983 |
| JP | S58-169150 | 10/1983 |
| JP | S59-164214 | 9/1984 |
| JP | S60-058578 U | 4/1985 |
| JP | S60-104554 U | 7/1985 |
| JP | S61-176803 | 8/1986 |
| JP | S63-245962 | 10/1988 |
| JP | S63-293432 | 11/1988 |
| JP | H01-202601 | 8/1989 |
| JP | H02-117476 | 5/1990 |
| JP | H02-189981 | 7/1990 |
| JP | H03-191802 | 8/1991 |
| JP | H04-038402 | 2/1992 |
| JP | H04-095738 | 3/1992 |
| JP | H05-080070 | 3/1993 |
| JP | H05-145142 | 6/1993 |
| JP | H06-040305 | 2/1994 |
| JP | H06-176903 | 6/1994 |
| JP | H06-300649 | 10/1994 |
| JP | H07-071906 | 3/1995 |
| JP | H07-113697 | 5/1995 |
| JP | H07-306002 | 11/1995 |
| JP | H08-102163 | 4/1996 |
| JP | H08-304200 | 11/1996 |
| JP | H09-016941 | 1/1997 |
| JP | H09-197435 | 7/1997 |
| JP | H10-270201 | 10/1998 |
| JP | 2000-146511 | 5/2000 |
| JP | 2002-221453 | 8/2002 |
| JP | 2003-0035506 | 2/2003 |
| JP | 2003-097906 | 4/2003 |
| JP | 2003-324258 | 11/2003 |
| JP | 2004-072715 | 3/2004 |
| JP | 2006-118982 | 5/2006 |
| JP | 2006-170707 | 6/2006 |
| JP | 2007-076491 | 3/2007 |
| JP | 2007-163405 | 6/2007 |
| JP | 2007-173544 | 7/2007 |
| JP | 2010-070850 | 4/2010 |
| JP | 2010-071006 | 4/2010 |
| JP | 2011-240794 | 12/2011 |
| JP | 2012-151338 | 8/2012 |
| JP | 2013-117422 | 6/2013 |
| JP | 2013-217763 | 10/2013 |
| JP | 2014-035239 | 2/2014 |
| JP | 2014-074661 | 4/2014 |
| JP | 2015-031633 | 2/2015 |
| JP | 2016-017882 | 2/2016 |
| JP | 2016-074934 | 5/2016 |
| JP | 2016-136605 | 7/2016 |
| JP | 2016-159666 | 9/2016 |
| JP | 2016-225598 | 12/2016 |
| JP | 2017-067764 | 4/2017 |
| JP | 2017-101983 | 6/2017 |
| JP | 2017-129417 | 7/2017 |
| JP | 2017-191821 | 10/2017 |
| JP | 2017-191822 | 10/2017 |
| JP | 2017-210572 | 11/2017 |
| JP | 2017-210573 | 11/2017 |
| JP | 2018-058549 | 4/2018 |
| JP | 2018-132531 | 8/2018 |
| JP | 2019-066312 | 4/2019 |
| JP | 2019-066313 | 4/2019 |
| JP | 2019-066454 | 4/2019 |

(56) References Cited

FOREIGN PATENT DOCUMENTS

| WO | 2004/074800 | 9/2004 |
| WO | 2017/094368 | 6/2017 |

OTHER PUBLICATIONS

Partial supplementary European search report dated Jun. 21, 2022 with respect to the corresponding European patent application No. 19875503.5.
Extended European Search Report dated Sep. 22, 2022 with respect to the corresponding European patent application No. 19875503.5.
Office Action dated Mar. 23, 2022 with respect to the corresponding Chinese patent application No. 201980069799.0.
International Search Report for PCT/JP2019/041164 dated Jan. 21, 2020.
International Search Report for PCT/JP2019/014528 dated Jun. 25, 2019.
Shintaku, Kazuhiko, "Thin-film manufacturing by a sputtering method and its application", The 1st joint education workshop of National Institute of Technology, Akita College, [online], 2014, [retrieval date Jun. 17, 2019] Internet: URL: http://akita-nct.coop-edu.jp/assets/uploads/2014/12/6c13667c41571e8378dc2994ce1fcbd4.pdf, non-official translation, published on Dec. 9, 2014. With Partial English Translation.
International Search Report for PCT/JP2018/046854 dated Feb. 12, 2019.
Yujiro Sakurauchi, "Handbook for utilizing industrial materials", Jan. 25, 1989, pp. 114-149, 166-169, 174-175, 226-235.
Office Action dated Sep. 27, 2021 with respect to the corresponding Chinese patent application No. 201880089676.9.
Office Action dated Jan. 28, 2022 with respect to the related U.S. Appl. No. 16/955,329.
Office Action dated Jan. 25, 2022 with respect to the related Japanese patent application No. 2017-246871.
International Search Report for PCT/JP2018/035727 dated Dec. 18, 2018.
Mars J R: "New Strain Gages are Similar to Thin Film Pesistors, Permit Analysys of Multilayer Boards", Insulation, Circuits, Lake Publishing Co., Libertyville, IL, US, vol. 19, No. 11, Oct. 1, 1973 (Oct. 1, 1973), pp. 35-37, XP009047141, ISSN: 0020-4544 "the whole document".
Office Action dated May 28, 2021 with respect to the related Chinese patent application No. 201880076801.2.
Extended European Search Report dated Jun. 4, 2021 with respect to the related European patent application No. 18860610.7.
Office Action dated Dec. 7, 2021 with respect to the related Japanese patent application No. 2017-191821.
Office Action dated Jan. 6, 2022 with respect to the related Chinese patent application No. 201880076443.5.
Office Action dated Jan. 12, 2022 with respect to the related Chinese patent application No. 201880076801.2.
Extended European Search Report dated May 10, 2021 (EP Patent Application No. 18860865.7).
American Technical Publishers Ltd.: "ASM Ready Reference: Thermal Properties of Metals", Apr. 27, 2021 (Apr. 27, 2021), pp. 1-9, XP055799057, Retrieved from the Internet: URL:https://www.owlnet.rice.edu/~msci301/ThermalExpansion.pdf [retrieved on Apr. 27, 2021].
International Search Report for PCT/JP2018/035713 dated Dec. 11, 2018.
Office Action dated Oct. 8, 2020 (U.S. Appl. No. 16/758,506).
Extended European Search Report dated Jun. 17, 2021 with respect to the related European Patent Application No. 18863695.5.
Office Action dated Jun. 1, 2021 with respect to the related Chinese Patent Application No. 201880084755.0.
Office Action dated Dec. 7, 2021 with respect to the related Japanese patent application No. 2017-210571.
Office Action dated Dec. 27, 2021 with respect to the related U.S. Appl. No. 16/650,553.
Office Action dated Apr. 12, 2022 with respect to the related Japanese patent application No. 2018-052421.
Office Action dated Apr. 12, 2022 with respect to the related Japanese patent application No. 2018-052422.
Office Action dated May 3, 2022 with respect to the related U.S. Appl. No. 16/650,963.
Office Action dated Apr. 29, 2022 with respect to the related Chinese patent application No. 201880089676.9 (With Partial Translation).
Office Action dated May 5, 2022 with respect to the related Chinese patent application No. 201980022374.4 (With Partial Translation).
International Search Report for PCT/JP2018/035939 dated Dec. 18, 2018.
International Search Report for PCT/JP2018/040357 dated Jan. 15, 2019.
Office Action dated Dec. 7, 2021 with respect to the corresponding Japanese patent application No. 2020-098850.
Office Action dated Jan. 6, 2022 with respect to the corresponding Chinese patent application No. 201880076750.3.
Office Action dated Jan. 13, 2022 with respect to the related Chinese patent application No. 201880084755.0.
Extended European Search Report dated May 10, 2021 (EP Patent Application No. 18862478.7).
International Search Report for PCT/JP2018/035706 dated Dec. 11, 2018.
Japanese Office Action for 2017-191820 dated Mar. 17, 2020.
Office Action dated Jun. 6, 2022 with respect to the related U.S. Appl. No. 16/650,553.
Office Action dated Sep. 6, 2022 with respect to the related Japanese patent application No. 2017-191821.
Office Action dated Sep. 6, 2022 with respect to the related Japanese patent application No. 2017-210571.
Office Action dated Sep. 6, 2022 with respect to the related Japanese patent application No. 2020-098850.
Shigeru Ikeda et al., Osaka National Research Institute, AIST, "Improvement of Oxidation Resistivity of Carbon Material by Borosilicate Glass Impregnation", TANSO, 1994, No. 162, p. 84-91, Jun. 28, 2010.
Iwanami Shoten, Publishers., "Dictionary of Chemistry", 4th Edition, 7th Printing, p. 364, Jul. 20, 1992 (With Partial Translation).
Office Action dated Oct. 11, 2022 with respect to the related Japanese patent application No. 2017-246871.
Office Action dated Oct. 18, 2022 with respect to the related Japanese patent application No. 2018-052421.
Office Action dated Oct. 18, 2022 with respect to the related Japanese patent application No. 2018-052422.
Office Action dated Nov. 8, 2022 with respect to the related Japanese patent application No. 2018-073438.
Japan Metal Society,"Metal Data Book", 4th Edition, 4th Printing, pp. 132, Jul. 10, 2008 (With Partial Translation).
Office Action dated Jun. 6, 2022 with respect to the related U.S. Appl. No. 17/043,898.
Office Action dated Jan. 9, 2023 with respect to the related U.S. Appl. No. 17/929,830.
Office Action dated May 9, 2023 with respect to the related Japanese patent application No. 2018-073438.
Office Action dated Feb. 4, 2023 with respect to the corresponding Chinese patent application No. 201980022374.4.
Office Action dated Feb. 7, 2023 with respect to the corresponding Japanese patent application No. 2017-210571.
Office Action dated Mar. 7, 2023 with respect to the corresponding Japanese patent application No. 2018-052422.
C. Rebholz et al., "Structure, mechanical and tribological properties of nitrogen-containing chromium coatings prepared by reactive magnetron sputtering", Surface and Coatings Technology, vol. 115, Issues 2-3, pp. 222-229, Jul. 18, 1999.
Kyoritsu Shuppan Co., Ltd., "Dictionary of Crystal Growth", 1st Edition, 1st Printing, p. 50-51, Jul. 25, 2001 (With Partial Translation).
Haruhiro Kobayashi, Nikkan Kogyo Shimbun, Ltd., "Sputter thin film—Fundamentals and Applications", 1st Edition, 1st Printing,p. 102-107,Feb. 25, 1993 (With Partial Translation).

(56) References Cited

OTHER PUBLICATIONS

Office Action dated Nov. 15, 2022 with respect to the corresponding Japanese patent application No. 2020-553353.

* cited by examiner

ACCELERATOR, STEERING WHEEL, SIX-AXIS SENSOR, ENGINE, BUMPER AND THE LIKE

TECHNICAL FIELD

The present invention relates to an automobile accelerator with a sensor, a steering wheel, a six-axis sensor, an engine, a bumper, an airbag, a wiper, and a wiper device. The present invention relates to an airbag control system, a spoiler, a variable spoiler, a display, a door, and a system for opening and closing a door.

BACKGROUND ART

Strain gauges are known to be attached to measured objects to detect strain on the measured objects. Such a strain gauge includes a resistor that detects strain, and as resistor material, for example, material containing Cr (chromium) or Ni (nickel) is used. The resistor is formed on a substrate made of, for example, an insulating resin (see, for example, Patent document 1).

CITATION LIST

Patent Document

[Patent document 1] Japanese Unexamined Patent Application Publication No. 2016-74934

SUMMARY

However, when the strain gauge is used for a given measured object having great stiffness, the stain gauge is required to be highly sensitive. However, conventional strain gauges are less sensitive, and if a conventional strain gauge is used as a sensor, use of the sensor may be difficult for the measured object with the great stiffness.

In view of the point described above, an object of the present invention is to provide an accelerator and the like having a highly sensitive sensor.

An accelerator is an automobile accelerator. The accelerator includes a sensor configured to detect a force to press the accelerator. The sensor includes a flexible substrate and a resistor formed of a film containing Cr, CrN, and $Cr_2N$, on or above the substrate. The sensor is configured to detect the force to press the accelerator as a change in a resistance value of the resistor.

Effects of the Invention

According to the disclosed technique, an accelerator and the like having a highly sensitive sensor can be provided.

DESCRIPTION OF EMBODIMENTS

One or more embodiments will be hereinafter described with reference to the drawings. In each figure, the same numerals denote the same components, and duplicative description may be omitted.

First Embodiment

Figure 1:
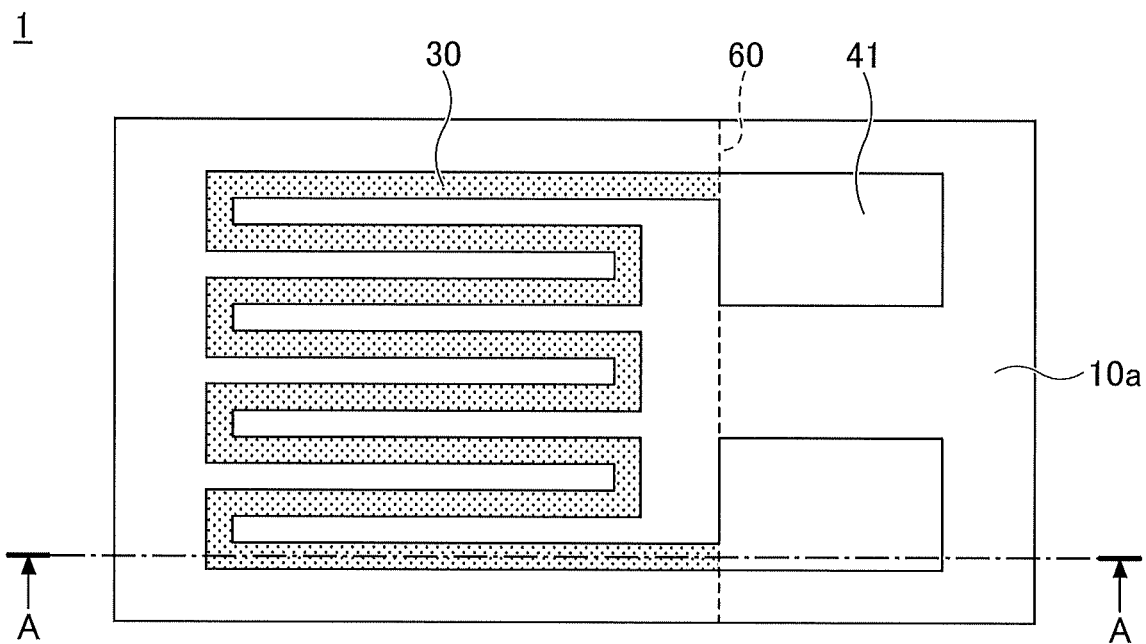
FIG. 1 is a plan view of an example of a strain gauge according to a first embodiment.
Figure 2:
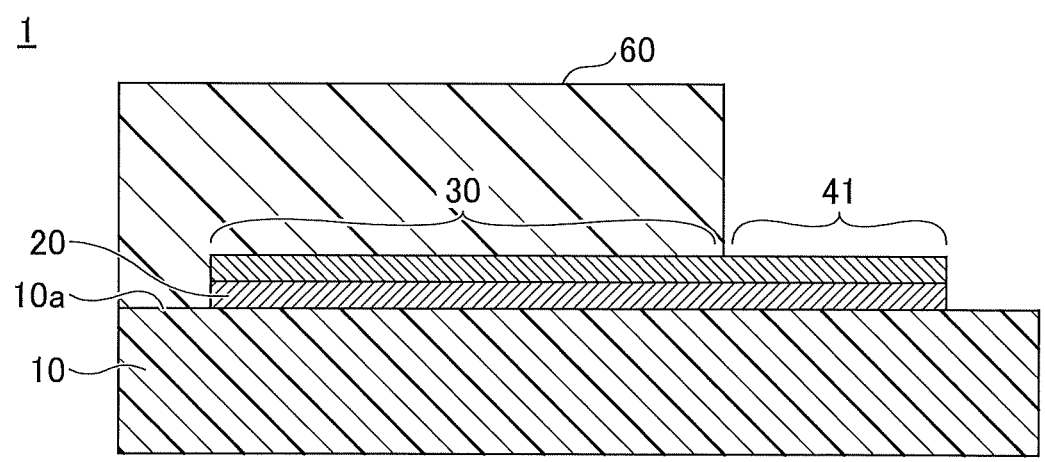
FIG. 2 is a cross-sectional view of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates a cross section taken along the A-A line in FIG. 1. With reference to FIGS. 1 and 2, the strain gauge 1 includes a substrate 10, a functional layer 20, a resistor 30, terminal sections 41, and a cover layer 60. Note that in FIG. 1, an outer edge of the cover layer 60 is only expressed by a dashed line in order to indicate the resistor 30, for the sake of convenience.

Note that in the present embodiment, for the sake of convenience, with respect to the strain gauge 1, the side of the substrate 10 where the resistor 30 is provided is referred to as an upper side or one side; and the side of the substrate 10 where the resistor 30 is not provided is referred to as a lower side or another side. Further, for each component, the surface on the side where the resistor 30 is provided is referred to as one surface or an upper surface; and the surface on the side where the resistor 30 is not provided is referred to as another surface or a lower surface. However, the strain gauge 1 can be used in a state of being upside down, or be disposed at any angle. Further, a plan view means that an object is viewed from the direction normal to an upper surface 10a of the substrate 10, and a planar shape refers to a shape of an object when viewed from the direction normal to the upper surface 10a of the substrate 10.

The substrate 10 is a member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of strain transfer from a flexure element surface that is bonded to a lower surface of the substrate 10 via an adhesive layer or the like; and dimensional stability with respect to environment, and when the thickness is 10 μm or more, it is further preferable in terms of insulation.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

Except for resin, examples of the material of the substrate 10 include $SiO_2$, $ZrO_2$ (including YSZ), Si, $Si_2N_3$, $Al_2O_3$ (including a sapphire), ZnO, perovskite ceramic ($CaTiO_3$ or $BaTiO_3$), and the like. As the material of the substrate 10, metal such as aluminum, an aluminum alloy (duralumin), or titanium, may be also used. In this case, for example, an insulating film is formed on a metallic substrate 10.

The functional layer 20 is formed, as a lower layer of the resistor 30, on the upper surface 10a of the substrate 10. In other words, a planar shape of the functional layer 20 is approximately the same as the planar shape of the resistor 30 illustrated in FIG. 1. The thickness of the functional layer 20 can be approximately between 1 nm and 100 nm, for example.

In the present application, the functional layer refers to a layer that has a function of promoting crystal growth of the resistor 30 that is at least an upper layer. The functional layer 20 preferably further has a function of preventing oxidation of the resistor 30 caused by oxygen and moisture included in the substrate 10, as well as a function of improving adhesion between the substrate 10 and the resistor 30. The functional layer 20 may further have other functions.

The insulating resin film that constitutes the substrate 10 contains oxygen and moisture. In this regard, particularly when the resistor 30 includes Cr (chromium), it is effective for the functional layer 20 to have a function of preventing oxidation of the resistor 30, because Cr forms an autoxidized film.

The material of the functional layer 20 is not particularly restricted as long as it is material having a function of promoting crystal growth of the resistor 30 that is at least an upper layer. Such material can be appropriately selected for any purpose, and includes one or more types of metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The resistor 30 is a thin film formed in a predetermined pattern and above the upper surface of the functional layer 20, and is a sensitive section where resistance varies according to strain. Note that in FIG. 1, for the sake of convenience, the resistor 30 is illustrated in a crepe pattern.

The resistor 30 can be formed of, for example, material including Cr (chromium), material including Ni (nickel), or material including both of Cr and Ni. In other words, the resistor 30 can be formed of material including at least one among Cr and Ni. An example of the material including Cr includes a Cr composite film. An example of the material including nickel includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide. A portion of the material that constitutes the functional layer 20 may also be diffused into the Cr composite film. In this case, the material that constitutes the functional layer 20, and nitrogen may form a compound. For example, when the functional layer 20 is formed of Ti, the Cr composite film may include Ti or TiN (titanium nitride).

The thickness of the resistor 30 is not particularly restricted, and can be appropriately selected for any purpose. The thickness can be, for example, approximately between 0.05 μm and 2 μm. In particular, when the thickness of the resistor 30 is 0.1 μm or more, it is preferable in terms of improvement in crystallinity (e.g., crystallinity of α-Cr) of a crystal that constitutes the resistor 30, and when the thickness of the resistor 30 is 1 μm or less, it is further preferable in terms of reduction in cracks of a given film caused by internal stress of the film that constitutes the resistor 30, or reduction in warp in the substrate 10.

With the resistor 30 being formed on the functional layer 20, the resistor 30 can be formed by a stable crystalline phase and thus stability of gauge characteristics (a gauge factor, a gauge factor temperature coefficient TCS, and a temperature coefficient of resistance TCR) can be improved.

For example, when the resistor 30 is the Cr composite film, in a case of providing the functional layer 20, the resistor 30 can be formed with α-Cr (alpha-chromium) as the main component. Because α-Cr has a stable crystalline phase, the stability of the gauge characteristics can be improved.

Here, a main component means that a target substance has 50% by weight or more of total substances that constitute the resistor. When the resistor 30 is the Cr composite film, the resistor 30 preferably includes α-Cr of 80% by weight or more, from the viewpoint of improving the gauge characteristics. Note that α-Cr is Cr having a bcc structure (body-centered cubic structure).

Also, by diffusing a metal (e.g., Ti) that constitutes the functional layer 20 into the Cr composite film, the gauge characteristics can be improved. Specifically, the gauge factor of the strain gauge 1 can be 10 or more, as well as the gauge factor temperature coefficient TCS and temperature coefficient of resistance TCR being able to be each in the range of from −1000 ppm/t to +1000 ppm/° C.

Note that the expansion coefficient of the substrate 10 is preferably between 7 ppm/K and 20 ppm/K, from the viewpoint of reducing warp in the substrate 10, where the internal stress of the resistor 30 is assumed to be close to zero. The expansion coefficient of the substrate 10 can be adjusted by, for example, selecting the material of the substrate 10, selecting the material of the filler contained in the substrate 10, adjusting the content, and the like.

When the resistor 30 is formed above the substrate 10, pinholes may be generated in the resistor 30. If the number of pinholes generated in the resistor 30 exceeds a predetermined value, the gauge characteristics might deteriorate, or the resistor might not serve as a strain gauge. The inventors have recognized that one cause of the pinhole generated in the resistor 30 relates to filler protruding from the upper surface 10a of the substrate 10.

In other words, when the substrate 10 includes a filler, a portion of the filler protrudes from the upper surface 10a of the substrate 10, so that surface unevenness on the upper surface 10a of the substrate 10 increases. As a result, the number of pinholes generated in the resistor 30 formed above the upper surface 10a of the substrate 10 increases, which results in deterioration of the gauge characteristics, and the like.

The inventors have found that, when the thickness of the resistor 30 is 0.05 μm or more, in a case where the surface unevenness on the upper surface 10a of the substrate 10 is 15 nm or less, the number of pinholes generated in the resistor 30 can be suppressed to maintain the gauge characteristics.

In other words, when the thickness of the resistor 30 is 0.05 μm or more, the surface unevenness on the upper surface 10a of the substrate 10 is preferably 15 nm or less, from the viewpoint of reducing the number of pinholes generated in the resistor 30 that is formed above the upper surface 10a of the substrate 10 to maintain the gauge characteristics. When the surface unevenness is 15 nm or less, even in a case where the substrate 10 includes fillers, the gauge characteristics do not deteriorate. Note that the surface unevenness on the upper surface 10a of the substrate 10 may be 0 nm.

The surface unevenness on the upper surface 10a of the substrate 10 can be reduced by, for example, heating the substrate 10. Alternatively, instead of heating of the substrate 10, a method of scraping a protrusion by approximately vertically irradiating the upper surface 10a of the substrate 10 with laser light, a method of cutting a protrusion by moving a water cutter or the like to be parallel to the upper surface 10a of the substrate 10, a method of polishing the upper surface 10a of the substrate 10 with a grinding wheel, a method of pressing the substrate 10 while heating (heat press), or the like, may be used.

Note that the surface unevenness means arithmetical mean roughness, and is generally expressed by Ra. The surface unevenness can be measured by, for example, three-dimensional optical interferometry.

The terminal sections 41 respectively extend from both end portions of the resistor 30 and are each wider than the resistor 30 to be in an approximately rectangular shape, in a plan view. The terminal sections 41 are a pair of electrodes from which a change in a resistance value of the resistor 30 according to strain is output externally, where, for example, a lead wire for an external connection, or the like is joined. For example, the resistor 30 extends from one of the terminal sections 41, with zigzagged hairpin turns, to be connected to another terminal section 41. The upper surface of each terminal section 41 may be coated with a metal allowing for greater solderability than the terminal section 41. Note that for the sake of convenience, the resistor 30 and the terminal sections 41 are expressed by different numerals. However, the resistor and the terminal sections can be integrally formed of the same material, in the same process.

The cover layer 60 is an insulating resin layer, which is disposed on and above the upper surface 10a of the substrate 10, such that the resistor 30 is coated and the terminal sections 41 are exposed. With the cover layer 60 being provided, mechanical damage, and the like can be prevented from occurring in the resistor 30. Additionally, with the cover layer 60 being provided, the resistor 30 can be protected against moisture, and the like. Note that the cover layer 60 may be provided to cover all portions except for the terminal sections 41.

The cover layer 60 can be formed of an insulating resin such as a PI resin, an epoxy resin, a PEEK resin, a PEN resin, a PET resin, or a PPS resin, a composite resin (e.g., a silicone resin or a polyolefin resin). The cover layer 60 may contain fillers or pigments. The thickness of the cover layer 60 is not particularly restricted, and can be appropriately selected for any purpose. For example, the thickness may be approximately between 2 μm and 30 μm.

Figure 3A:
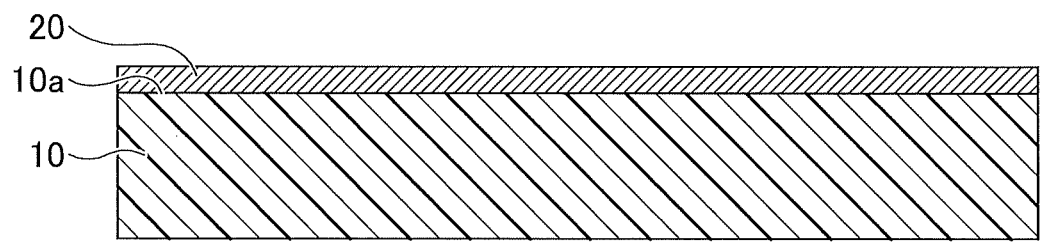
FIG. 3A is a diagram (first part) illustrating an example of the process of manufacturing the strain gauge according to the first embodiment.
Figure 3B:
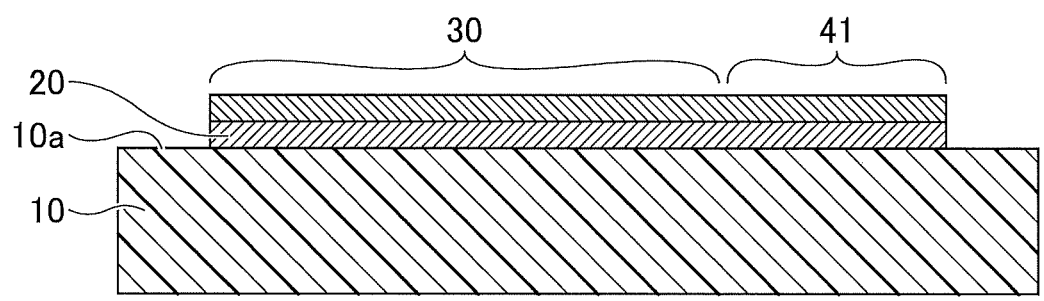
FIG. 3B is a diagram (second part) illustrating an example of the process of manufacturing the strain gauge according to the first embodiment.
Figure 3C:
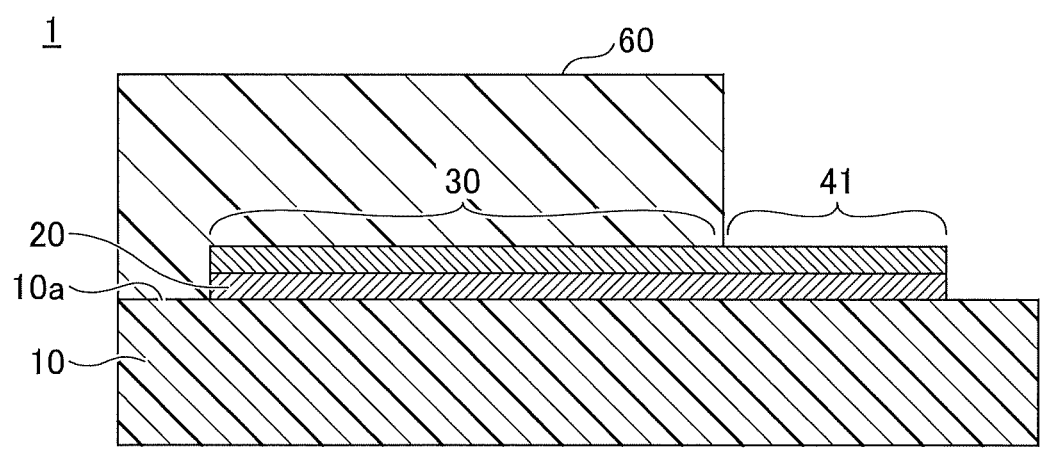
FIG. 3C is a diagram (third part) illustrating an example of the process of manufacturing the strain gauge according to the first embodiment.

FIGS. 3A to 3C are diagrams illustrating the process of manufacturing the strain gauge according to the first embodiment, and each illustrate a cross section corresponding to FIG. 2. In order to manufacture the strain gauge 1, first, in the process illustrated in FIG. 3A, the substrate 10 is prepared and the functional layer 20 is formed on the upper surface 10a of the substrate 10. The material and thickness for each of the substrate 10 and the functional layer 20 are the same as the material and thickness described above.

The functional layer 20 can be vacuum-deposited by, for example, conventional sputtering in which a raw material capable of forming the functional layer 20 is the target and in which an Ar (argon) gas is supplied to a chamber. By using conventional sputtering, the functional layer 20 is deposited while the upper surface 10a of the substrate 10 is etched with Ar. Thus, a deposited amount of film of the functional layer 20 is minimized and thus an effect of improving adhesion can be obtained.

However, this is an example of a method of depositing the functional layer 20, and the functional layer 20 may be formed by other methods. For example, before depositing the functional layer 20, the upper surface 10a of the substrate 10 is activated by plasma treatment or the like using Ar, etc. to thereby obtain the effect of improving the adhesion, and subsequently, the functional layer 20 may be vacuum-deposited by magnetron sputtering.

Next, in the process illustrated in FIG. 3B, the resistor 30 and the terminal sections 41 are formed on the entire upper surface of the functional layer 20, and then the functional layer 20, the resistor 30, and the terminal sections 41 are each patterned in the planar shape as illustrated in FIG. 1, by photolithography. The material and thickness for each of the resistor 30 and the terminal sections 41 are the same as the material and thickness described above. The resistor 30 and the terminal sections 41 can be integrally formed of the same material. The resistor 30 and the terminal sections 41 can be deposited by, for example, magnetron sputtering in which a raw material capable of forming the resistor 30 and the terminal sections 41 is a target. Instead of the magnetron sputtering, the resistor 30 and the terminal sections 41 may be deposited by reactive sputtering, vapor deposition, arc ion plating, pulsed laser deposition, or the like.

A combination of the material of the functional layer 20 and the material of the resistor 30 and the terminal sections 41 is not particularly restricted, and can be appropriately selected for any purpose. For example, Ti is used for the functional layer 20, and a Cr composite film formed with α-Cr (alpha-chromium) as the main component can be deposited as the resistor 30 and the terminal sections 41.

In this case, each of the resistor 30 and the terminal sections 41 can be deposited by, for example, magnetron sputtering in which a raw material capable of forming the Cr composite film is the target and in which an Ar gas is supplied to a chamber. Alternatively, the resistor 30 and the terminal sections 41 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer 20 formed of Ti, and a Cr composite film formed with α-Cr as the main component having a stable crystalline structure can be deposited. Also, Ti that constitutes the functional layer 20 is diffused into the Cr composite film, so that the gauge characteristics are improved. For example, the gauge factor of the strain gauge 1 can be 10 or more, as well as the gauge factor temperature coefficient TCS and temperature coefficient of resistance TCR can be each in the range of from −1000 ppm/° c. to +1000 ppm/° c.

Note that when the resistor 30 is a Cr composite film, the functional layer 20 formed of Ti includes all functions of a function of promoting crystal growth of the resistor 30, a function of preventing oxidation of the resistor 30 caused by oxygen or moisture contained in the substrate 10, and a function of improving adhesion between the substrate 10 and the resistor 30. Instead of Ti, when the functional layer 20 is formed of Ta, Si, Al, or Fe, the functional layer also includes the same functions.

Next, in the process illustrated in FIG. 3C, the cover layer 60 is formed on and above the upper surface 10a of the substrate 10, such that the resistor 30 is coated and the terminal sections 41 are exposed. The material and thickness of the cover layer 60 are the same as the material and thickness described above. For example, the cover layer 60 can be fabricated, such that a thermosetting insulating resin film in a semi-cured state is laminated on the upper surface 10a of the substrate 10, and such that the resistor 30 is coated and the terminal sections 41 are exposed; subsequently, heat is added and curing is performed. The cover layer 60 may be formed, such that a thermosetting insulating resin that is liquid or paste-like is applied to the upper surface 10a of the substrate 10, and such that the resistor 30 is coated and the terminal sections 41 are exposed; subsequently, heat is added and curing is performed. In the above process, the strain gauge 1 is completed.

As described above, with the functional layer 20 being provided in the lower layer of the resistor 30, the crystal growth of the resistor 30 can be promoted and thus the resistor 30 having a stable crystalline phase can be fabricated. As a result, with respect to the strain gauge 1, the stability of the gauge characteristics can be improved. Also, the material that constitutes the functional layer 20 is diffused into the resistor 30, so that the gauge characteristics of the strain gauge 1 can be thereby improved.

First Modification of the First Embodiment

First modification of the first embodiment provides an example of a strain gauge in which an insulating layer is provided in a lower layer of the cover layer. Note that in the first modification of the first embodiment, the description for the same components as the embodiment that has been described may be omitted.

Figure 4:
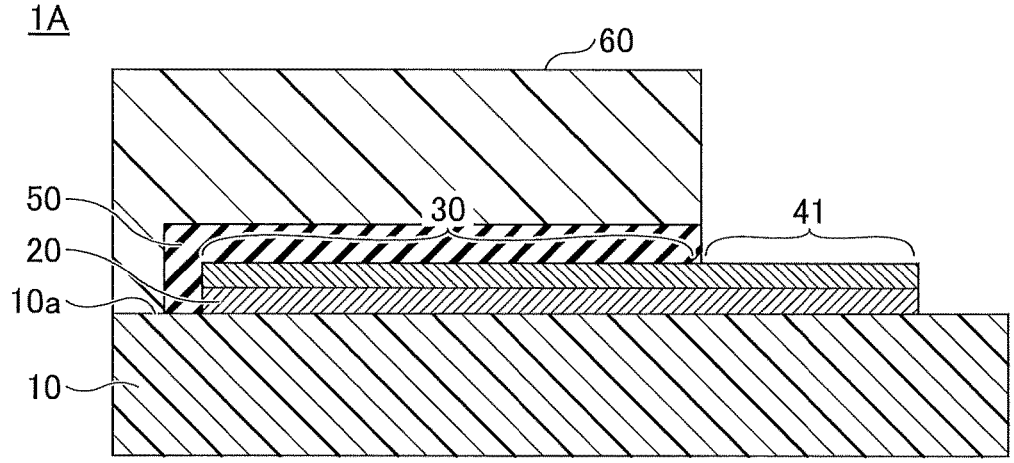
FIG. 4 is a cross-sectional view of an example of a strain gauge according to first modification of the first embodiment.

FIG. 4 is a cross-sectional view illustrating an example of the strain gauge according to the first modification of the first embodiment, and illustrates a cross section corresponding to FIG. 2. With reference to FIG. 4, the strain gauge 1A differs from the strain gauge 1 (see FIGS. 1 and 2, etc.) in that an insulating layer 50 is provided in the lower layer of the cover layer 60. Note that the cover layer 60 may be provided to cover all portions except for the terminal sections 41.

The insulating layer 50 is provided on and above the upper surface 10a of the substrate 10, such that the resistor 30 is coated and the terminal sections 41 are exposed. For example, the cover layer 60 can be provided to cover a portion of a side surface of the insulating layer 50, and an upper surface thereof.

The material of the insulating layer 50 is not particularly restricted as long as the material has higher resistance than the resistor 30 and the cover layer 60. The material can be appropriately selected for any purpose. For example, an oxide or a nitride, such as Si, W, Ti, or Ta, can be used. The thickness of the insulating layer 50 is not particularly restricted, and can be appropriately selected for any purpose. For example, the thickness can be approximately between 0.05 μm and 1 μm.

The method of forming the insulating layer 50 is not particularly restricted, and can be appropriately selected for any purpose. For example, a vacuum process such as sputtering or chemical vapor deposition (CVD), or, a solution process such as spin coating or a sol-gel process can be used.

In such a manner, with the insulating layer 50 being provided in the lower layer of the cover layer 60, insulation and environmental sealing can be improved in comparison to the case where the cover layer 60 alone is used. In such a manner, the insulating layer 50 can be appropriately provided according to a specification required for the insulation and environmental sealing.

Second Embodiment

The second embodiment provides an example of a strain gauge in which each electrode has a laminated structure. Note that in the second embodiment, the description for the same components as the embodiment that has been described may be omitted.

Figure 5:
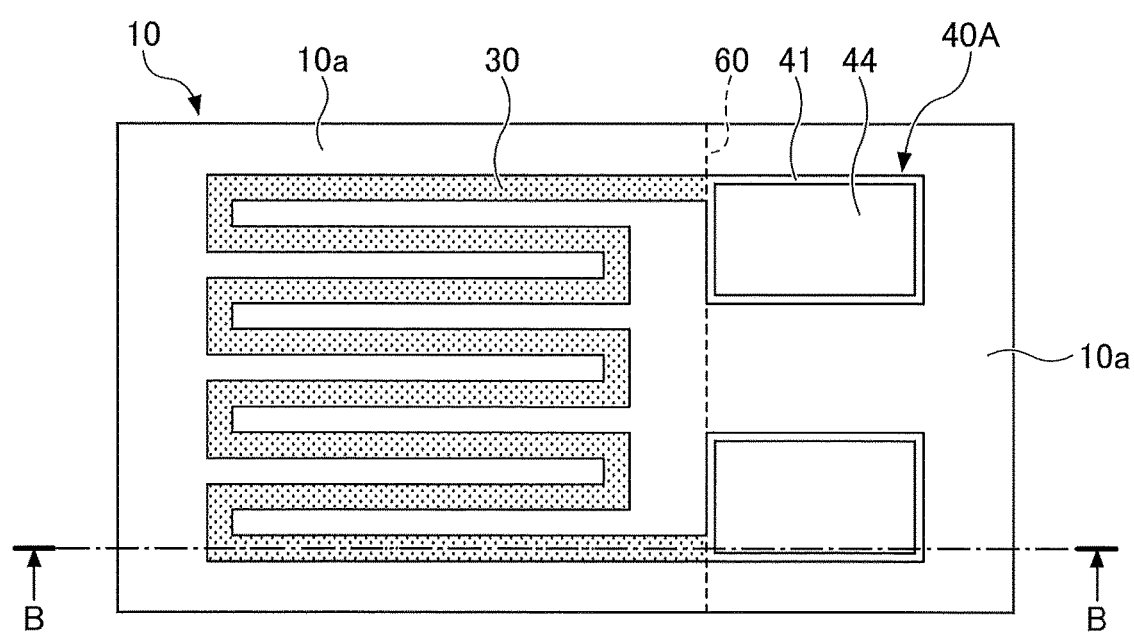
FIG. 5 is a plan view of an example of a strain gauge according to a second embodiment.
Figure 6:
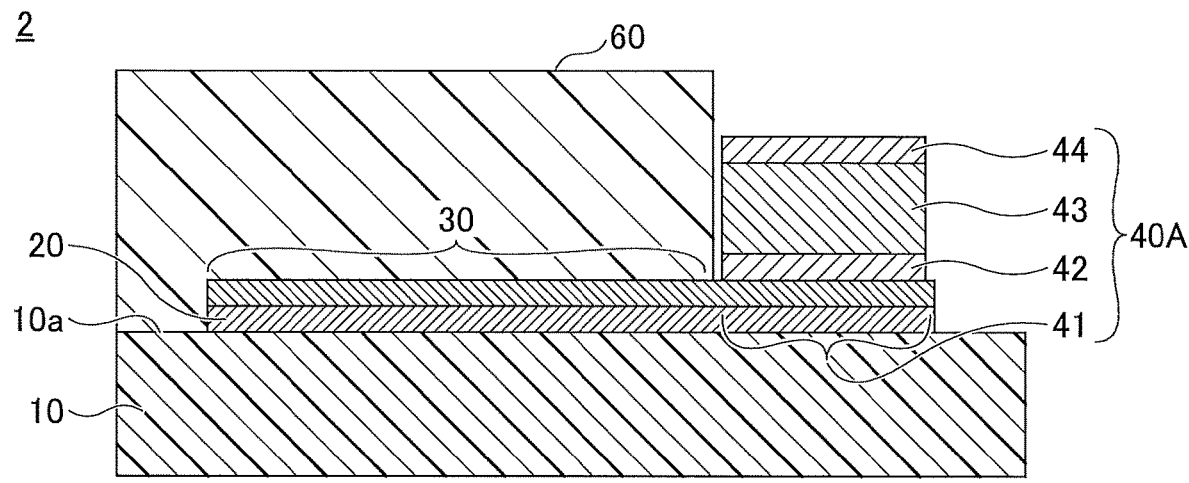
FIG. 6 is a cross-sectional view of an example of the strain gauge according to the second embodiment.

FIG. 5 is a plan view illustrating an example of a strain gauge according to the second embodiment. FIG. 6 is a cross-sectional view illustrating an example of the strain gauge according to the second embodiment, and illustrates a cross section taken along the line B-B in FIG. 5. With reference to FIGS. 5 and 6, the strain gauge 2 includes electrodes 40A in each of which a plurality of layers are laminated. Note that the cover layer 60 may be provided to cover all portions except for the electrodes 40A.

Each electrode 40A has a laminated structure in which a plurality of metallic layers are laminated. Specifically, each electrode 40A includes a terminal section 41 extending from a corresponding end portion from among both end portions of the resistor 30; a metallic layer 42 formed on an upper surface of the terminal section 41, a metallic layer 43 formed on an upper surface of the metallic layer 42, and a metallic layer 44 formed on an upper surface of the metallic layer 43. The metallic layer 43 is a typical example of a first metallic layer according to the present invention, and the metallic layer 44 is a typical example of a second metallic layer according to the present invention.

The material of the metallic layer 42 is not particularly restricted, and can be appropriately selected for any purpose. For example, Cu (copper) can be used. The thickness of the metallic layer 42 is not particularly restricted, and can be appropriately selected for any purpose. For example, the thickness can be approximately between 0.01 μm and 1 μm.

Preferably, the material of the metallic layer 43 includes Cu, a Cu alloy, Ni, or a Ni alloy. The thickness of the metallic layer 43 is determined in consideration of solderability to the electrode 40A, and is preferably 1 μm or more, and more preferably 3 μm or more. When the material of the metallic layer 43 includes Cu, a Cu alloy, Ni, or a Ni alloy and the thickness of the metallic layer 43 is 1 μm or more, dissolution of metallization is ameliorated. Also, when the material of the metallic layer 43 includes Cu, a Cu alloy, Ni, or a Ni alloy and the thickness of the metallic layer 43 is 3 μm or more, dissolution of metallization is further ameliorated. Note that the thickness of the metallic layer 43 is preferably 30 μm or less in terms of ease of electrolytic plating.

Here, the dissolution of metallization means that the material constituting the electrode 40A is dissolved in solder for jointing the electrode 40A, and that the thickness of the electrode 40A is reduced or the material disappears. When the dissolution of metallization occurs, adhesion strength or tensile strength with a lead wire, or the like to be jointed to the electrode 40A may be reduced. Thus, it is preferable that no dissolution of metallization occur.

For the material of the metallic layer 44, material having better solder wettability than the metallic layer 43 can be selected. For example, when the material of the metallic layer 43 includes Cu, a Cu alloy, Ni, or a Ni alloy, the material of the metallic layer 44 can include Au (gold). When the surface of Cu, a Cu alloy, Ni, or a Ni alloy is coated with Au, oxidation and corrosion for Cu, a Cu alloy, Ni, or a Ni alloy can be prevented, as well as great solder wettability being able to be provided. Instead of Au, when the material of the metallic layer 44 includes Pt (platinum), the metallic layer 44 has the same effect. The thickness of the metallic layer 44 is not particularly restricted, and can be appropriately selected for any purpose. For example, the thickness can be approximately between 0.01 μm and 1 μm.

Note that each terminal section 41 is exposed around a given laminated section of the metallic layers 42, 43, and 44, in a plan view. However, each terminal section 41 may have the same planar shape as the laminated section of the metallic layers 42, 43, and 44.

FIGS. 7A to 8D illustrate a process of manufacturing a strain gauge according to a second embodiment, and illustrate a cross section corresponding to FIG. 6. In order to manufacture the strain gauge 2, a process that is similar to that in FIG. 3A according to the first embodiment is first performed, and then in the process illustrated in FIG. 7A, a metallic layer 300 is formed on an upper surface of the functional layer 20. The metallic layer 300 is a layer that is finally patterned to serve as the resistor 30 and terminal sections 41. In such a manner, the material and thickness of the metallic layer 300 are the same as the material and thickness for each of the above resistor 30 and terminal sections 41.

The metallic layer 300 can be deposited by magnetron sputtering in which, for example, a raw material capable of forming the metallic layer 300 is the target. Instead of the magnetron sputtering, the metallic layer 300 may be deposited by reactive sputtering, vapor deposition, arc ion plating, pulsed laser deposition, or the like.

Figure 7A:
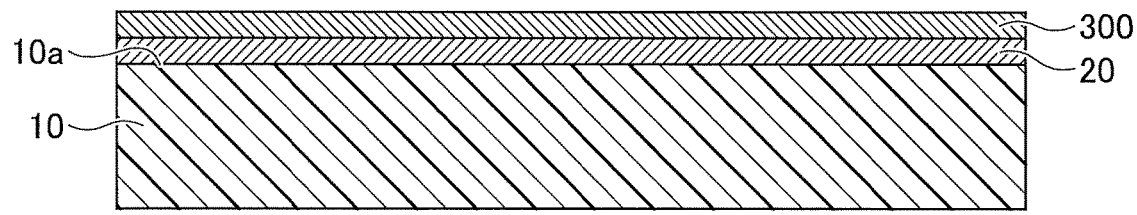
FIG. 7A is a diagram (first part) illustrating an example of the process of manufacturing the strain gauge according to the second embodiment.
Figure 7B:
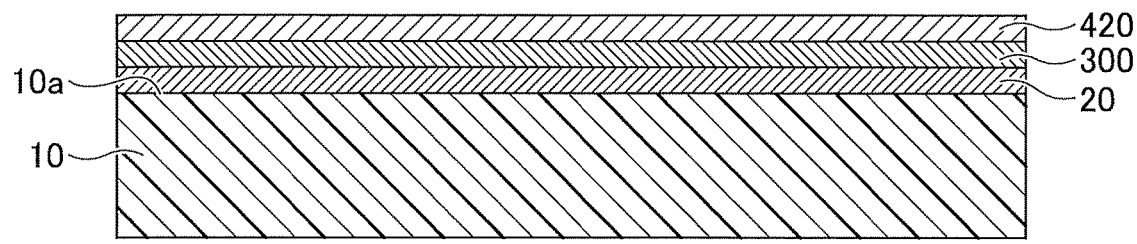
FIG. 7B is a diagram (second part) illustrating an example of the process of manufacturing the strain gauge according to the second embodiment.

Next, in the process illustrated in FIG. 7B, a seed layer 420 as the metallic layer 42 is formed by, for example, sputtering, electroless plating, or the like, to cover an upper surface of the metallic layer 300.

Figure 7C:
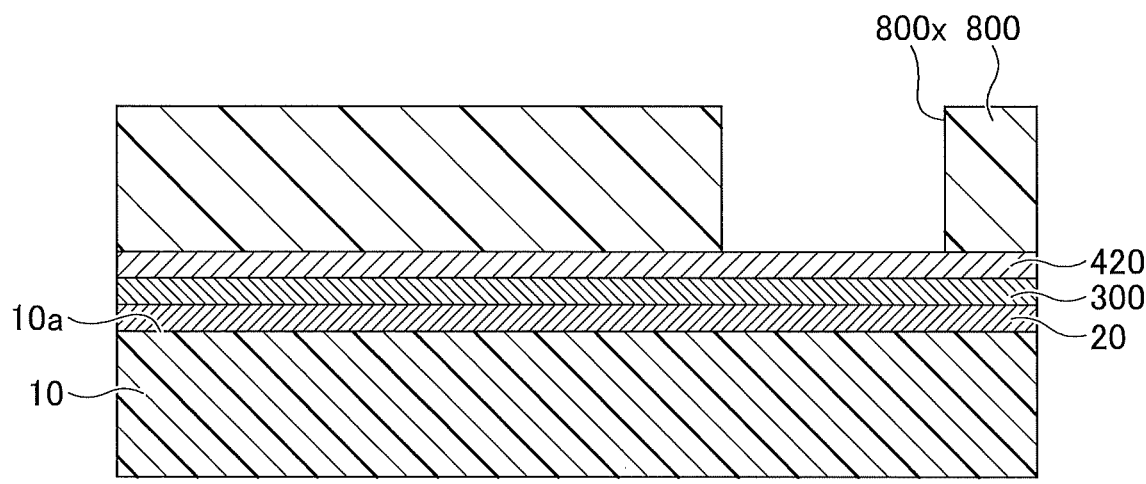
FIG. 7C is a diagram (third part) illustrating an example of the process of manufacturing the strain gauge according to the second embodiment.

Next, in the process illustrated in FIG. 7C, a photosensitive resist 800 is formed on the entire upper surface of the seed layer 420, and by exposing and developing, an opening 800x for exposing a region in which each electrode 40A is to be formed is formed. As the resist 800, for example, a dry film resist, or the like can be used.

Figure 7D:
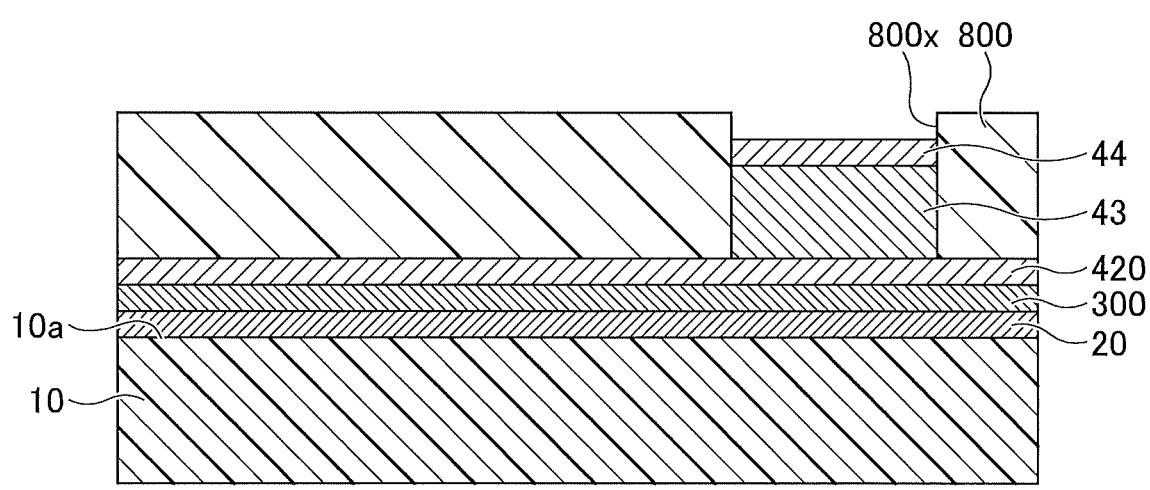
FIG. 7D is a diagram (fourth part) illustrating an example of the process of manufacturing the strain gauge according to the second embodiment.

Next, in the process illustrated in FIG. 7D, a given metallic layer 43 is formed on the seed layer 420 that is exposed in the opening 800x, by for example, electrolytic plating in which the seed layer 420 is set as a power supply path, and further, a given metallic layer 44 is formed on the metallic layer 43. The electrolytic plating is suitable because it has high takt and allows for formation of a low stress electrolytic plating layer as the metallic layer 43. When the electrolytic plating layer whose thickness is increased has low stress, warp in the strain gauge 2 can be prevented. Note that the metallic layer 44 may be formed on the metallic layer 43, by electroless plating.

Note that in forming the metallic layer 44, side surfaces of the metallic layer 43 are coated with the resist 800, so that the metallic layer 44 is formed only on the upper surface of the metallic layer 43 and is not on the side surfaces thereof.

Figure 8A:
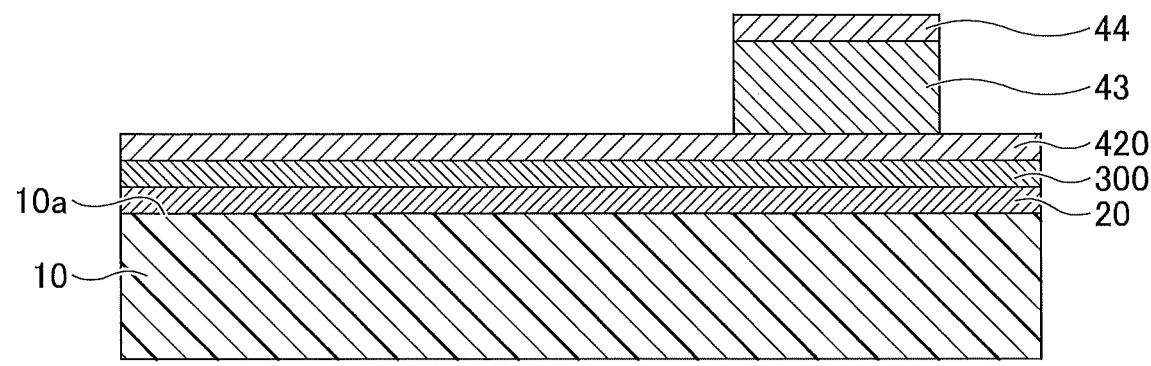
FIG. 8A is a diagram (fifth part) illustrating an example of the process of manufacturing the strain gauge according to the second embodiment.

Next, in the process illustrated in FIG. 8A, the resist 800 illustrated in FIG. 7D is removed. The resist 800 can be removed by, for example, immersing the material of the resist 800 in a dissolvable solution.

Figure 8B:
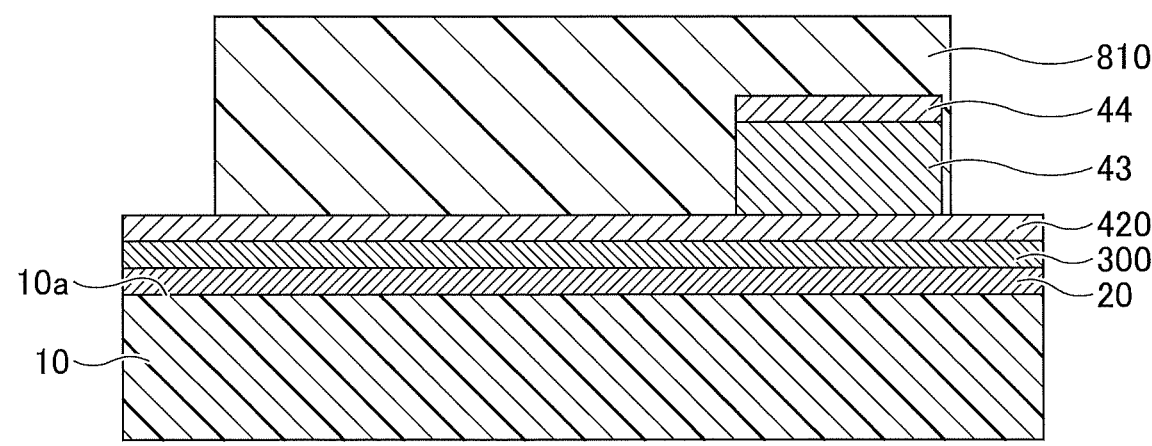
FIG. 8B is a diagram (sixth part) illustrating an example of the process of manufacturing the strain gauge according to the second embodiment.

Next, in the process illustrated in FIG. 8B, a photosensitive resist 810 is formed on the entire upper surface of the seed layer 420, and by exposing and developing, a planar shape that is the same as that of the resistor 30 and terminal sections 41 in FIG. 5 is patterned. As the resist 810, for example, a dry film resist, or the like can be used.

Figure 8C:
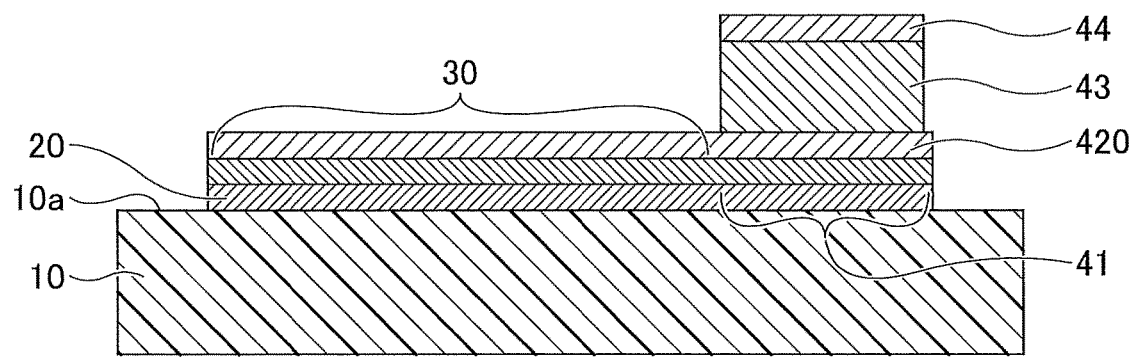
FIG. 8C is a diagram (seventh part) illustrating an example of the process of manufacturing the strain gauge according to the second embodiment.

Next, in the process illustrated in FIG. 8C, the resist 810 is used as an etch mask, and the functional layer 20, the metallic layer 300, and the seed layer 420 that are exposed from the resist 810 are removed, so that the functional layer 20, the resistor 30, and the terminal sections 41 each of which has the planar shape in FIG. 5 are formed. For example, with wet etching, unwanted portions of the functional layer 20; the metallic layer 300; and the seed layer 420 can be removed. Note that at this point, the seed layer 420 is formed on the resistor 30.

Figure 8D:
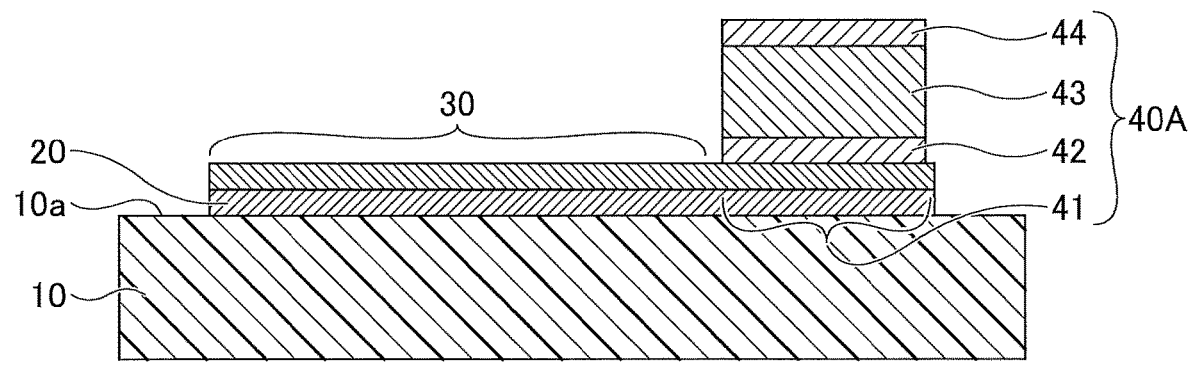
FIG. 8D is a diagram (eighth part) illustrating an example of the process of manufacturing the strain gauge according to the second embodiment.

Next, in the process illustrated in FIG. 8D, the metallic layer 43 and the metallic layer 44 are used as etch masks, and an unwanted seed layer 420 that is exposed from the metallic layer 43 and the metallic layer 44 is removed, so that the metallic layer 42 is formed. For example, by wet etching using etching liquid with which the seed layer 420 is etched and with which the functional layer 20 and the resistor 30 are not etched, the unwanted seed layer 420 can be removed.

After the process illustrated in FIG. 8D, as is the case with the process in FIG. 3C, the cover layer 60 with which the resistor 30 is coated and that exposes the electrodes 40A is formed on and above the upper surface 10a of the substrate 10, so that the strain gauge 2 is completed.

As described above, as each electrode 40A, a given metallic layer 43 formed of a thick film (1 μm or more), which is formed of Cu, a Cu alloy, Ni, or a Ni alloy, is formed above a given terminal section 41, and further, a given metallic layer 44 formed of material (Au or Pt) that has better solder wettability than the metallic layer 43 is formed in the outermost surface layer. Thereby, dissolution of metallization can be prevented, as well as improving solder wettability.

First Modification of the Second Embodiment

First modification of the second embodiment provides an example of electrodes each having a layer structure different from that in the second embodiment. Note that in the first modification of the second embodiment, the description for the same components as the embodiments that have been described may be omitted.

Figure 9:
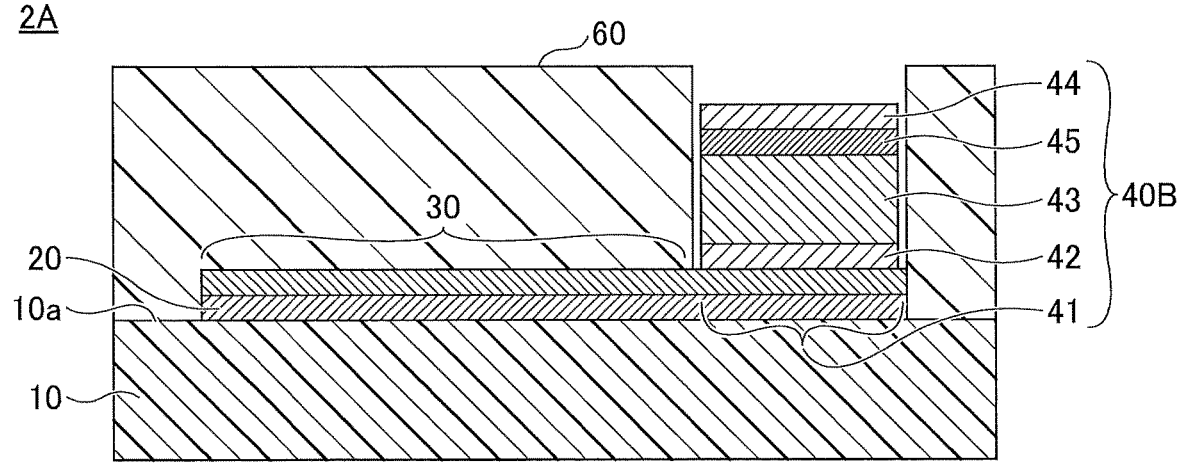
FIG. 9 is a cross-sectional view of an example of a strain gauge according to first modification of the second embodiment.

FIG. 9 is a cross-sectional view illustrating an example of a strain gauge according to the first modification of the second embodiment, and illustrates a cross section corresponding to FIG. 6. With reference to FIG. 9, the strain gauge 2A differs from the strain gauge 2 (see FIG. 6, etc.) in that the electrodes 40A are replaced with electrodes 40B. Additionally, the cover layer 60 is provided to approximately cover all portions except for the electrodes 40B, which differs from the strain gauge 2 (see FIG. 6, etc.).

Each electrode 40B has a laminated structure in which a plurality of metallic layers are laminated. Specifically, each electrode 40B includes a terminal section 41 extending from a corresponding end portion from among both end portions of the resistor 30, a metallic layer 42 formed on an upper surface of the terminal section 41, a metallic layer 43 formed on an upper surface of the metallic layer 42, a metallic layer 45 formed on an upper surface of the metallic layer 43, and a metallic layer 44 formed on an upper surface of the metallic layer 45. In other words, each electrode 40B has a structure in which the metallic layer 45 is provided between the metallic layer 43 and the metallic layer 44 of a given electrode 40A.

The material of the metallic layer 45 is not particularly restricted, and can be appropriately selected for any purpose. For example, Ni can be used. Instead of Ni, NiP (nickel phosphorus) or Pd may be used. Also, as the metallic layer 45, Ni/Pd (a metallic layer in which a Ni layer and a Pd layer are laminated in this order) may be used. The thickness of the metallic layer 45 is not particularly restricted, and can be appropriately selected for any purpose. For example, the thickness can be approximately between 1 μm and 2 μm.

In the process illustrated in FIG. 7D, the metallic layer 45 can be formed on the metallic layer 43 by, for example, electrolytic plating in which the seed layer 420 is set as a power supply path.

In such a manner, the number of electrode layers is not particularly restricted, and the number of layers may be increased as necessary. In this case as well, a given metallic layer 43 formed of a thick film (1 μm or more), which is formed of Cu, a Cu alloy, Ni, or a Ni alloy, is formed above a given terminal section 41, and further, a given metallic layer 44 formed of material (Au or Pt) that has better solder wettability than the metallic layer 43 is formed in the outermost surface layer. Thereby, as is the case with the second embodiment, the dissolution of metallization can be prevented, as well as improving the solder wettability.

Second Modification of the Second Embodiment

Second modification of the second embodiment provides another example of electrodes each having a different layer structure from that in the second embodiment. Note that in the second modification of the second embodiment, the description for the same components as the embodiments that have been described may be omitted.

Figure 10:
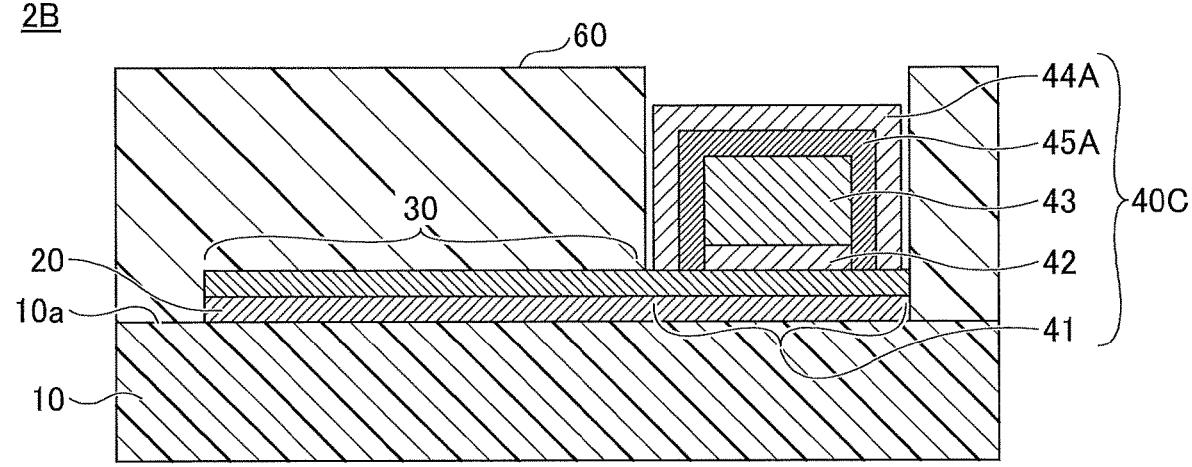
FIG. 10 is a cross-sectional view of an example of a strain gauge according to second modification of the second embodiment.

FIG. 10 is a cross-sectional view illustrating an example of a strain gauge according to the second modification of the second embodiment, and illustrates a cross section corresponding to FIG. 6. With reference to FIG. 10, the strain gauge 2B differs from the strain gauge 2A (see FIG. 9) in that the electrodes 40B are replaced with electrodes 40C. Additionally, the cover layer 60 is provided to approximately cover all portions except for the electrodes 40C, which differs from the strain gauge 2 (see FIG. 6, and the like).

Each electrode 40C has a laminated structure in which a plurality of metallic layers are laminated. Specifically, each electrode 40C includes a terminal section 41 extending from a corresponding end portion from among both end portions of the resistor 30, a metallic layer 42 formed on an upper surface of the terminal section 41, a metallic layer 43 formed on an upper surface of the metallic layer 42, a metallic layer 45A formed on an upper surface and side surfaces of the metallic layer 43 and on side surfaces of the metallic layer 42, and a metallic layer 44A formed on an upper surface and side surfaces of the metallic layer 45A. For example, the material and thickness for each of the metallic layers 44A and 45A can be the same as the material and thickness of the metallic layers 44 and 45. Note that the metallic layer 44A is a typical example of a second metallic layer according to the present invention.

In order to form each electrode 40C, first, in the process illustrated in FIG. 7D, for example, a given metallic layer 43 is formed by, for example, electrolytic plating in which the seed layer 420 is set as a power supply path, and then the resist 800 is removed as is the case with the process illustrated in FIG. 8A, without forming a given metallic layer 44. Next, the same process as that in FIGS. 8B to 8D is performed. Subsequently, a given metallic layer 45A can be formed on the upper surface and side surfaces of the metallic layer 43 and on the side surfaces of the metallic layer 42, by electroless plating, for example. Additionally, a given metallic layer 44A can be formed on the upper surface and side surfaces of the metallic layer 45A, by electroless plating, for example.

As described above, each electrode can be fabricated by appropriately using both of electrolytic plating and electroless plating. In the structure of each electrode 40C, a given metallic layer 43 formed of a thick film (1 μm or more), which is formed of Cu, a Cu alloy, Ni, or a Ni alloy, is formed above a given terminal section 41, and further, a given metallic layer 44A formed of material (Au or Pt) that has better solder wettability than the metallic layer 43 is formed in the outermost layer. Note, however, that the metallic layer 44A of the outermost layer is formed, via the metallic layer 45A, toward the side surfaces of each of the metallic layers 42 and 43, in addition to the upper surface of the metallic layer 43. Thus, in comparison to the electrodes 40A or the electrodes 40B, the effect of preventing oxidation and corrosion of Cu, a Cu alloy, Ni, or a Ni alloy that constitutes the metallic layer 43 can be further enhanced, as well as the solder wettability can be further improved.

Note that the same effect is obtained even when a given metallic layer 44A is formed directly on the upper surface and side surfaces of a given metallic layer 43 and on the side surfaces of a given metallic layer 42, without forming a given metallic layer 45A. In other words, the metallic layer 44A may directly or indirectly cover the upper surface and side surfaces of the metallic layer 43 and the side surfaces of the metallic layer 42.

Third Embodiment

A third embodiment provides an example of a sensor module using a strain gauge. Note that in the third embodiment, the description for the same components as the embodiments that have been described may be omitted.

Figure 11:
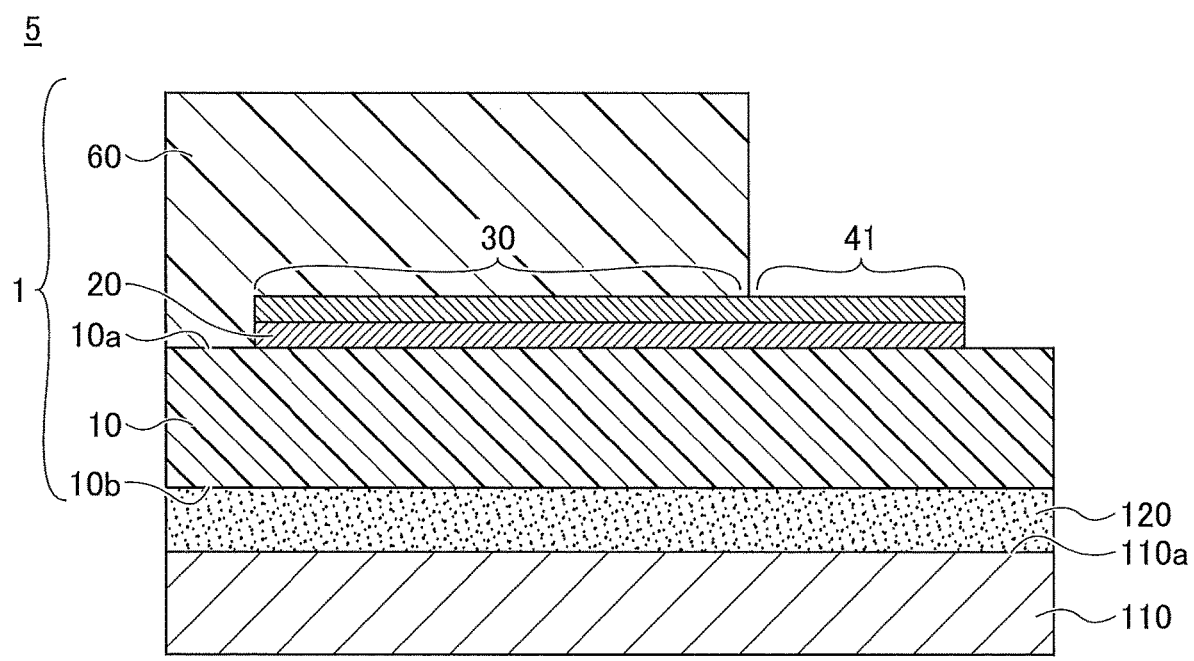
FIG. 11 is a cross-sectional view of an example of a sensor module according to a third embodiment.

FIG. 11 is a cross-sectional view illustrating an example of the sensor module according to the third embodiment, and illustrates a cross section corresponding to FIG. 2. With reference to FIG. 11, the sensor module 5 includes the strain gauge 1, a flexure element 110, and an adhesive layer 120. Note that the cover layer 60 may be provided to cover all portions except for the terminal sections 41.

In the sensor module 5, an upper surface 110a of the flexure element 110 is secured to the lower surface 10b of the substrate 10, via the adhesive layer 120. For example, the flexure element 110 is an object that is formed of a metal such as Fe, SUS (stainless steel), or Al, or, a resin such as PEEK, and that is deformed (causes strain) according to an applied force. The strain gauge 1 can detect strain generated in the flexure element 110, as a change in a resistance value of the resistor 30.

The material of the adhesive layer 120 is not particularly restricted as long as it has a function of securing the flexure element 110 to the strain gauge 1. The material can be appropriately selected for any purpose. For example, an epoxy resin, a modified epoxy resin, a silicone resin, a modified silicone resin, a urethane resin, a modified urethane resin, or the like can be used. Also, material such as a bonding sheet may be used. The thickness of the adhesive layer 120 is not particularly restricted, and can be appropriately selected for any purpose. For example, the thickness can be approximately between 0.1 μm and 50 μm.

In order to manufacture the sensor module 5, after the strain gauge 1 is fabricated, for example, any material described above, which constitutes the adhesive layer 120, is applied to the lower surface 10b of the substrate 10 and/or the upper surface 110a of the flexure element 110. Then, the lower surface 10b of the substrate 10 is situated facing the upper surface 110a of the flexure element 110, and the strain gauge 1 is disposed above the flexure element 110, through the applied material. Alternatively, the bonding sheet may be interposed between the flexure element 110 and the substrate 10.

Next, the strain gauge 1 is heated to a predetermined temperature while being pressed toward the flexure element 110, and the applied material is cured, so that the adhesive layer 120 is formed. Thereby, the lower surface 10b of the substrate 10 is secured to the upper surface 110a of the flexure element 110, through the adhesive layer 120, so that the sensor module 5 is completed. For example, the sensor module 5 can be applied in measurement of load, pressure, torque, acceleration, or the like.

Note that for the sensor module 5, the strain gauge 1A, 2, 2A, or 2B may be used instead of the strain gauge 1.

Example 1

First, in an advance test, Ti as the functional layer 20 was vacuum-deposited on the upper surface 10a of the substrate 10 formed of a polyimide resin that had a thickness of 25 μm, by conventional sputtering. In this case, five samples for each of which Ti was deposited were fabricated in order to target multiple film thicknesses.

Figure 12:
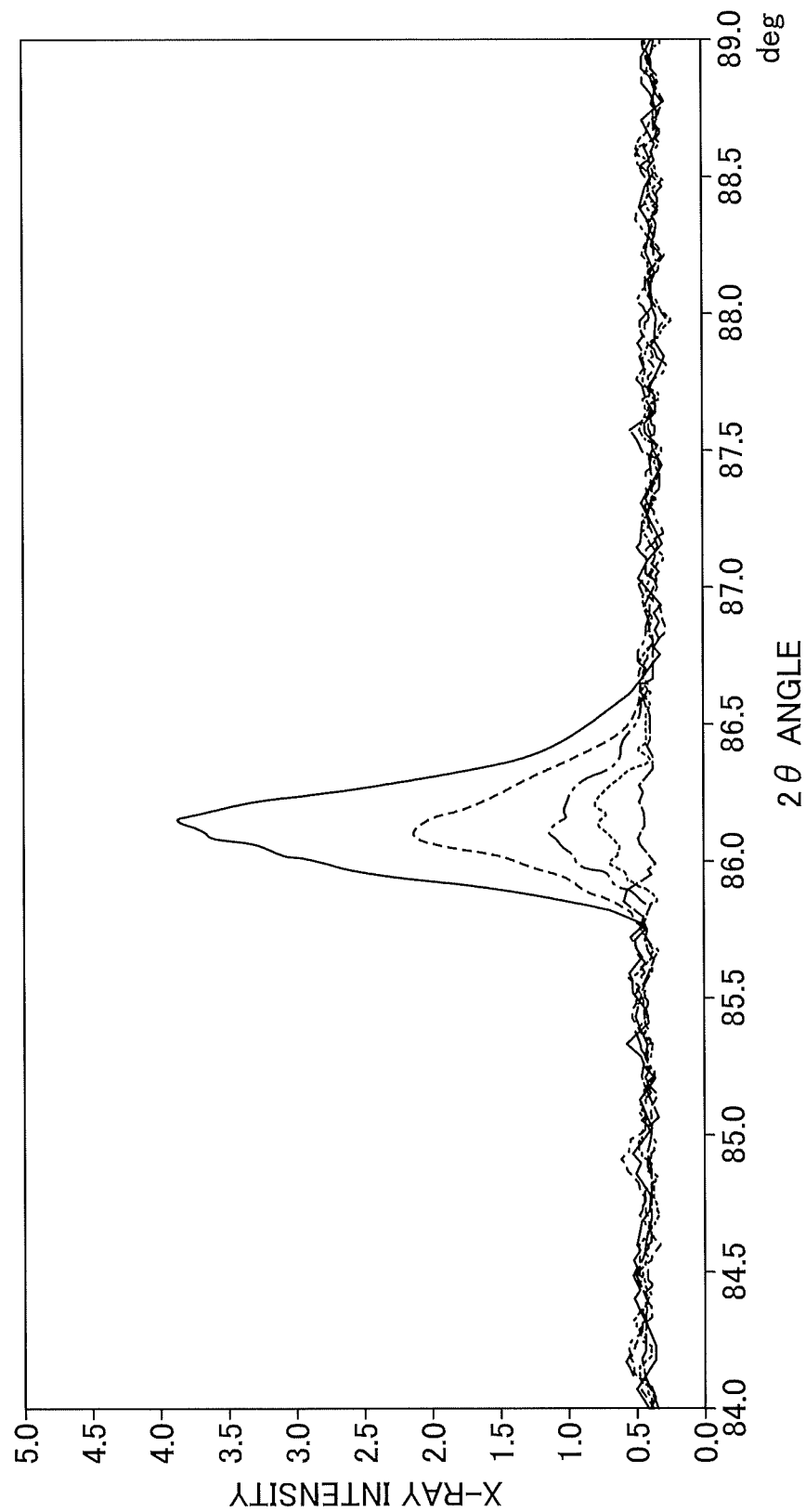
FIG. 12 is a diagram illustrating a result of X-ray fluorescent analysis for a functional layer.

Next, for the fabricated five samples, X-ray fluorescence (XRF) analysis was performed to obtain the result as illustrated in FIG. 12. From an X-ray peak in FIG. 12, it was confirmed that Ti was present, and from X-ray intensity of each sample at the X-ray peak, it was confirmed that a film thickness of a given Ti film could be controlled to be in the range of from 1 nm to 100 nm.

Next, in Example 1, Ti as the functional layer 20, which had a film thickness of 3 nm, was vacuum-deposited on the upper surface 10a of the substrate 10 formed of a polyimide resin that had a thickness of 25 μm, by conventional sputtering.

Subsequently, a Cr composite film, as the resistor 30 and the terminal sections 41, was deposited on the entire upper surface of the functional layer 20, by magnetron sputtering, and then the functional layer 20, the resistor 30, and the terminal sections 41 were patterned by photolithography, as illustrated in FIG. 1.

In comparative example 1, without forming the functional layer 20, a Cr composite film, as the resistor 30 and the terminal sections 41, was deposited on the upper surface 10a of the substrate 10 formed of a polyimide resin that had a thickness of 25 μm, by magnetron sputtering. Then, patterning was performed by photolithography, as illustrated in FIG. 1. Note that for the sample used in Example 1 and the sample used in comparative example 1, all deposition conditions for the resistor 30 and the terminal sections 41 are the same.

Figure 13:
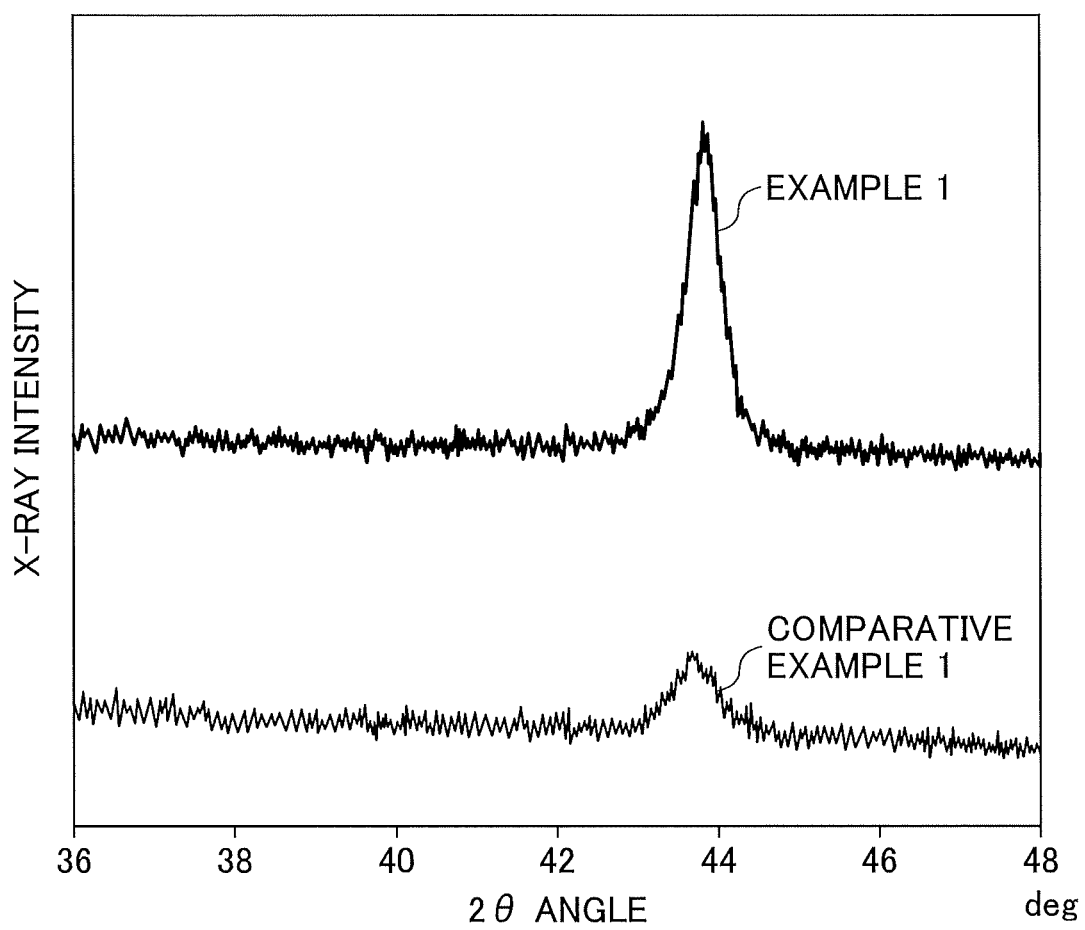
FIG. 13 is a diagram illustrating a result of X-ray diffraction for a resistor.

Next, for a given sample used in Example 1 and a given sample used in comparative example 1, X-ray diffraction evaluation was performed to obtain the result illustrated in FIG. 13. FIG. 13 illustrates an X-ray diffraction pattern at a diffraction angle of 2θ being in the range of from 36 to 48 degrees, and a diffraction peak in Example 1 is shifted to the right in comparison to a diffraction peak in comparative example 1. Further, the diffraction peak in Example 1 is greater than the diffraction peak in comparative example 1.

The diffraction peak in Example 1 is situated in proximity to a diffraction line of α-Cr (110). This is considered that when the functional layer 20 formed of Ti was provided, crystal growth of α-Cr was promoted to thereby form a Cr composite film with α-Cr as the main component.

Next, multiple samples used in Example 1 and comparative example 1 were fabricated, and gauge characteristics were measured. As a result, a gauge factor for each sample in Example 1 was between 14 and 16. In contrast, a gauge factor for each sample in comparative example 1 was less than 10.

Also, for each sample in Example 1, the gauge factor temperature coefficient TCS and temperature coefficient of resistance TCR were each in the range of from −1000 ppm/° c. to +1000 ppm/° c. In contrast, for each sample in comparative example 1, the gauge factor temperature coefficient TCS and temperature coefficient of resistance TCR were not each in the range of from −1000 ppm/° c. to +1000 ppm/° c.

As described above, with the functional layer 20 formed of Ti being provided, crystal growth of α-Cr was promoted and a Cr composite film was formed with α-Cr as the main component, so that a strain gauge that had a gauge factor of 10 or more, and that had the gauge factor temperature coefficient TCS and temperature coefficient of resistance TCR being each in the range of from −1000 ppm/° c. to +1000 ppm/° c., was fabricated. Note that the diffusion effect of Ti into the Cr composite film is considered to cause the improvement in the gauge characteristics.

Example 2

In Example 2, multiple substrates 10 each formed of a polyimide resin that had a thickness of 25 μm and that had a different expansion coefficient were prepared. Then, when a Cr-composite film, as a given resistor 30, was deposited, a relationship between an expansion coefficient of a given substrate 10 and internal stress of the resistor 30 was checked, to thereby obtain the result illustrated in FIG. 14.

The internal stress of the resistor 30 was estimated by measuring warp in an evaluation sample and using the Stoney formula given by Formula (1). Note that as can be seen from Formula (1), the internal stress of the resistor 30 illustrated in FIG. 14 indicates a value per unit thickness and does not depend on the thickness of the resistor 30.

[Math. 1]

$$\text{INTERNAL STRESS} = ED2/6(1-v)tR \qquad (1)$$

Note that in Formula (1), E denotes Young's modulus, v denotes Poisson's ratio, D denotes the thickness of the substrate 10, t denotes the thickness of the resistor 30, and R denotes change in radius of curvature in the substrate 10.

Figure 14:
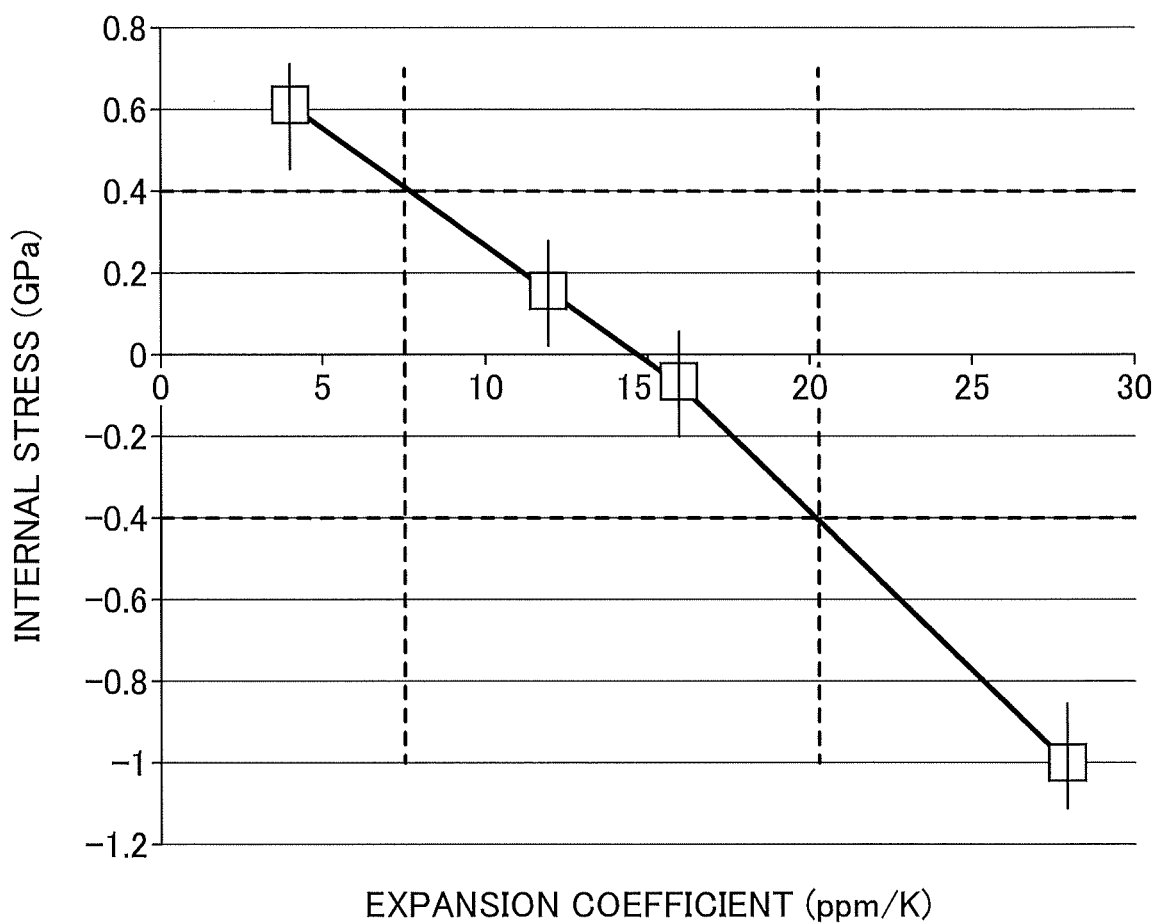
FIG. 14 is a diagram illustrating the relationship between an expansion coefficient of a substrate and internal stress of a resistor.

From FIG. 14, when the expansion coefficient of the substrate 10 is in the range of from 7 ppm/K to 20 ppm/K, the internal stress of the resistor 30 can be maintained to be in the range of ±0.4 GPa. Where, ±0.4 GPa indicates values expressing a permittable warp in the strain gauge 1 for functioning, and was experimentally determined by the inventors.

In other words, when the expansion coefficient of the substrate 10 is out of the range of from 7 ppm/K to 20 ppm/K, the internal stress of the resistor 30 is out of the range of ±0.4 GPa and thus warp in the strain gauge 1 would increase, so that the strain gauge 1 would not function as a strain gauge. Therefore, the expansion coefficient of the substrate 10 is required to be in the range of from 7 ppm/K to 20 ppm/K. Note that the material of the substrate 10 does not necessarily include a polyimide resin.

The expansion coefficient of the substrate 10 can be in the range of from 7 ppm/K to 20 ppm/K, by selecting the material of the substrate 10, selecting the material of the filler contained in the substrate 10, adjusting the content, and the like.

As described above, with the expansion coefficient of the substrate 10 being in the range of from 7 ppm/K to 20 ppm/K, a difference in the expansion coefficient between the substrate 10 and the resistor 30, as well as other factors, are absorbed, so that the internal stress of the resistor 30 can be in the range of ±0.4 GPa. As a result, warp in the strain gauge 1 is reduced to thereby cause the strain gauge 1 to be able to function stably in a manner such that great gauge characteristics are maintained.

Example 3

In Example 3, multiple substrates 10 each formed of a polyimide resin that had a thickness of 25 μm and that contained fillers were prepared. Three sets of samples, each of which included a sample not being subject to heat treatment, a sample being subject to heat treatment at a temperature of 100° c., a sample being subject to heat treatment at a temperature of 200° c., and a sample being subject to heat treatment at a temperature of 300° c., were fabricated. Then, the samples were returned to be at normal temperature, and surface unevenness on the upper surface 10a of each substrate 10 was measured by three-dimensional optical interference.

Next, the resistor 30 having a film thickness of 0.05 μm was deposited on the upper surface 10a of each substrate 10, by magnetron sputtering, and patterning was performed by photolithography, as illustrated in FIG. 1. Then, the number of pinholes that were generated in the resistor 30 was measured by a light transmission method in which light was transmitted from a back surface of a given sample.

Figure 15:
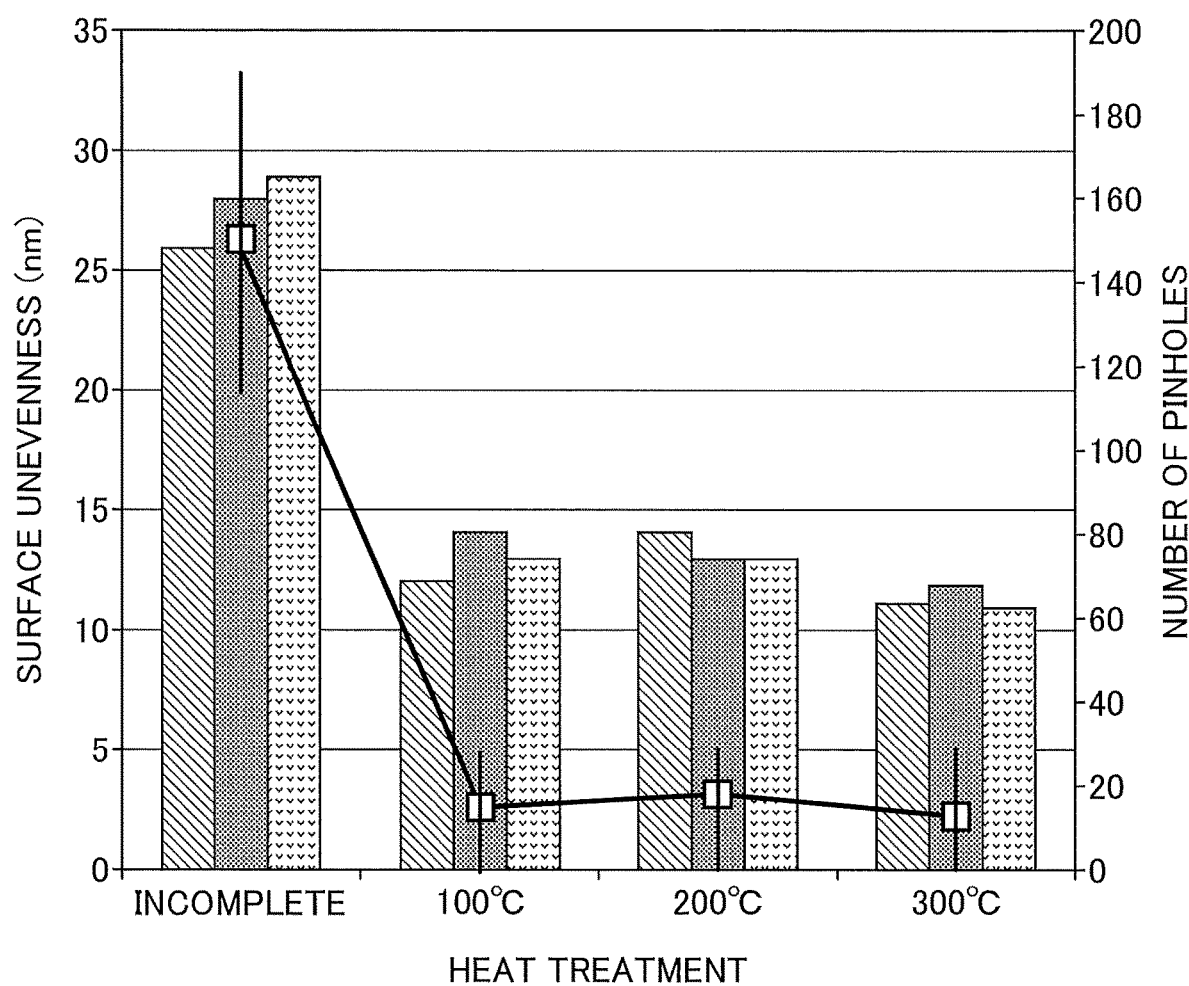
FIG. 15 is a diagram illustrating the relationship between surface unevenness of a substrate and the number of pinholes of a resistor.

Next, based on a measured result, a relationship between surface unevenness on the upper surface 10a of a given substrate 10 and the number of pinholes that were generated in a given resistor 30 was summarized in FIG. 15. Note that each bar graph illustrated in FIG. 15 shows surface unevenness, and a line graph shows the number of pinholes. Additionally, for the horizontal axis, 100° C., 200° C., and 300° C. each indicate a temperature when a given substrate 10 was subject to heat treatment, and Incomplete indicates that heat treatment is not carried out.

FIG. 15 indicates that when a given substrate 10 is heated at temperatures between 100° C. and 300° C., the surface unevenness on the upper surface 10a of the substrate 10 is 15 nm or less, which is about half of surface unevenness in a case of being incomplete, and that as a result, the number of pinholes in the resistor 30 is drastically reduced to about ⅐. Note, however, that in consideration of resistance to thermal temperature of a polyimide resin, when heat treatment is carried out at temperatures exceeding 250° C., alteration or deterioration may occur. Accordingly, it is preferable that the heat treatment be carried out at temperatures between 100° C. and 250° C. Note that it is considered that the surface unevenness is reduced by heat treatment because fillers are contained in a polyimide resin that constitutes the substrate 10, during thermal shrinkage caused by the heat treatment.

According to consideration by the inventors, the number of pinholes (about 140) in the case of Incomplete, as illustrated in FIG. 15, indicates a level of the gauge characteristics deteriorating. In contrast, the number of pinholes (about 20) after heat treatment, indicates a level of the gauge characteristics not being adversely affected. In other words, when the resistor 30 having a film thickness of 0.05 μm is used, in a case where the surface unevenness on the upper surface 10a of the substrate 10 is 15 nm or less, it was confirmed that the number of pinholes that were generated in the resistor 30 could be reduced to indicate a level of the gauge characteristics not being adversely affected.

Note that when the resistor 30 having a film thickness of greater than 0.05 μm is used, it is obvious that when the surface unevenness on the upper surface 10a of the substrate 10 is 15 nm or less, the number of pinholes that are generated in the resistor 30 can be reduced to indicate a level of the gauge characteristics not being adversely affected. In other words, with the surface unevenness on the upper surface 10a of the substrate 10 being 15 nm or less, when the resistor 30 having a film thickness of 0.05 μm or more is used, the number of pinholes that are generated in the resistor 30 can be reduced to indicate a level of the gauge characteristics not being adversely affected.

As described above, with the substrate 10 being subject to heat treatment, the surface unevenness on the upper surface 10a of the substrate 10 can be 15 nm or less, and as a result, the number of pinholes that are generated in the resistor 30 having a film thickness of 0.05 μm or more can be significantly reduced. As a result, the strain gauge 1 can function stably in a manner such that great gauge characteristics are maintained.

Note that in order to reduce the number of pinholes that are generated in the resistor 30, it is important to reduce the surface unevenness on the upper surface 10a of the substrate 10, and a method of reducing surface unevenness is not important. In the above description, the method of reducing surface unevenness by heat treatment has been described, but is not limited to this case. Any method may be used as long as the surface unevenness on the upper surface 10a of the substrate 10 can be reduced.

The surface unevenness on the upper surface 10a of the substrate 10 can be reduced by, for example, a method of scraping a protrusion by approximately vertically irradiating the upper surface 10a of the substrate 10, with laser light; a method of cutting a protrusion by moving a water cutter or the like to be parallel to the upper surface 10a of the substrate 10; a method of polishing the upper surface 10a of the substrate 10 with a grinding wheel; a method of pressing the substrate 10 while heating (heat press); or the like.

Further, in order to reduce the number of pinholes that are generated in the resistor 30, it is important to reduce the surface unevenness on the upper surface 10a of the substrate 10, and is not necessarily limited to being directed to surface unevenness caused by the fillers that are present. It is effective to reduce surface unevenness not being caused by the fillers that are present, by various methods described above. For example, when surface unevenness on the substrate 10 without containing fillers is greater than 15 nm, in a case where the surface unevenness on the upper surface 10a of the substrate 10 is 15 nm or less, by various methods described above, the number of pinholes that are generated in the resistor 30 having a film thickness of 0.05 μm or more can be reduced to a level of the gauge characteristics not being adversely affected.

Example 4

In Example 4, the process illustrated in FIGS. 7A to 8D was modified as described in the first modification of the second embodiment, the strain gauge 2A with the electrodes 40B was fabricated, and the presence or absence of dissolution of metallization was checked. Specifically, 10 types of samples in each of which Cu was used for the metallic layers 42 and 43, in each of which NiP was used for the metallic layer 45, in each of which Au was used for the metallic layer 44, and in each of which the thickness of a given metallic layer was changed were fabricated (samples No. 1 to No. 10), and then the presence or absence of dissolution of metallization was checked.

Table 1 shows results. Note that in Table 1, the film thickness "0" indicates that no metallic layer was formed. The "poor" indicates that dissolution of metallization occurred in soldering being first performed. The "good" indicates that although no dissolution of metallization occurred in soldering being first performed, little dissolution of metallization occurred in soldering being performed second (where soldering refinement, etc. was assumed). Additionally, the "excellent" indicates that dissolution of metallization occurred neither in soldering being performed first nor second.

TABLE 1

| SAMPLE No. | EACH FILM THICKNESS [μm] | | | SOLDERABILITY | |
|---|---|---|---|---|---|
| | Cu | NiP | Au | | |
| 1 | 0.5 | 0 | 0 | POOR | PRESENCE OF DISSOLUTION OF METALLIZATION |
| 2 | 0.5 | 0 | 0.1 | POOR | PRESENCE OF DISSOLUTION OF METALLIZATION |
| 3 | 0.5 | 0 | 0.8 | POOR | PRESENCE OF DISSOLUTION OF METALLIZATION |
| 4 | 1 | 1 | 0.1 | GOOD | ABSENCE OF DISSOLUTION OF METALLIZATION |
| 5 | 3 | 0 | 0 | EXCELLENT | ABSENCE OF DISSOLUTION OF METALLIZATION |
| 6 | 3 | 0 | 0.1 | EXCELLENT | ABSENCE OF DISSOLUTION OF METALLIZATION |
| 7 | 3 | 0 | 0.8 | EXCELLENT | ABSENCE OF DISSOLUTION OF METALLIZATION |
| 8 | 3 | 1 | 0.1 | EXCELLENT | ABSENCE OF DISSOLUTION OF METALLIZATION |
| 9 | 5 | 1 | 0.1 | EXCELLENT | ABSENCE OF DISSOLUTION OF METALLIZATION |
| 10 | 8 | 1 | 0.1 | EXCELLENT | ABSENCE OF DISSOLUTION OF METALLIZATION |

As shown in Table 1, it was confirmed that when the thickness of Cu was 1 prn or more, dissolution of metallization was improved, and that when the thickness was 3 urn or more, the dissolution of metallization was further improved. Additionally, from the results for sample 1 and sample 5, it was confirmed that the presence or absence of dissolution of metallization was determined only according to the thickness of Cu and was not determined upon the presence or absence of each of NiP and Au. Note, however, that as described above, in order to prevent dissolution of metallization and improve solder wettability, a metallic layer formed of Au or an equivalent material (Pt or the like) is required.

Fourth Embodiment

A fourth embodiment provides an example of a sensor having a different structure from the structure in the first embodiment. Note that in the fourth embodiment, the description for the same components as the embodiments that have been described may be omitted.

Figure 16:
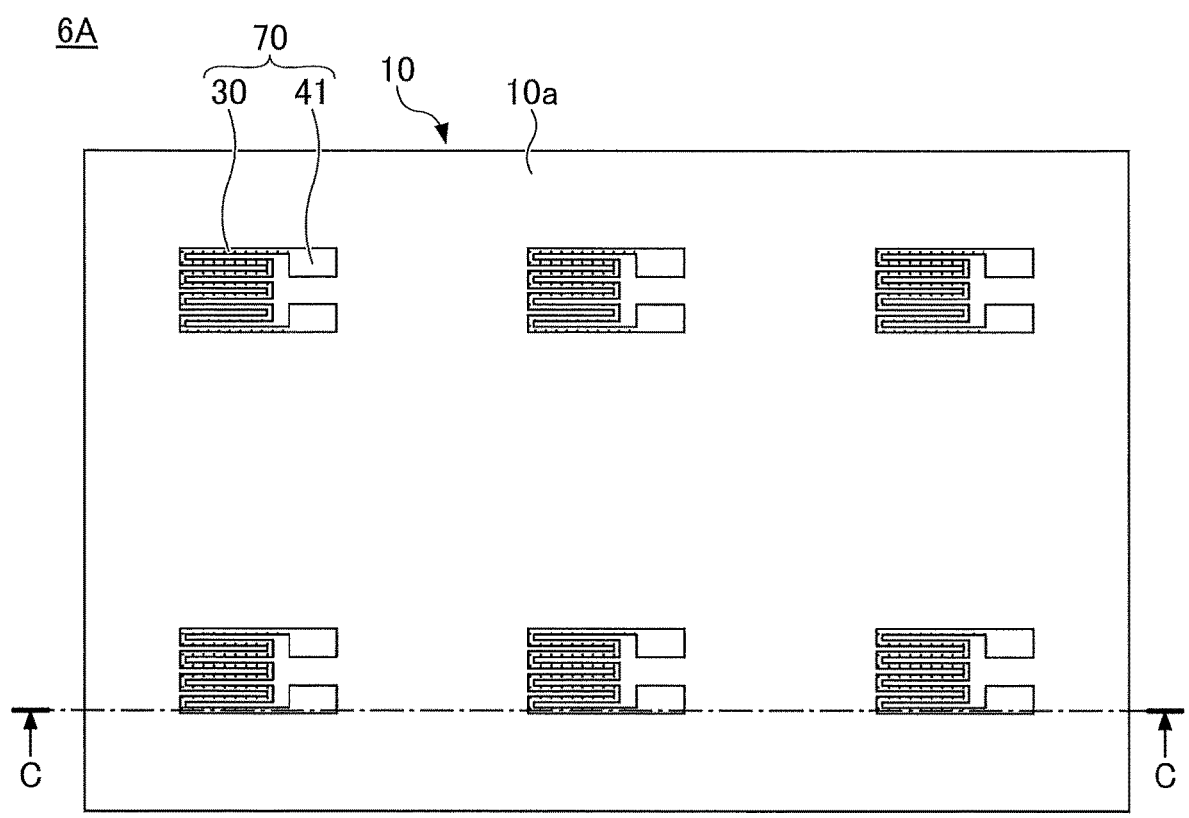
FIG. 16 is a plan view of an example of a sensor according to a fourth embodiment.
Figure 17:
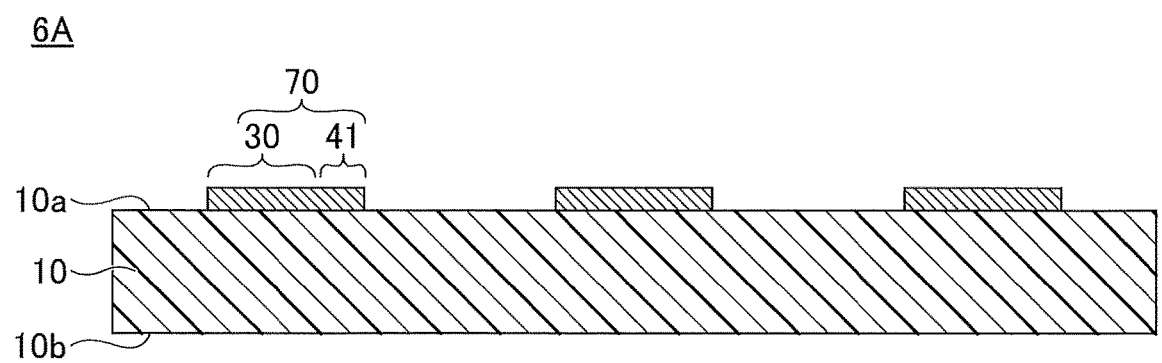
FIG. 17 is a cross-sectional view of an example of the sensor according to the fourth embodiment.

FIG. 16 is a plan view of an example of the sensor according to the fourth embodiment. FIG. 17 is a cross-sectional view of an example of the sensor according to the fourth embodiment, and illustrates the cross section taken along the C-C line in FIG. 16.

Referring to FIGS. 16 and 17, a sensor 6A is an aggregation of individual sensors 70 (strain gauges). In the present embodiment, for example, the sensor 6A includes six individual sensors 70. However, the number of individual sensors 60 is not limited to six.

The sensor 6A includes the substrate 10 common to the individual sensors 70, and includes a resistor 30 and terminal sections 41 that are provided in each individual sensor 70. The individual sensors 70 are disposed on one side of the same substrate 10. Each individual sensor 70 has the same characteristics as the strain gauge 1.

The cover layer 60, as described in the first embodiment, may be provided on and above the upper surface 10a of the substrate 10, such that resistors 30 of the individual sensors 70 are coated and the terminal sections 41 are exposed. With the cover layer 60 being provided, mechanical damage, and the like can be prevented from occurring in the resistors 30 of the individual sensors 70. Additionally, with the cover layer 60 being provided, the resistors 30 of the individual sensors 70 can be protected against moisture, and the like. Note that the cover layer 60 may be provided to cover all portions except for the terminal sections 41.

The sensor 6A may be attached to a surface of an object to be measured, or may be embedded in the object to be measured.

As described above, with use of the sensor 6A that is the aggregation of individual sensors 70 (strain gauges), a state of a measured object may be detected. In such a manner, it may be more convenient in comparison to a manner of employing multiple strain gauges 1. Note that the state of the measured object includes strain, expansion, contraction, deformation, or the like of the measured object.

Fifth Embodiment

A fifth embodiment provides an example of a sensor capable of obtaining three dimensional information. Note that in the fifth embodiment, the description for the same components as those in the embodiments described previously may be omitted.

Figure 18:
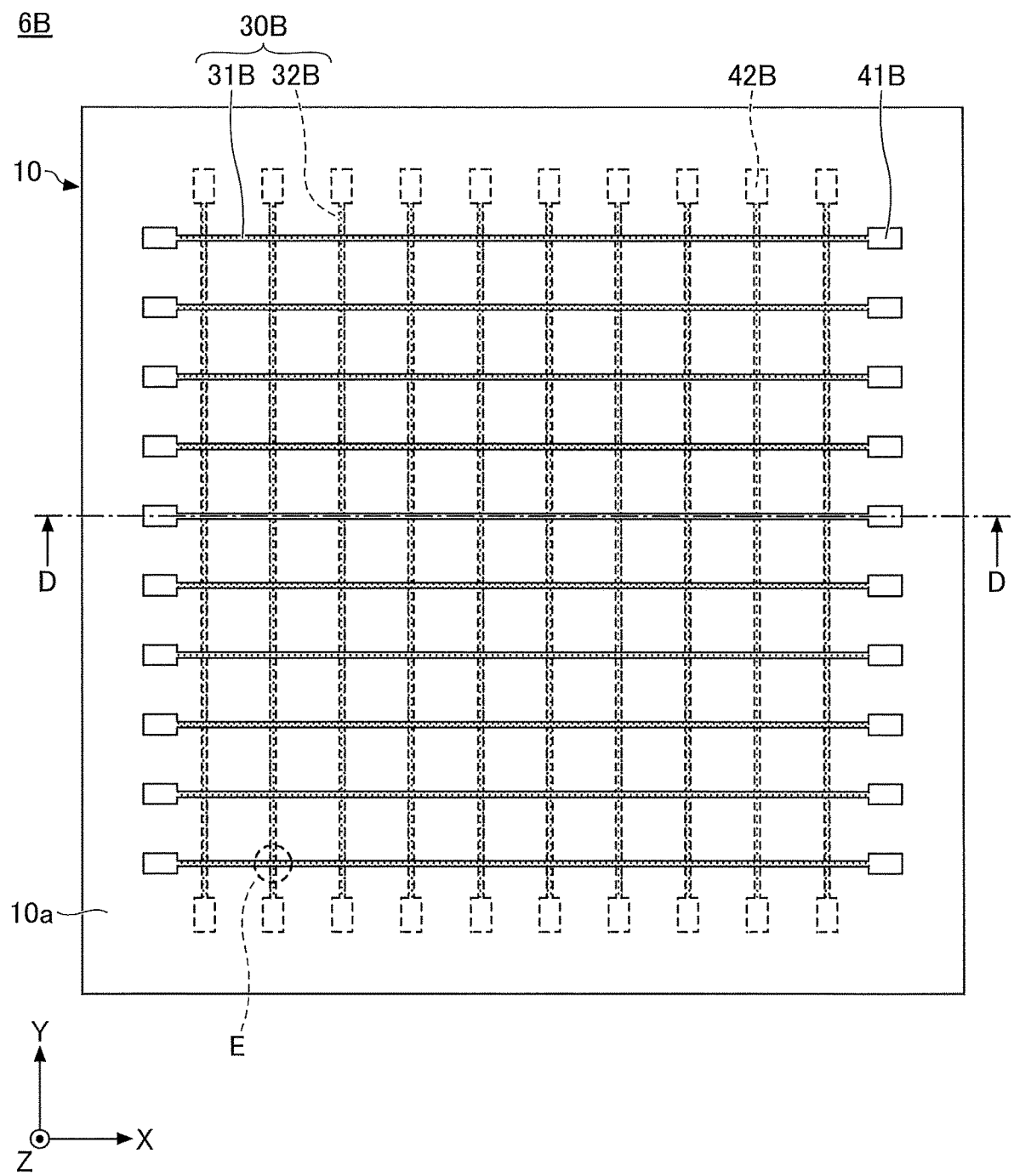
FIG. 18 is a plan view of an example of a sensor according to a fifth embodiment.
Figure 19:
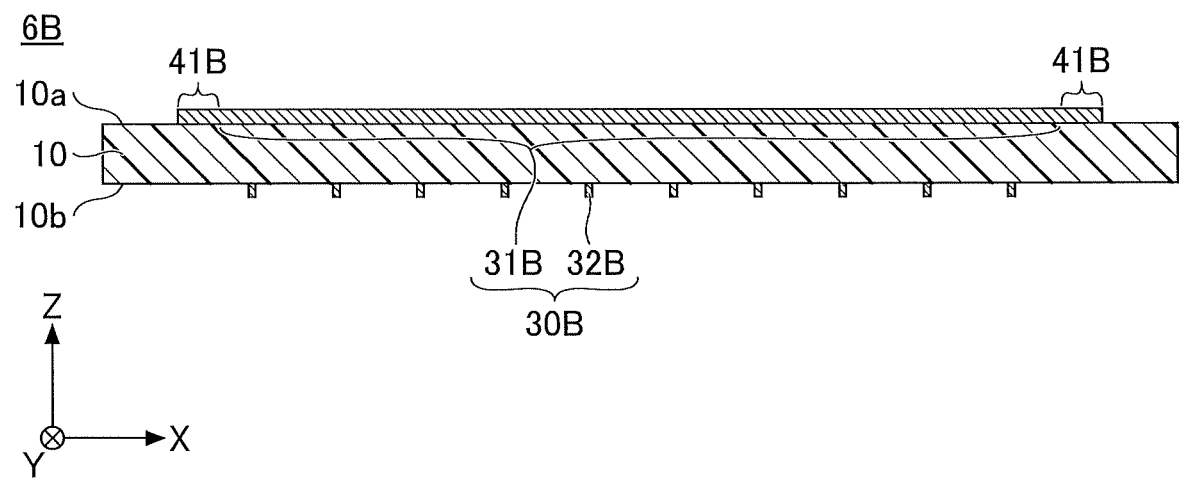
FIG. 19 is a cross-sectional view of an example of the sensor according to the fifth embodiment.

FIG. 18 is a plan view of an example of a sensor according to the fifth embodiment. FIG. 19 is a cross-sectional view of an example of the sensor according to the fifth embodiment, and illustrates the cross section taken along the D-D line in FIG. 18.

Referring to FIGS. 18 and 19, a sensor 6B includes resistors 30B, and terminal sections 41B and 42B.

Each resistor 30B includes resistive portions 31B and 32B that are laminated via the substrate 10. In such a case, the resistor 30B is a collective term for the multiple resistive portions 31B and 32B. In particular, when the resistive portions 31B and 32B are distinguished from each other, they are referred to as the resistor 30B. Note that in FIG. 18, for the sake of convenience, the resistive portions 31B and 32B are each illustrated in a crepe pattern.

The multiple resistive portions 31B are thin films of which the longitudinal direction of each is directed to the X direction and that are juxtaposed in the Y direction at predetermined intervals, on the upper surface 10a of the substrate 10. The multiple resistive portions 32B are thin films of which the longitudinal direction of each is directed to the Y direction and that are juxtaposed in the X direction at predetermined intervals, on the lower surface 10b of the substrate 10. Note, however, that the multiple resistive portions 31B and the multiple resistive portions 32B may intersect while not being required to be perpendicular to each other in a plan view.

The width of the resistor 30B is not particularly restricted, and can be appropriately selected for any purpose. For example, the width can be approximately between 0.1 μm and 1000 μm (1 mm). A pitch between resistors 30 next to each other is not particularly restricted, and can be appropriately selected for any purpose. For example, the pitch can be approximately between 1 mm and 100 mm. Note that in FIGS. 18 and 19, ten resistive portions 31B and ten resistive portions 32B are illustrated. However, the number for each of the resistive portion 31B and the resistive portion 32B can be appropriately varied as necessary. For each resistor 30B, the material, the thickness, the manufacturing method, and the like can be adopted as in the resistor 30.

On the upper surface 10a of the substrate 10, given terminal sections 41B respectively extend from both end portions of each resistive portion 31B, and are each wider than the resistive portion 31B to be formed in an approximately rectangular shape, in a plan view. The terminal sections 41B are a pair of electrodes from which a change in a given resistance value of the resistive portion 31B in accordance with the press force is output externally, where, for example, a flexible substrate or lead wire for external connection, or the like is joined. The upper surface of each terminal section 41B may be coated with a metal allowing for greater solderability than the terminal section 41B. Note that for the sake of convenience, the resistive portions 31B and the terminal sections 41B are expressed by different numerals. However, a given resistive portion 31B and given terminal sections 41B can be integrally formed of the same material, in the same process.

On the lower surface 10b of the substrate 10, given terminal sections 42B respectively extend from both end portions of each resistive portion 32B, and are each wider than the resistive portion 32B to be formed in an approximately rectangular shape, in a plan view. The terminal sections 42B are a pair of electrodes from which a change in a given resistance value of the resistive portion 32B in accordance with the press force is output externally, where, for example, a flexible substrate or lead wire for external connection, or the like is joined. The upper surface of each terminal section 42B may be coated with a metal allowing for greater solderability than the terminal section 42B. Note that for the sake of convenience, the resistive portions 32B and the terminal sections 42B are expressed by different numerals. However, a given resistive portion 32B and given terminal sections 42B can be integrally formed of the same material, in the same process.

Note that through interconnects (through holes) are provided through the substrate 10, and the terminal sections 41B and 42B may be collected on the upper surface 10a side or the lower surface 10b side of the substrate 10.

The cover layer 60, as described in the first embodiment, may be provided on and above the upper surface 10a of the substrate 10, such that the resistive portions 31B are coated and the terminal sections 41B are exposed. The cover layer 60, as described in the first embodiment, may be also provided on and above the lower surface 10b of the substrate 10, such that the resistive portions 32B are coated and the terminal sections 42B are exposed. By providing the cover layers, mechanical damage and the like can be prevented from occurring in the resistive portions 31B and 32B. Further, by providing the cover layers, the resistive portions 31B and 32B can be protected against moisture and the like. Note that one or more cover layers 60 may be provided to cover all portions except for the terminal sections 41B and 42B.

Figure 20:
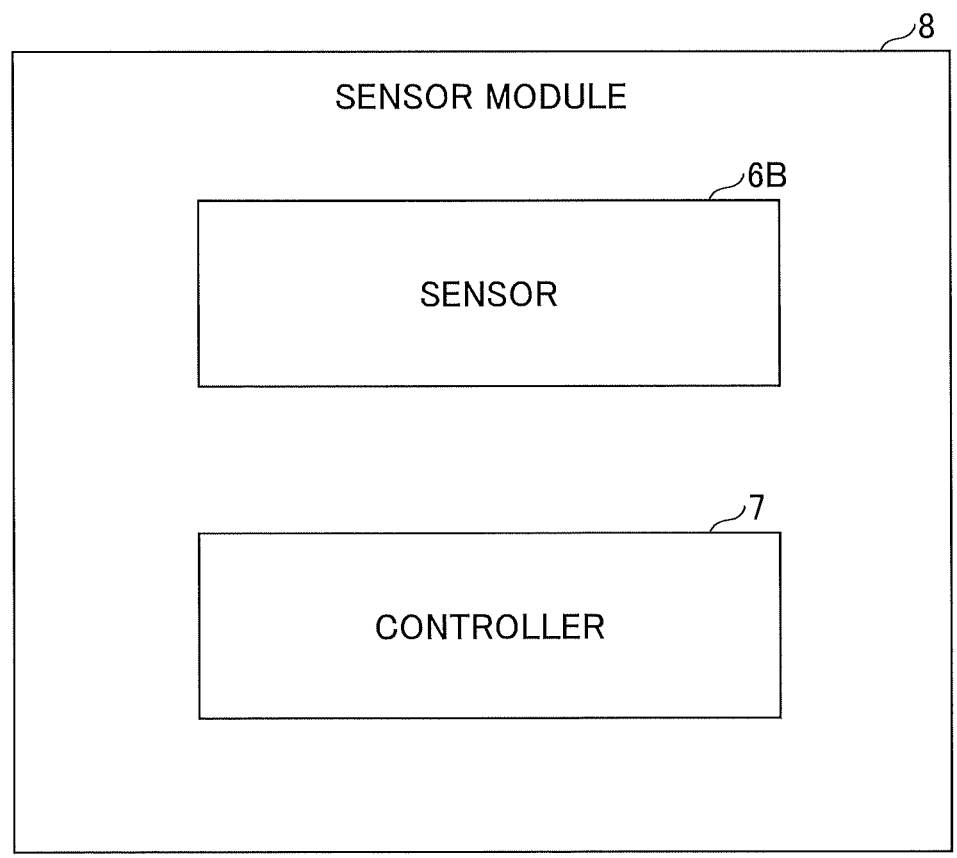
FIG. 20 is a block diagram illustrating an example of a sensor module according to the fifth embodiment.

As illustrated in FIG. 20, a sensor module 8 can be implemented by the sensor 6B and a controller 7. In the sensor module 8, the sensor 6B is attached to an object to be measured, and a state of the measured object can be detected by the controller 7. Multiple sensors 6B may be attached to the object to be measured.

In the sensor module 8, the terminal sections 41B and 42B of the sensor 6B are each connected to the controller 7, by using, for example, a flexible substrate, a lead wire, or the like.

Based on information obtained through given terminal sections 41B and 42B, coordinates of a given location at which the sensor 6B is pressed, or a multitude of a pressing force can be detected. For example, each resistive portion 31B of the sensor 6B can be used to perform detection with respect to an X-coordinate, and each resistive portion 32B can be used to perform detection with respect to a Y-coordinate.

Figure 21:
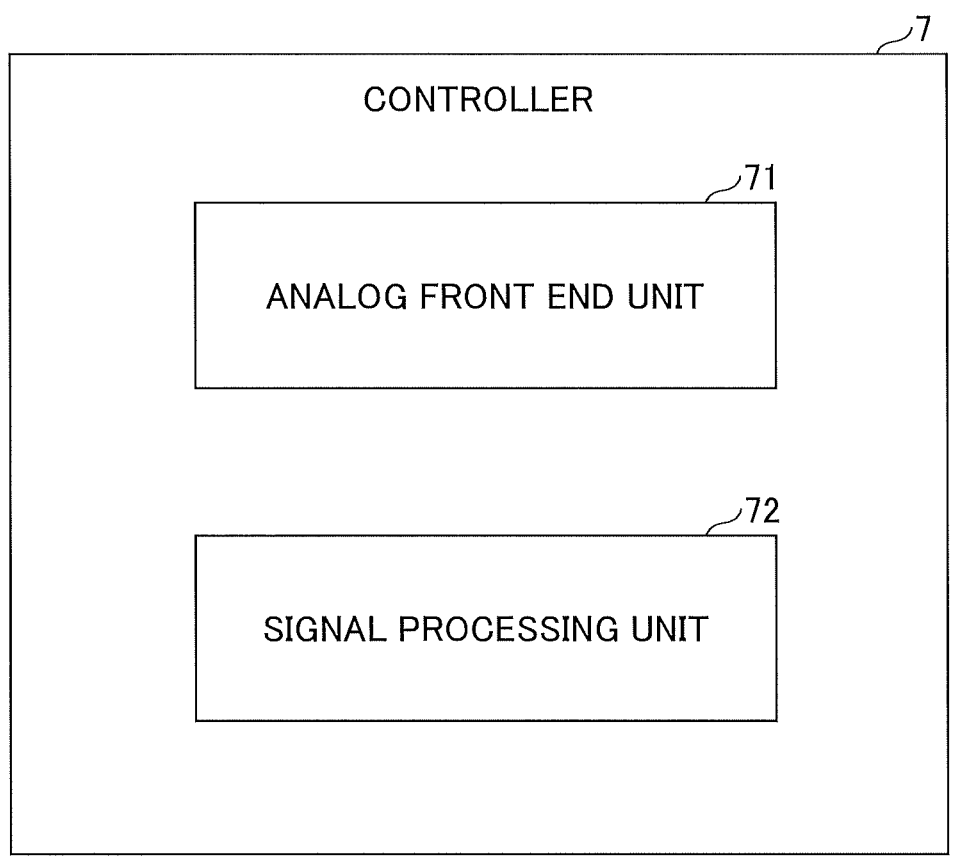
FIG. 21 is a block diagram illustrating an example of a controller of the sensor module according to the fifth embodiment.

As illustrated in FIG. 21, for example, the controller 7 can include an analog front end unit 71 and a signal processing unit 72.

The analog front end unit 71 includes, for example, an input signal selection switch, a bridge circuit, an amplifier, an analog-to-digital conversion circuit (A/D conversion circuit), and the like. The analog front end unit 71 may include a temperature compensation circuit.

In the analog front end unit 71, for example, all of the terminal sections 41 and 42 of the sensor 6B are connected to the input signal selection switch, and a pair of electrodes is selected by the input signal selection switch. A given pair of electrodes selected by the input signal selection switch is connected to the bridge circuit.

In such a case, one side of the bridge circuit is comprised of a given resistive portion between a given pair of electrodes selected by the input signal selection switch, and the other three sides are each comprised of fixed resistance. With such a configuration, as the output of the bridge circuit, a voltage (analog signal) corresponding to a resistance value of the resistive portion between a given pair of electrodes selected by the input signal selection switch can be obtained. Note that the input signal selection switch is configured to be able to be controlled by the signal processing unit 72.

An output voltage of the bridge circuit is amplified by the amplifier and then is converted to a digital signal by the A/D conversion circuit. The digital signal is transmitted to the signal processing unit 72. When the analog front end unit 71 includes a temperature compensation circuit, a digital signal for which temperature compensation is performed is transmitted to the signal processing unit 72. By performing switching through the input signal selection switch at high speed, digital signals corresponding to resistance values associated with all of the terminal sections 41B and 42B of the sensor 6B can be transmitted to the signal processing unit 72 in an extremely short amount of time.

Based on information transmitted from the analog front end unit 71, the signal processing unit 72 can identify one or more coordinates of locations at which the sensor 6B is pressed, as well as detecting the magnitude of a given press force.

When resistance values for multiple resistive portions 31B or resistance values for multiple resistive portions 32B are varied, it can be detected that the sensor 6B is pressed at corresponding multiple locations.

Note that when the magnitude of the pressing force is decreased, or the like, there are cases where only one or more resistive portions that are closer to the pressed side and that are among the resistive portions 31B and the resistive portions 32B are pressed while any resistive portion that is far from the pressed side is not pressed. In this case, only a resistance value between a pair of electrodes associated with each of the resistive portions that is closer to the pressed side, continuously varies in accordance with the magnitude of the pressing force. In such a case, the signal processing unit 72 can detect the magnitude of the press force based on the magnitude of variations in a given resistance value of the resistive portion that is closer to the pressed side.

In other words, at least one resistive portion among a given resistive portion 31B and a given resistive portion 32B is pressed, and a resistance value between a pair of electrodes associated with the at least one resistive portion (resistive portion 31B and/or resistive portion 32B) constantly varies in accordance with the magnitude of the pressing force. Regardless of whether either one of the resistive portion 31B and the resistive portion 32B is pressed or both are pressed, the signal processing unit 72 can detect the magnitude of the pressing force based on the magnitude of variations in a given resistance value of the resistive portion that is closer to the pressed side.

The signal processing unit 72 can include, for example, a central processing unit (CPU), a read only memory (ROM), a random access memory (RAM), a main memory, and the like.

In this case, various functions of the signal processing unit 72 can be implemented by executing a program stored in the ROM or the like, where the program is read out to a main memory and is executed by the CPU. However, a portion or all of the signal processing unit 72 may be implemented by hardware only. The signal processing unit 72 may be also configured physically by a plurality of devices or the like.

As described above, in the fifth embodiment, the sensor 6B with juxtaposed multiple resistive portions 31B of which the longitudinal direction of each is directed to a first direction and juxtaposed multiple resistive portions 32B of which the longitudinal direction of each is directed to a second direction intersecting with the first direction is used.

As described above, when the resistive portions 31B and 32B are pressed, the pressed resistive portions 31B and 32B are deflected in accordance with a pressing force, and thus a resistance value between a given pair of electrodes associated with the pressed resistive portions 31B and 32B varies continuously in accordance with the magnitude of the pressing force. That is, with use of the sensor 6B, 3D information (coordinates of the pressed location and the magnitude of the pressing force) can be obtained. In such a manner, information about the entire object to be measured is obtained, and thus a position of the measured object where the state of the object is varied can be identified in detail. Accordingly, the state of the measured object can be detected accurately.

In particular, when the resistive portions 31B and 32B are each formed of a Cr composite film, sensitivity of a resistance value with respect to a force (a change amount of the resistance value for each of the resistive portions 31B and 32B with respect to the same pressing force) is significantly improved in comparison to a case where the resistive portions 31B and 32B are each formed of Cu—Ni or Ni—Cr. When the resistive portions 31B and 32B are each formed of the Cr composite film, sensitivity of the resistance value with respect to the force is about 5 to 10 times greater than that in a case where the resistive portions 31B and 32B are each formed of Cu—Ni or Ni—Cr. For this reason, by forming each of the resistive portions 31B and 32B of a Cr composite film, detection accuracy of coordinates of the pressed location can be improved, and the pressing force can be detected with high sensitivity.

When sensibility of the resistance value with respect to a given pressing force is increased, a control can be implemented such that, a predetermined operation is performed when it is detected that the pressing force is at weak level, another operation is performed when it is detected that the pressing force is at middle level, and still another operation is performed when it is detected that the pressing force is at strong level. Alternatively, a control can be implemented such that, no operation is performed when it is detected that the pressing force is at weak or middle level, and a predetermined operation is performed only when it is detected that the pressing force is at strong level.

When sensibility of the resistance value with respect to a given pressing force is increased, a signal with increased S/N can be obtained. Thus, signal detection can be performed accurately even when the number of times the A/D conversion circuit of the analog front end unit 71 performs averaging is reduced. By reducing the number of times the A/D conversion circuit performs averaging, a time required for one A/D conversion can be decreased, so that the input signal selection switch can perform switching at a higher speed. As a result, a fast movement transferred to the tactile sensor 5 can also be detected.

When each resistor 30B is formed of a Cr composite film, the size of the sensor 6B can be reduced. Thus, flexibility in a choice of installation locations can be improved.

First Modification of the Fifth Embodiment

The first modification of the fifth embodiment provides an example in which the resistive portions of the sensor body are each disposed in a zigzag pattern. Note that in the first modification of the fifth embodiment, the description for the same components as those in the embodiments described previously may be omitted.

Figure 22:
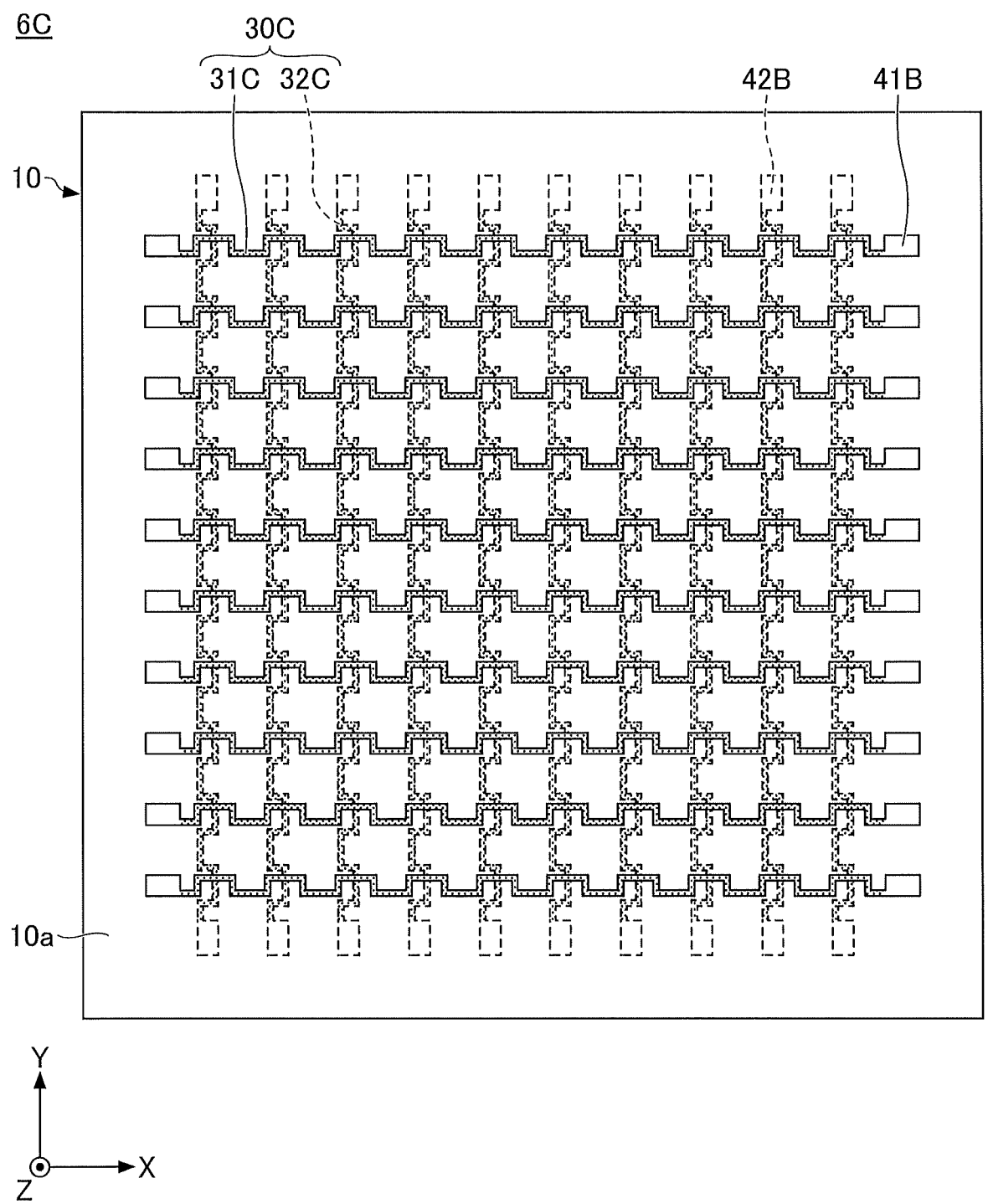
FIG. 22 is a plan view of an example of a sensor according to first modification of the fifth embodiment.

FIG. 22 is a plan view illustrating an example of the sensor according to the first modification of the fifth embodiment, and illustrates the plane corresponding to FIG. 18. Referring to FIG. 22, a sensor 6C differs from the sensor 6B (see FIGS. 18 and 19) in that a resistor 30C is used instead of the resistor 30B.

The resistor 30C includes resistive portions 31C and 32C. Each resistive portion 31C is disposed in a zigzag pattern formed between a pair of given terminal sections 41B. Each resistive portion 31C is also disposed in a zigzag pattern formed between a pair of given terminal sections 42B. For example, the material and thickness for each of the resistive portions 31C and 32C can be the same as the material and thickness for each of the resistive portions 31B and 32B.

In such a configuration, when the resistive portions 31C and 32C are each disposed in a zigzag pattern, a resistance value between a given pair of terminal sections 41B and a resistance value between a given pair of terminal sections 42B can be increased in comparison to a case where their resistive portions are each disposed in a linear pattern. As a result, when pressed, a change amount of the resistance value between a given pair of terminal sections 41B, and a change amount of the resistance value between a given pair of terminal sections 42B, are increased. Thus, detection accuracy of coordinates of the pressed location can be improved, and a given force can be detected with higher sensitivity.

A resistance value between the pair of the terminal sections 41B, as well as a resistance value between the pair of the terminal sections 42B, can be increased, thereby allowing reductions in power consumption for the sensor 6C.

Sixth Embodiment

In a sixth embodiment, an application example in which a Cr composite film is used as a material of the resistor 30 in the strain gauge according to the first embodiment is shown. Note that in the sixth embodiment, the description of the same components as those in the embodiments described previously may be omitted.

For the strain gauge 1 according to the first embodiment, when a Cr composite film is used as the material of the resistor 30, higher sensitivity (500% or more the sensitivity of conventional strain gauges) and a smaller size (1/10 or less the size of conventional strain gauges) can be set. In the following description, the strain gauge 1 using a Cr composite film is referred to as a strain gauge 3, for the sake of convenience.

For example, the output of the conventional strain gauge is about 0.04 mV/2 V, while the output of the strain gauge 3 can be 0.3 mV/2 V or more. Also, the size (gauge length×gauge width) of the conventional strain gauge is about 3 mm×3 mm, while the size (gauge length×gauge width) of the strain gauge 3 can be reduced to be about 0.3 mm×0.3 mm.

In general, strain gauges are used when attached to flexure elements (metal or the like). Conventional strain gauges have low sensitivity, and thus design choices of material of a given flexure element are constrained in order to ensure sensor characteristics.

In contrast, the strain gauge 3 has higher sensitivity than that of the conventional strain gauges, design constraints, such as when the conventional strain gauges are used, are mitigated greatly, and thus flexibility in the material choice of a given flexure element can be improved.

Further, a smaller size of the strain gauge 3 is set in comparison to the conventional strain gauges, and thus installation at a location that could not hitherto be used for fine measurement becomes possible.

The strain gauge 3 is a film-type flexible gauge. In this regard, small-sized strain gauges 3, as well as strain gauges in various sizes, can be manufactured and supplied.

The strain gauge 3 is lightweight and can be attached at a desired measurement location. Thus, advantageously, desired locations can be directly measured in comparison to a case of using a micro electro mechanical systems (MEMS) sensor or the like that requires an electronic board to be mounted when similar measurement is performed.

The strain gauge 3 is very small and mass of the strain gauge 3 is negligible, and thus the strain gauge 3 is not influenced by inertia. Accordingly, the strain gauge 3 is excellent in sensitivity, stability, and fatigue life.

The strain gauge 3 can also be self-temperature compensated. In this case, any measured object with a different coefficient of thermal expansion can be used regardless of whether the object is metal or plastic.

The strain gauge 3 is highly sensitive and can detect small displacement. Thus, the strain gauge 3 can also be used for a measured object having great stiffness.

With the characteristics described above, the strain gauge 3 can be applied in various manners. Specific examples of the application of the strain gauge 3 will be described below.

Example of First Application

Air resistance on an automobile is invisible and unstable, and the air resistance is difficult to be measured. In such a manner, it is difficult to understand a downforce created on an automobile body, an air diagram of a lift force, and the like. In light of the point described above, in the example of the first application, the strain gauge 3 is used to detect wind pressure or the like applied to a driving automobile.

Figure 23:
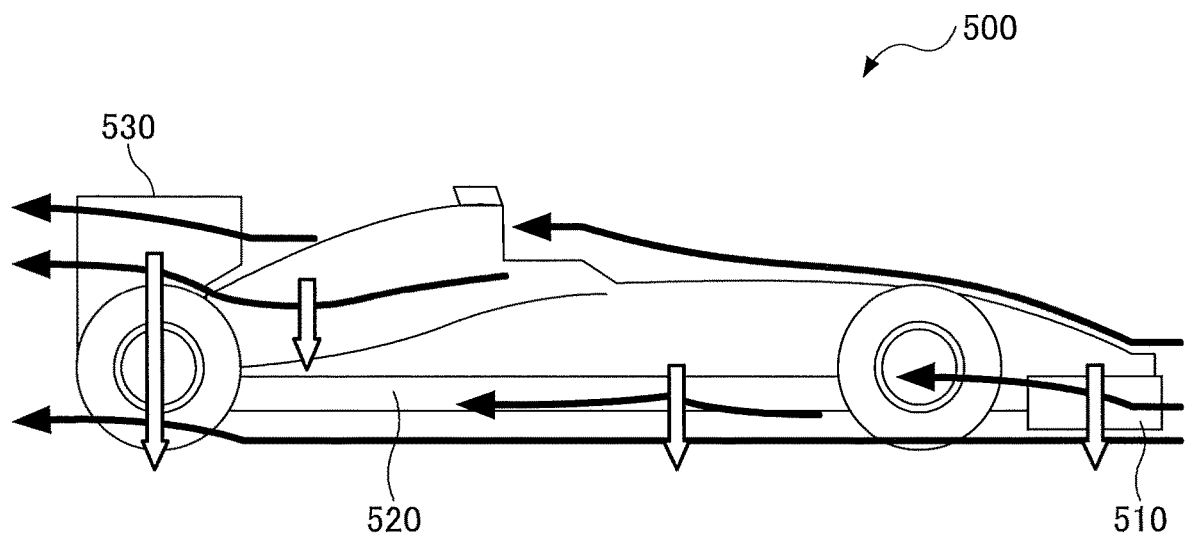
FIG. 23 is a schematic diagram illustrating an example of an air flow when an automobile is driving.

FIG. 23 is a schematic diagram illustrating an example of an air flow when the automobile is traveling. When an automobile 500 is traveling, an air flow occurs as illustrated by the arrows in FIG. 23, for example. When such an air flow causes a higher driving speed of the automobile 500, a lift force acts on an automobile body and thus the automobile body attempts to float, which may result in unstable driving.

In light of the situation described above, the automobile 500 includes a front spoiler 510, side spoilers 520, and a rear spoiler (rear wing) 530. With the automobile 500 including the front spoiler 510, the side spoilers 520, and the rear spoiler 530, downforces act in the directions represented by the arrows, and even if the speed is increased, the lift force acting against the automobile body is reduced. Thus, floating of the automobile body is reduced, thereby allowing for stable driving.

Figure 24:
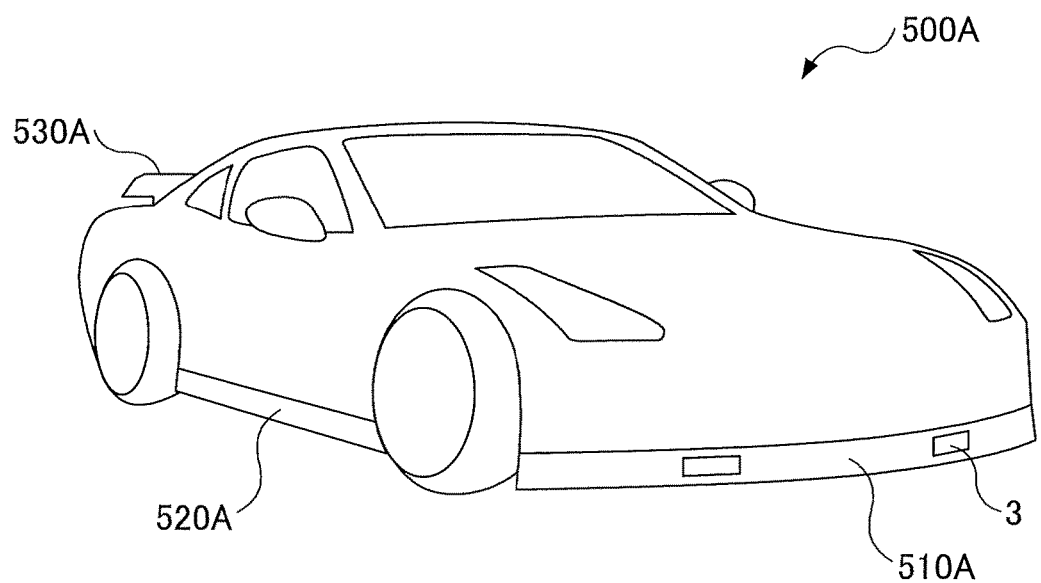
FIG. 24 is a perspective view of an example of an automobile spoiler to which a strain gauge 3 is attached.

FIG. 24 is a perspective view of an example of a given automotive spoiler to which the strain gauge 3 is attached. An automobile 500A illustrated in FIG. 24 includes a front spoiler 510A, side spoilers 520A, and a rear spoiler (rear wing) 530A. The strain gauge 3 is attached to at least one among the front spoiler 510A, the side spoilers 520A, and the rear spoiler (rear wing) 530A.

For example, the strain gauge 3 may be attached to a surface of at least one spoiler among the front spoiler 510A, the side spoilers 520A, and the rear spoiler (rear wing) 530A, or may be embedded in the at least one spoiler. Alternatively, an air intake is disposed at at least one spoiler among the front spoiler 510A, the side spoilers 520A, and the rear spoiler (rear wing) 530A, and the strain gauge 3 may be attached at a location where a flow of drawn air is concentrated, or may be embedded at the location.

As described above, by attaching the strain gauge 3 to a given spoiler, wind pressure of a given surface of the spoiler can be sensed to detect a lift force and downforce applied to the automobile body.

Further, by displaying a detected value on a center information display (CID), an E-cockpit display, a head-up display, or the like, downforces against the automobile body can be visualized, and air diagrams can be quantified.

While the spoilers are lightweight and are formed of resin in many cases, a lightweight, flexible strain gauge 3 that is formed on a flexible substrate is easily attached, and further, such a strain gauge 3 can detect air pressure with high sensitivity.

When a given spoiler is configured to be movable by a motor or the like, the spoiler can be moved based on wind pressure detected by the strain gauge 3 to thereby optimize the lift force or downforce to act against the automobile body. Accordingly, driving can be achieved more stably.

As described above, the strain gauge 3 is highly sensitive and thus can easily detect the wind pressure applied to a given spoiler. Also, by displaying a detected result on a given display, an air flow such as a downforce can be visualized. Additionally, by providing feedback for a detected result by the strain gauge 3 to a variable spoiler, a lift force and downforce acting against the automobile body are actively adjusted, thereby allowing for more stable driving. Further, by changing from a detected result to a corresponding effect level of fuel consumption that is caused by air resistance, information on fuel consumption can be visualized. Note that the strain gauge 3 may be used in an electric automobile, a hybrid automobile, or the like, as well as an engine-driven automobile.

Note that one or more strain gauges 3 may be used. Alternatively, instead of a given strain gauge 3, the strain gauge 1A, 2, 2A, or 2B, or the sensor 6A, 6B, or 6C, in which a Cr composite film is used as material of a given resistor, may be used.

Example of Second Application

Automobile accelerators are formed of materials (material that is hard to bend) having great stiffness. Sensors using conventional strain gauges could not accurately perform sensing as auxiliary sensors for a pressing force. In other words, the conventional strain gauges are of low sensitivity and thus only members formed of materials that are easily bent could be objects to be measured. Alternatively, in a case where a member formed of material that is easily bent could be the object to be measured, a given strain gauge is attached to such a measured object, via a flexure element formed of a material (material that is easy to bend) having less stiffness. In view of the point described above, in the example of the second application, an example in which the strain gauge 3 is used to detect a force to press an accelerator is illustrated.

Note that examples of the material having great stiffness (material that is hard to bend) include an aluminum alloy (duralumin), titanium, and the like. Examples of the material having less stiffness (material that is easy to bend) include aluminum, and the like.

Figure 25:
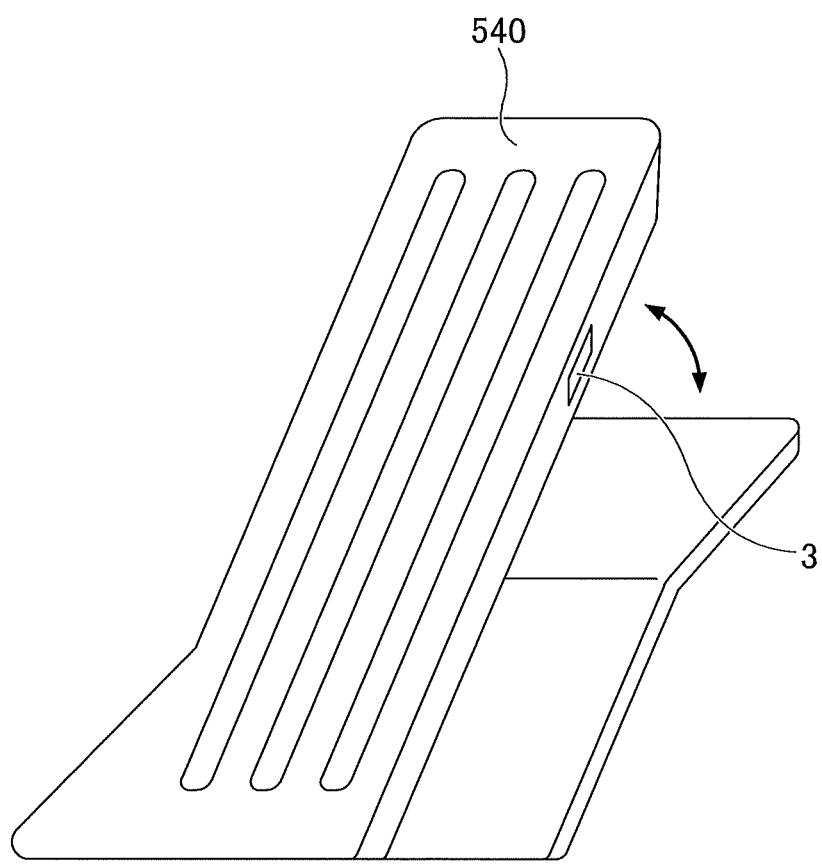
FIG. 25 is a perspective view of an example of an automobile accelerator to which the strain gauge 3 is attached.

FIG. 25 is a perspective view of an example of the automobile accelerator to which the strain gauge 3 is attached. In FIG. 25, the strain gauge 3 is attached to a side surface of an automobile accelerator 540. However, the strain gauge 3 may be attached to the back or the like of the accelerator 540. Alternatively, the strain gauge 3 may be embedded in the accelerator 540.

By attaching the strain gauge 3 to the accelerator 540, the force to press the accelerator 540 can be detected. With use of the strain gauge 3 having great stiffness, even if the accelerator 540 is formed of a material (material that is hard to bend) having great stiffness, sensing can be performed with high sensitivity, and thus the pressing force can be detected more accurately.

As described above, the strain gauge 3 is highly sensitive, and even if the accelerator 540 is formed of a material (material that is hard to bend) having great stiffness, the pressing force can be detected with high accuracy. Thus, improvement in a speed control and fuel consumption of automobiles can be expected.

Note that one or more strain gauges 3 may be used. Alternatively, instead of a given strain gauge 3, the strain gauge 1A, 2, 2A, or 2B, or the sensor 6A, 6B, or 6C, in which a Cr composite film is used as material of a given resistor, may be used.

Example of Third Application

For example, a gripping force applied to an automobile steering wheel can be detected by dedicated sensors that are disposed at the steering wheel. For example, the dedicated sensors are respectively disposed at symmetrical two locations where gripping is likely to be performed, and grip forces to be applied at the disposed locations can be detected. Each dedicated sensor can be disposed, for example, between a core and an outer sheath of the steering wheel. However, in such arrangement, a problem in steering wheel design may arise negatively affecting some luxury automobiles. In view of the point described above, in the example of the third application, an example in which the strain gauge 3 is used to detect a force to grip the steering wheel is illustrated.

Figure 26A:
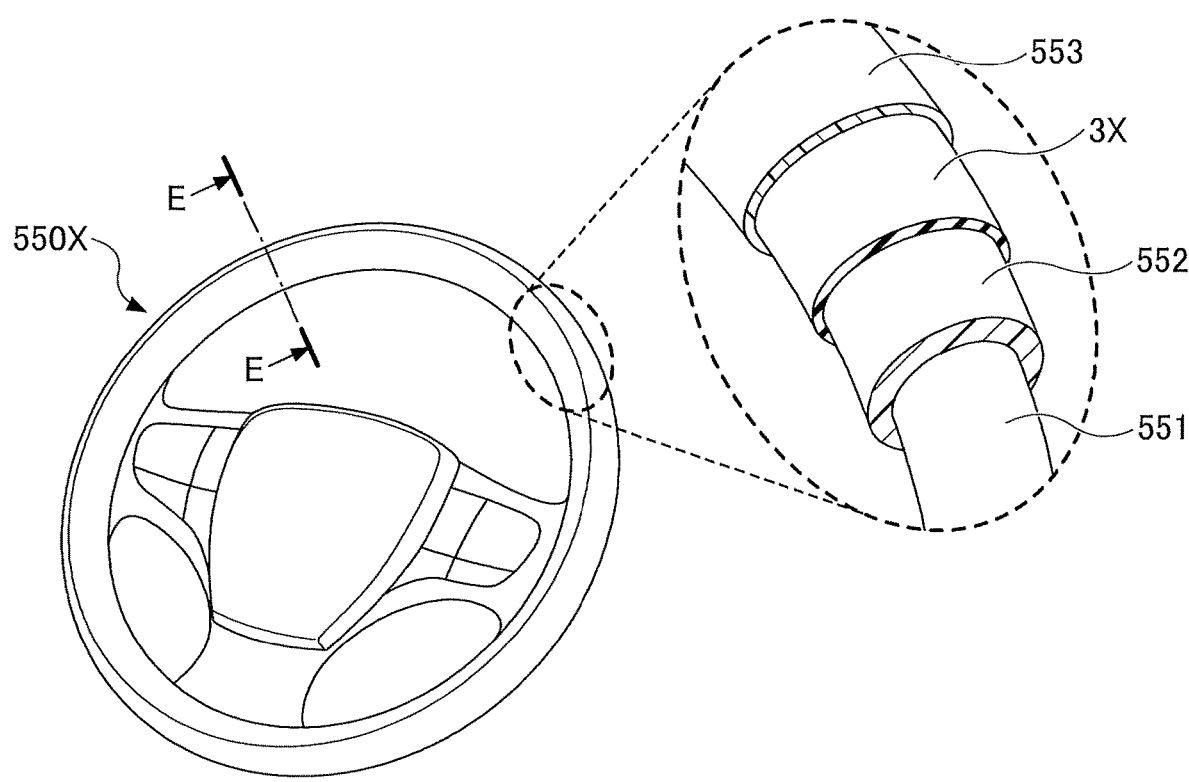
FIG. 26A is a perspective view (first part) of a comparative example of an automobile steering wheel to which a dedicated sensor is attached.
Figure 26B:
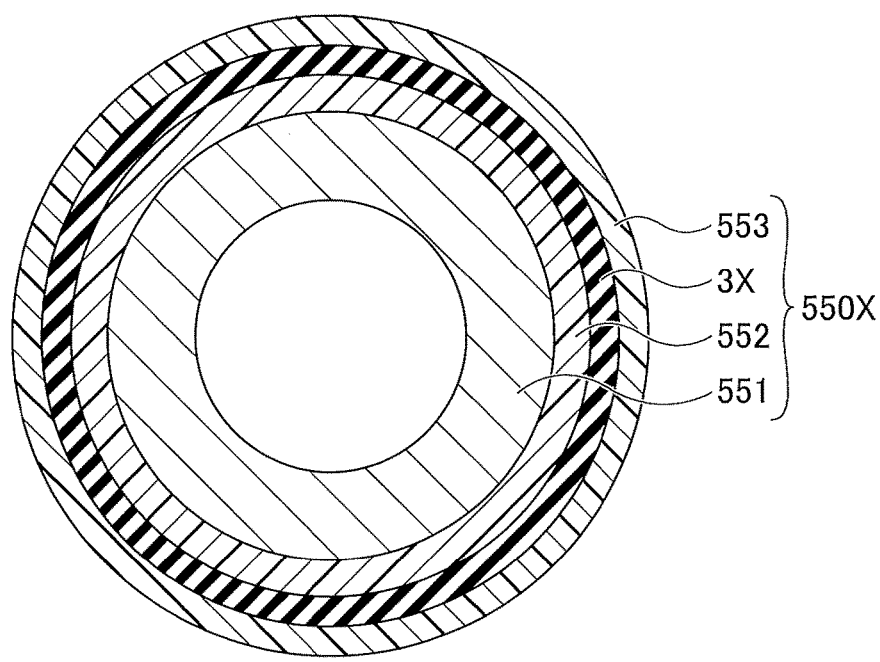
FIG. 26B is a perspective view (second part) of the comparative example of the automobile steering wheel to which the dedicated sensor is attached.

FIGS. 26A and 26B are perspective views of a comparative example of the automobile steering wheel to which the dedicated sensors are attached. FIG. 26A is a perspective view of the steering wheel, as well as illustrating an enlarged internal structure of the steering wheel. FIG. 26B is a cross-sectional view taken along the E-E line in FIG. 26A.

In the comparative example illustrated in FIGS. 26A and 26B, a steering wheel 550X has a structure in which each dedicated sensor 3X to detect a gripping force is disposed to be attached to the outer periphery of a resin portion 553 such as urethane, where the outer periphery of a core 551 formed of a material (for example, metal) with great stiffness is coated with the resin portion 553, and the outer periphery of the dedicated sensor 3X is coated with an outer sheath 553 formed of leather or the like. The respective dedicated sensors 3X are arranged at symmetrical two locations of the annular steering wheel 550X where gripping is likely to be performed.

Each dedicated sensor 3X is less sensitive than the strain gauge 3, and if the dedicated sensor 3X is attached inside the core 551 formed of metal or the like that is hard to deform, it is difficult to perform sensing. For this reason, in the steering wheel 550X, each dedicated sensor 3X is attached to the outer periphery of the resin portion 552 that is easy to deform.

Figure 27:
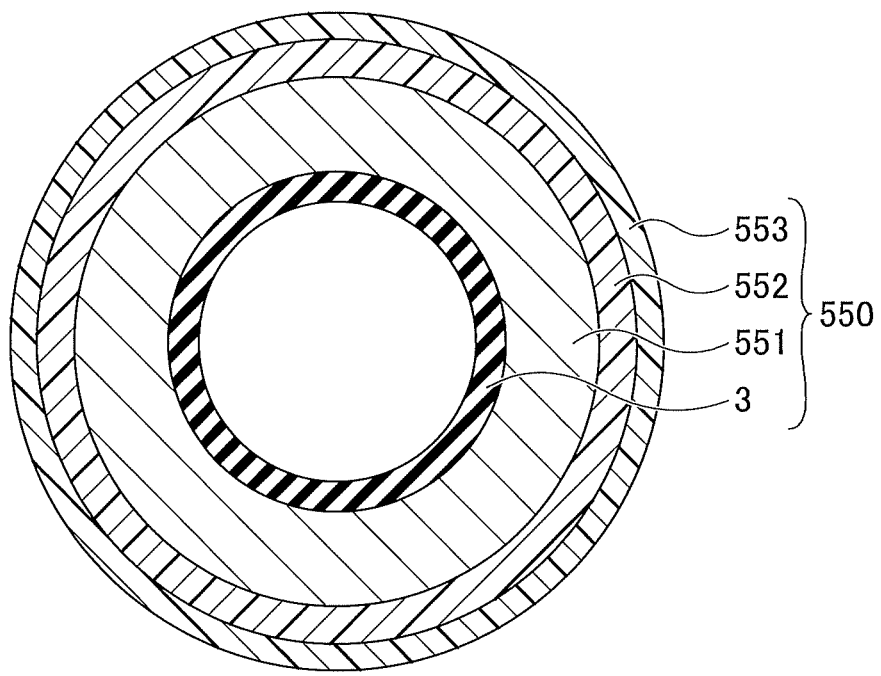
FIG. 27 is a cross-sectional view of an example of an automobile steering wheel to which the strain gauge 3 is attached.

In contrast, the strain gauge 3 is highly sensitive, and even if the strain gauge 3 is attached inside the core 551, as illustrated in the cross-sectional view of the steering wheel 550 in FIG. 27, a gripping force can be sensed. In other words, the strain gauge 3 is highly sensitive and thus can detect even a slight gripping force. In such a manner, even if the strain gauge 3 is attached inside the core 551, the gripping force can be sensed. Note that FIG. 27 illustrates the cross section corresponding to FIG. 26A and FIG. 26B.

Figure 28:
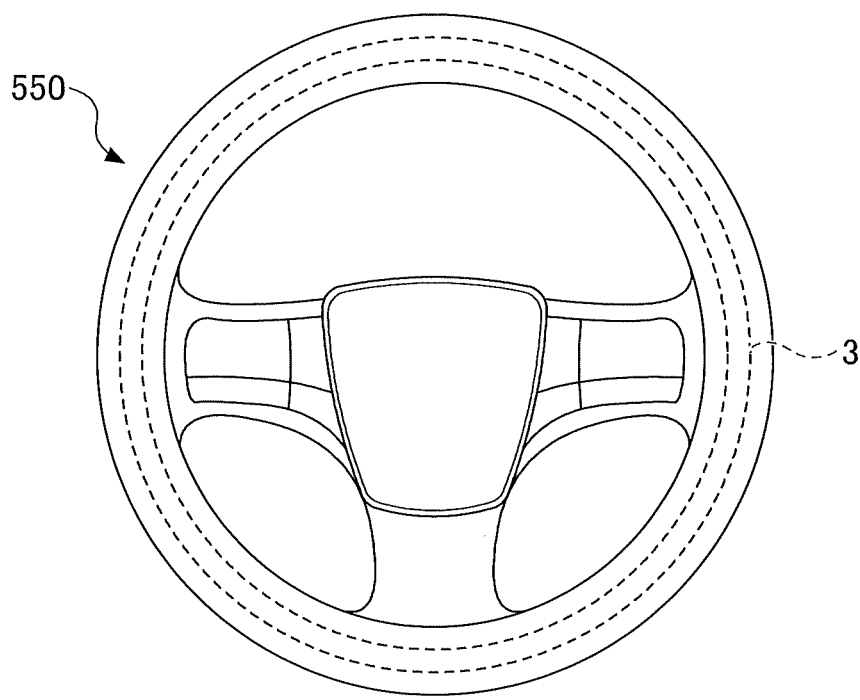
FIG. 28 is a plan view of an example of the automobile steering wheel to which the strain gauge 3 is attached.
Figure 29A:
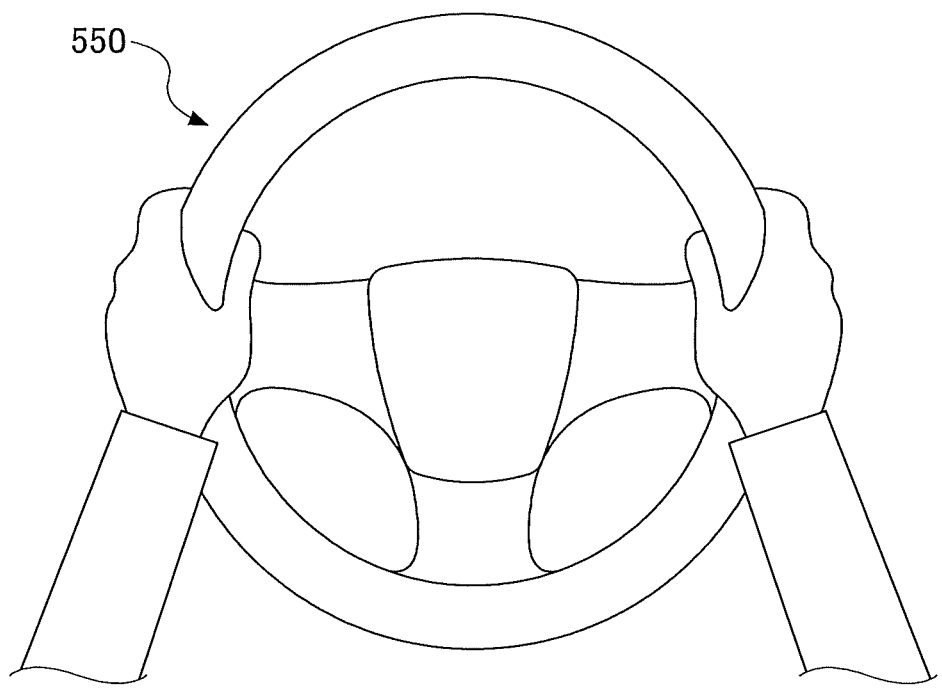
FIG. 29A is a schematic diagram (first part) for describing detection of a force to grip the automobile steering wheel.
Figure 29B:
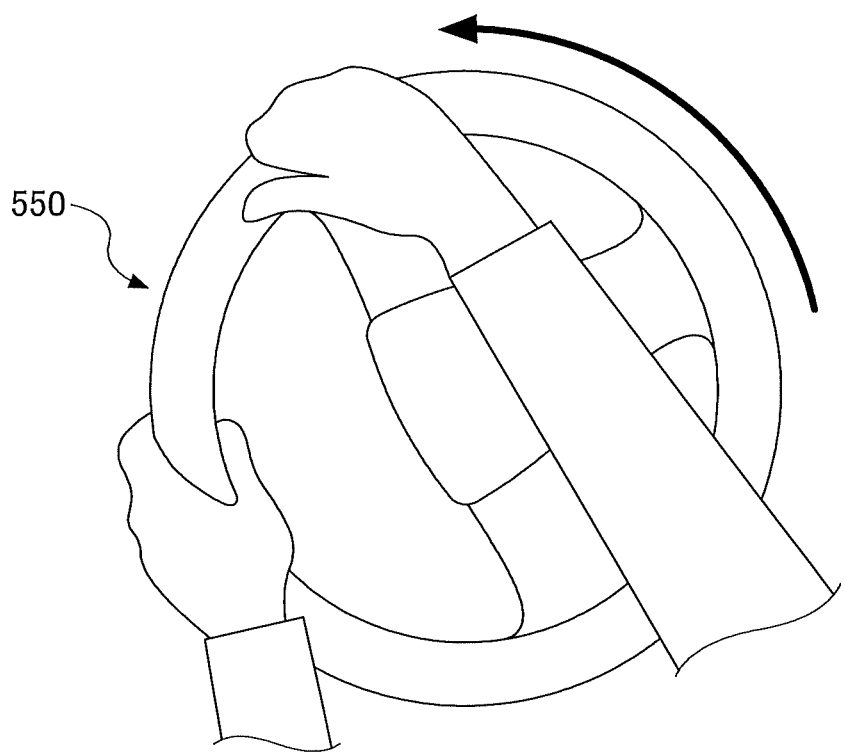
FIG. 29B is a schematic diagram (second part) for describing the detection of the force to grip the automobile steering wheel.
Figure 29C:
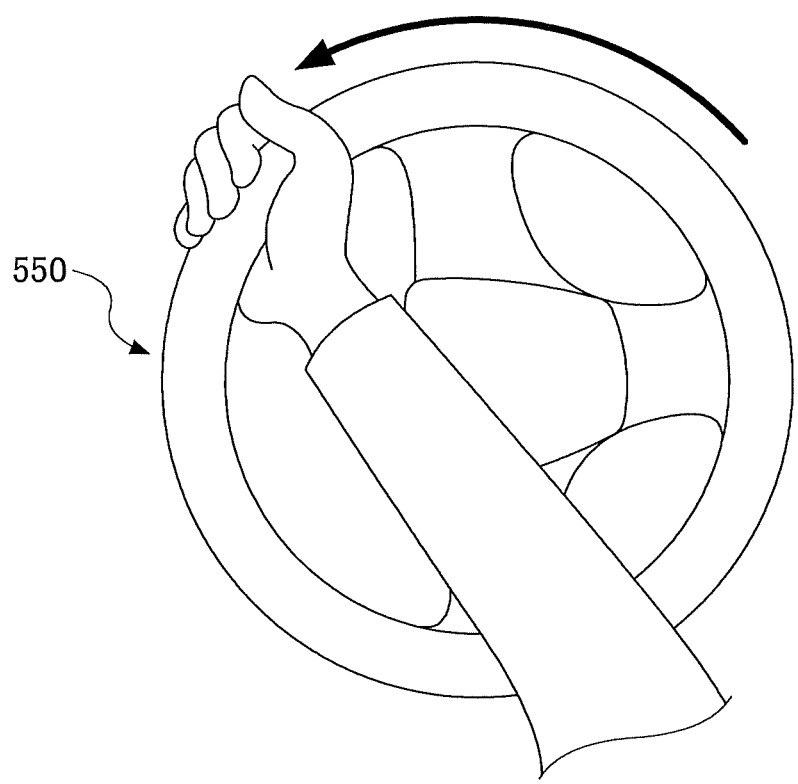
FIG. 29C is a schematic diagram (third part) for describing the detection of the force to grip the automobile steering wheel.

Also, as illustrated in FIG. 28, when the strain gauge 3 is disposed around the entirety of the circumference on the steering wheel 550, a gripping force can be detected in all directions. In this case, a given gripping force can be detected not only during normal driving as illustrated in FIG. 29A, but also in a case of gripping the steering wheel 550 at various positions, such as when the steering wheel is turned as illustrated in FIG. 29B and FIG. 29C. However, the strain gauge 3 is not necessarily required to be disposed around the entirety of the circumference on the steering wheel 550, and may be disposed in at least a portion of the steering wheel 550.

As described above, the strain gauge 3 is highly sensitive, and even if the strain gauge 3 is attached inside the core 551 with great stiffness, a given gripping force can be detected. Also, when the strain gauge 3 is attached inside the core 551, designs of the steering wheel 550 are not influenced. Accordingly, the appearance of the steering wheel 550 is improved.

Further, when the strain gauge 3 with high sensitivity is disposed around the entirety of the circumference on the steering wheel 550, a given gripping force can be detected even if the steering wheel is operated in association with turning, such as a right turn, a left turn, or rounding of a curve.

Note that one or more strain gauges 3 may be used. Alternatively, instead of a given strain gauge 3, the strain gauge 1A, 2, 2A, or 2B, or the sensor 6A, 6B, or 6C, in which a Cr composite film is used as material of a given resistor, may be used.

Example of Fourth Application

Automotive door knobs (door handles) are used as keyholes into which keys to lock doors are inserted, or levers employed during opening or closing of doors. However, for some luxury automobiles, negative images of body designs might be instilled, and thus it is considered to remove the doorknobs. The doorknobs are not flat and consequently are likely to be damaged disadvantageously. In view of the point described above, in the example of the fourth application, an example of a door without using any doorknob is illustrated, where the strain gauge 3 is used to unlock a locked door.

Figure 30:
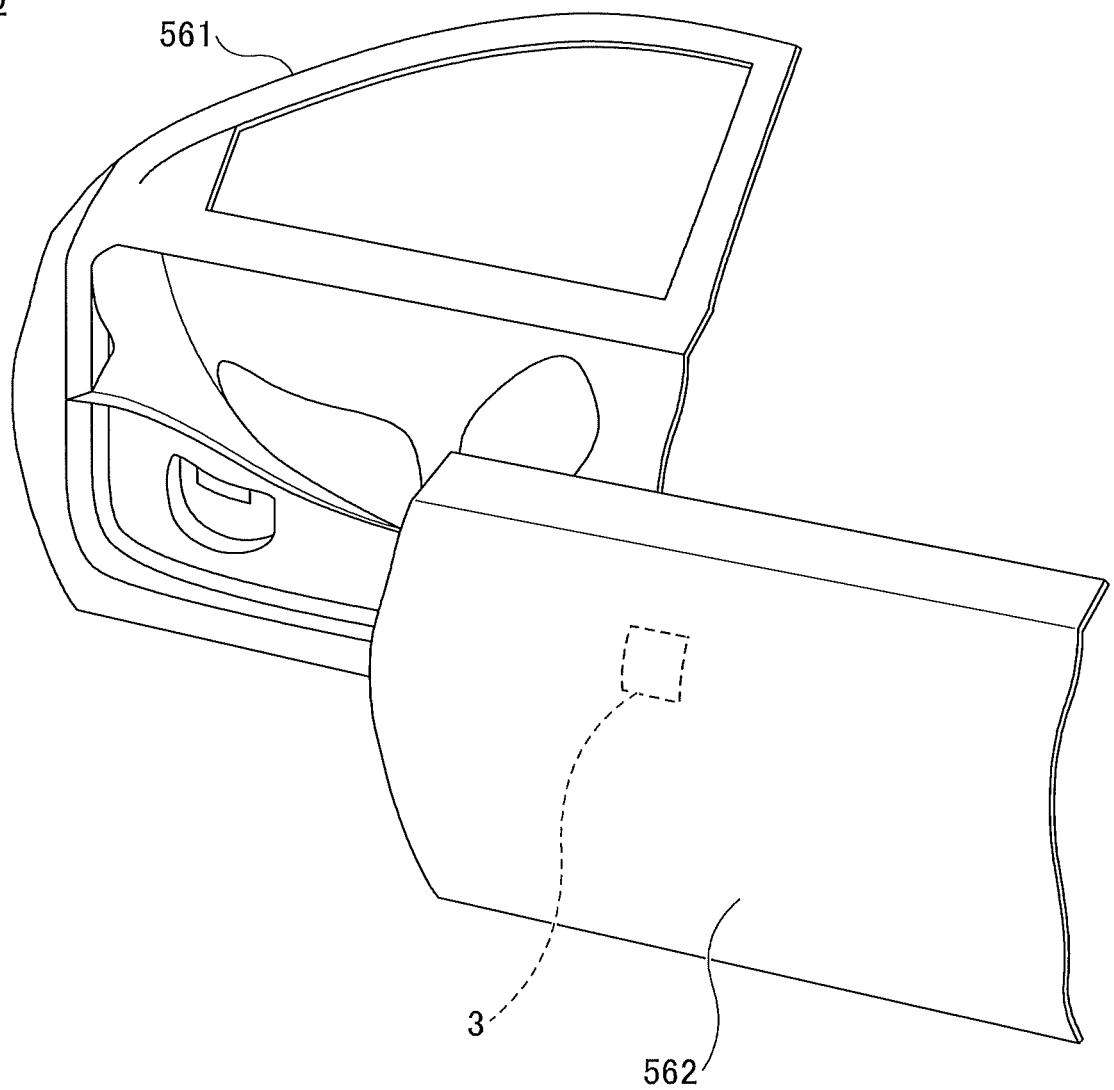
FIG. 30 is a perspective view of an example of an automobile door to which the strain gauge 3 is attached.
Figure 31:
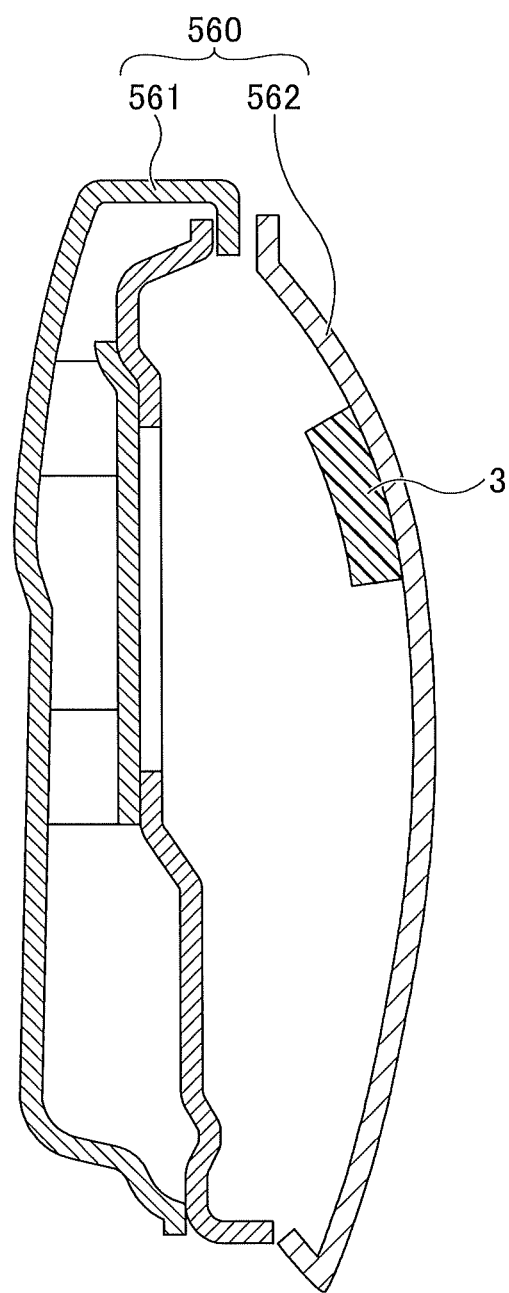
FIG. 31 is a cross-sectional view of an example of the automobile door to which the strain gauge 3 is attached.

FIG. 30 is a perspective view of an example of the automobile door to which the strain gauge 3 is attached. FIG. 31 is a cross-sectional view of an example of the automobile door to which the strain gauge 3 is attached. A door 560 illustrated in FIGS. 30 and 31 includes an inner panel 561 and an outer panel 562, without including any doorknob. The strain gauge 3 is attached at a predetermined location inside the outer panel 562. Alternatively, the strain gauge 3 may be embedded in the outer panel 562.

By disposing the strain gauge 3 at the predetermined location of the door 560 on the outer panel 562 side, the predetermined location can be detected to be pressed, thereby allowing for unlocking of a locked door. For example, when a structure that opens or closes the door through power of a motor or the like is used, and the predetermined location at which the strain gauge 3 is attached is detected to be pressed, the locked door can be unlocked through power of the motor or the like, thereby enabling the door to be open.

By disposing the strain gauge 3 at the predetermined position of the door 560 on the outer panel 562 side, sensing can be performed inside the outer panel 562, and thus designs of the automobile body are not negatively affected. Also, the strain gauge 3 is highly sensitive, thereby allowing for reliable detection of unlocking of a given locked door.

For example, when strain gauges 3 on the outer panel 562 side are disposed at multiple positions, and then are pressed in a predetermined specific order, a configuration that unlocks a locked door, as well as opening or closing of the door, may be used. In such a configuration, erroneous detection can be avoided and only a specific person can unlock a given locked door, as well as opening or closing of the door. Accordingly, authentication for a door lock can be also implemented.

Alternatively, the sensor 6B (see FIG. 18 and FIG. 19) on the outer panel 562 side is disposed at a predetermined location, and the sensor 6B may detect that a predetermined specific input pattern is traced with a figure or the like. In this case as well, erroneous detection can be avoided, and only a specific person can unlock a locked door, as well as opening or closing of the door. Accordingly, authentication for the door lock can be implemented.

As described above, with use of the strain gauge 3, any door knob is not used when the door is opened or closed, and flexibility in the body design is improved. Thus, designing forms of bodies targeted for some luxury automobiles can be provided. Further, a new opening and closing system that marks less of scratching during opening of closing of a door can be proposed.

Note that one or more strain gauges 3 may be used. Alternatively, instead of a given strain gauge 3, the strain gauge 1A, 2, 2A, or 2B, or the sensor 6A, 6B, or 6C, in which a Cr composite film is used as material of a given resistor, may be used.

Example of Fifth Application

Electronic stability control (ESC) to detect an unstable state of an attitude of a vehicle, such as automobile oversteer or understeer, relates to an active safety system that controls "turning" in association with automobile basic performance. In the ESC, for example, tilt sensors are used. Specifically, "pendulum type" tilt sensors each of which detects deviation from a weight suspended in a gravity direction, relative to a tilted object, or "float type" tilt sensors each of which detects deviation from a liquid level, relative to the tilted object, are used. MEMS-type acceleration sensors, gyroscopes (angular velocity sensors), or the like are also used. However, problems in accuracy of the tilt sensors may arise, and further, the acceleration sensors, gyros (angular velocity sensors), or the like may require high costs, thereby causing problems in increased costs. In view of the point described above, in the example of the fifth application, an example in which strain gauges 3 are used to detect an attitude of the automobile is illustrated.

Figure 32:
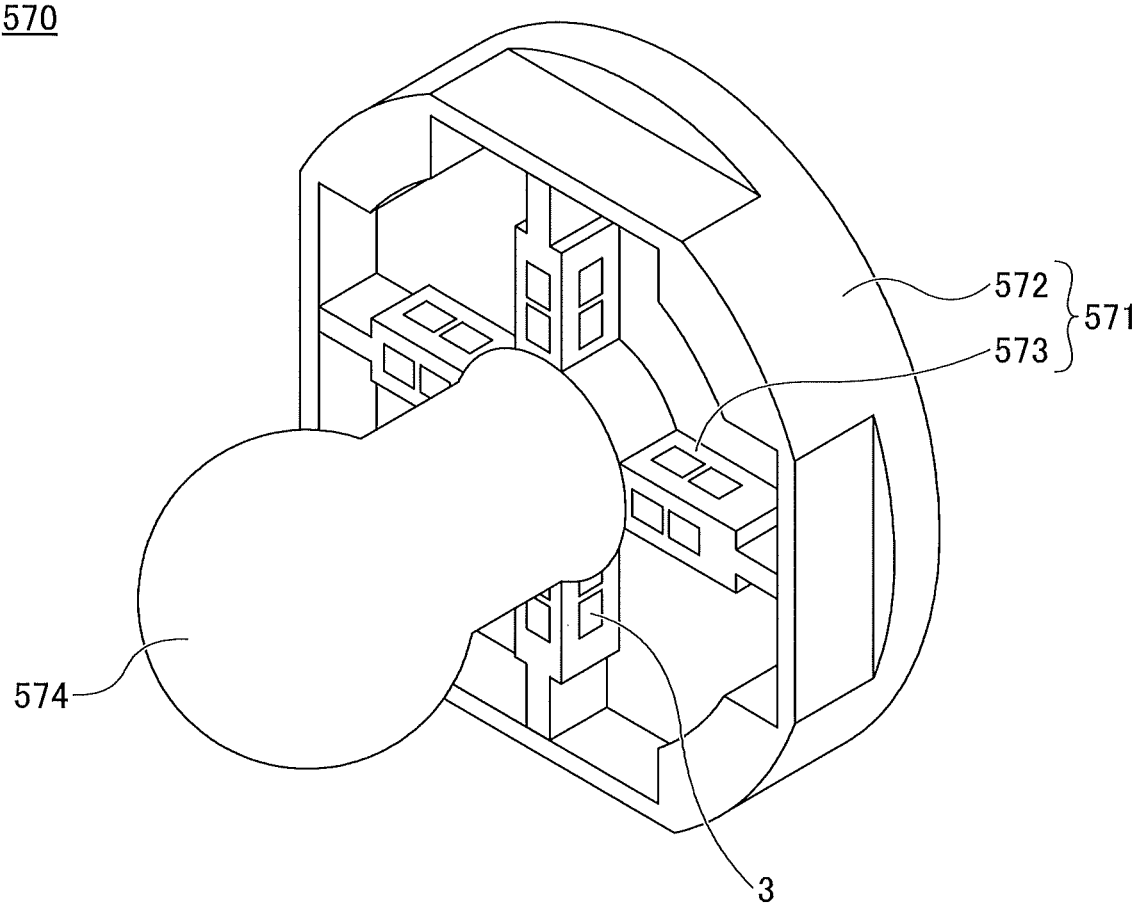
FIG. 32 is a perspective view of an example of a six-axis force sensor with strain gauges 3.

FIG. 32 is a perspective view of an example of a 6-axis force sensor with the strain gauges 3. A 6-axis force sensor 570 illustrated in FIG. 32 includes a flexure element 571 with an outer frame 572 and four beams 573, a weight 574, and multiple strain gauges 3.

The four beams 573 are each rectangular prisms and are arranged to form a cross on an inner wall side of the outer frame 572. Two strain gauges 3 are arranged side by side, on a given surface among surfaces of each of the beams 573, and the number of strain gauges 3 is 32 in total. However, shapes of the outer frame 572 and the beams 573 of the flexure element 571, as well as the number of strain gauges 3, are examples, and are not limited to the examples described above.

In the 6-axial force sensor 570, a sensitive section is formed at an intersection of the four beams 573 that are arranged to form the cross, and the weight 574 is secured at the sensitive section. In such a manner, for the 6-axis force sensor 570, a translational force and a couple in each of 3-axis directions are detected with one sensor.

Figure 33:
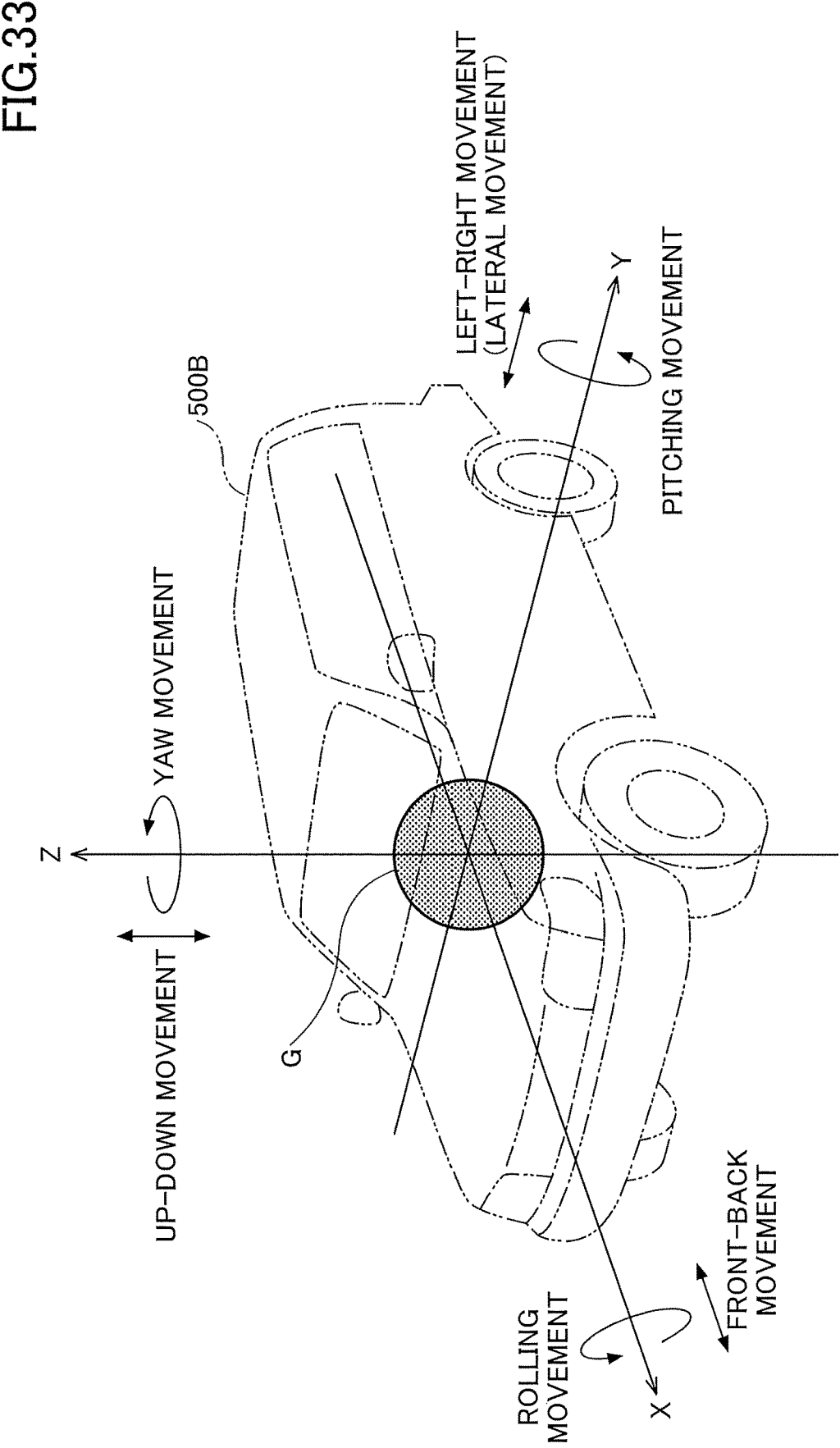
FIG. 33 is a perspective view for describing a location at which the six-axis force sensor is disposed.

For example, the 6-axis force sensor 570 can be disposed proximal to the center of gravity G of an automobile 500B illustrated in FIG. 33. In such a manner, the weight 574 of the 6-axis force sensor 570 is tilted in accordance with the attitude of the automobile 500B, and thereby a vertical movement, lateral movement, forward movement, yawing movement, pitching movement, and rolling movement of the automobile 500B can be detected. Accordingly, an attitude control of the automobile body can be performed.

As described above, when the 6-axis force sensor 570 with the strain gauges 3 is used as a sensor for the attitude control of a given automobile body, the ESC can be simply implemented, and thus an inexpensive and safe ESC system can be implemented. Moreover, with use of one or more highly sensitive strain gauges 3, slight deviation through the attitude caused by oversteer, understeer, or the like can be also detected. Thus, an inexpensive and safe ESC system can be implemented easily.

The attitude control in the example of the fifth application may be used in conjunction with the control for the variable spoiler in the example of the first application. For example, when a given variable spoiler is controlled in order to stabilize the attitude of the automobile body that is detected by the 6-axis force sensor 570, an accident in which a strong wind overturns the automobile 500B can be avoided.

Note that one or more strain gauges 3 may be used. Alternatively, instead of a given strain gauge 3, the strain gauge 1A, 2, 2A, or 2B, or the sensor 6A, 6B, or 6C, in which a Cr composite film is used as material of a given resistor, may be used.

Example of Sixth Application

In the example of the sixth application, an example in which strain gauges 3 and the like are used to detect an operating state of windshield wipers is illustrated.

Figure 34:
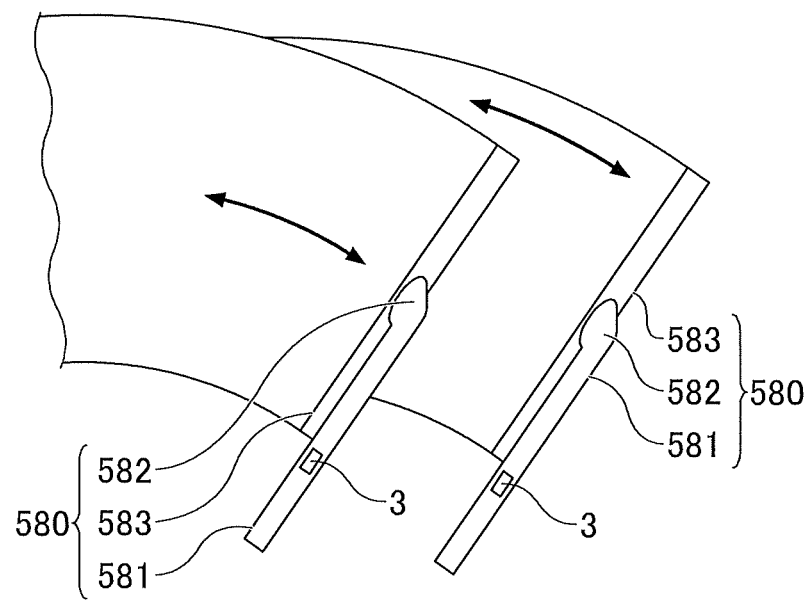
FIG. 34 is a schematic diagram illustrating an example of automobile wipers to which respective strain gauges 3 are attached.

FIG. 34 is a schematic diagram illustrating an example of automobile wipers to which the respective strain gauges 3 are attached. In FIG. 34, the numerals 580 represent two wipers. Each wiper 580 includes a wiper arm 581, a wiper blade 582, and a wiper rubber portion 583.

Each strain gauge 3 is attached to the surface of the wiper arm 581 of a given wiper 580. Alternatively, each strain gauge 3 may be embedded in the wiper arm 581 of a given wiper 580.

By attaching each strain gauge 3 to the wiper arm 581 of a given wiper 580, a sliding state and an uneven wiping state of the wiper 580 can be detected.

An operating speed of the wiper arm 581 of each wiper 580 can be also varied based on a detected result by a given strain gauge 3. Alternatively, for each wiper 580, a structure that can vary an angle at which a portion being the wiper rubber portion 583 is set is used, and further, the angle at which the portion being the wiper rubber portion 583 is set is varied based on a detected result by a given strain gauge 3. Thus, a sliding state and an uneven wiping state of the wiper 580 can be also improved. Further, abrasion of a portion of the wiper rubber portion 583 of each wiper 580 can be detected based on a detected result by a given strain gauge 3.

Figure 35:
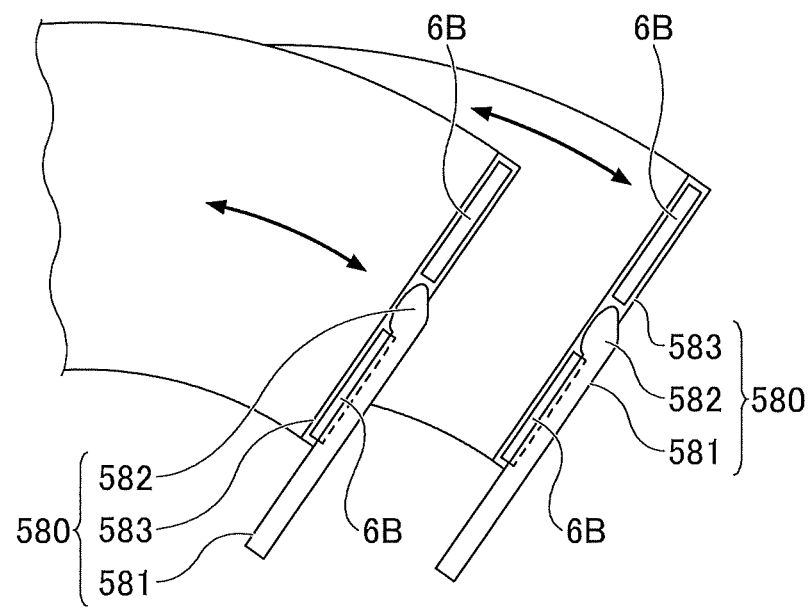
FIG. 35 is a schematic diagram illustrating an example of the automobile wipers to which respective sensors 6B are attached.

As illustrated in FIG. 35, the sensor 6B may be also attached to a substantially entire bottom (surface opposite the surface to contact a glass surface) of the wiper rubber portion 583 of each wiper 580.

When uneven wiping by the wiper rubber portion 583 of each wiper 580 is detected using a given sensor 6B, feedback for a mounting angle of each of the wiper arm 581 and the wiper blade 582 is provided. Thus, a glass surface and the wiper rubber portion 583 can be uniformly in contact with each other so as to avoid separation or the like from the wiper rubber portion 583.

Specifically, pressure applied to each wiper blade 582 is detected by a given sensor 6B that is attached to a back of the wiper rubber portion 583, and thereby feedback is provided to operate a given wiper arm 581 in order to optimize a mounting angle of the wiper arm 581 in accordance with pressure distribution. Accordingly, uneven wiping through each wiper 580 can be reduced.

The automotive wipers remove rain water or debris that adheres to a windshield. However, when operating, the wipers do not move smoothly and consequently friction against a glass occurs, which might result in occurrence of "chattering." Under a condition in which the "chattering" occurs, the wipers cannot serve as intended roles, and consequently rain water caused by uneven wiping remains on the windshield, as well as forming stripes on the windshield. In worse cases, visibility becomes bad, which might cause a driving problem. Especially in a case of driving at night, sight is instantaneously obstructed due to a great difference in light and dark between a proximal location to a street light and a distant location from the street light, which might cause a great risk.

When the strain gauge 3, the sensor 6B, or the like is attached to a given wiper 580, even if a given wiper rubber portion 583 deteriorates due to temperature, ultraviolet light, or the like, or a given wiper arm 581 is bent, a given glass surface and the given wiper rubber portion 583 constantly come into uniform contact with each other. Thus, the wiper rubber portion 583 moves to the left and right without occurrence of "chattering," thereby enabling rain water, dirt, and the like adhering to the glass to be uniformly removed.

Note that one or more strain gauges 3 may be used. Alternatively, instead of a given strain gauge 3, the strain gauge 1A, 2, 2A, or 2B, or the sensor 6A, 6B, or 6C, in which a Cr composite film is used as material of a given resistor, may be used.

Example of Seventh Application

In the example of the seventh application, an example in which the strain gauge 3 is used to activate an airbag is illustrated.

Figure 36:
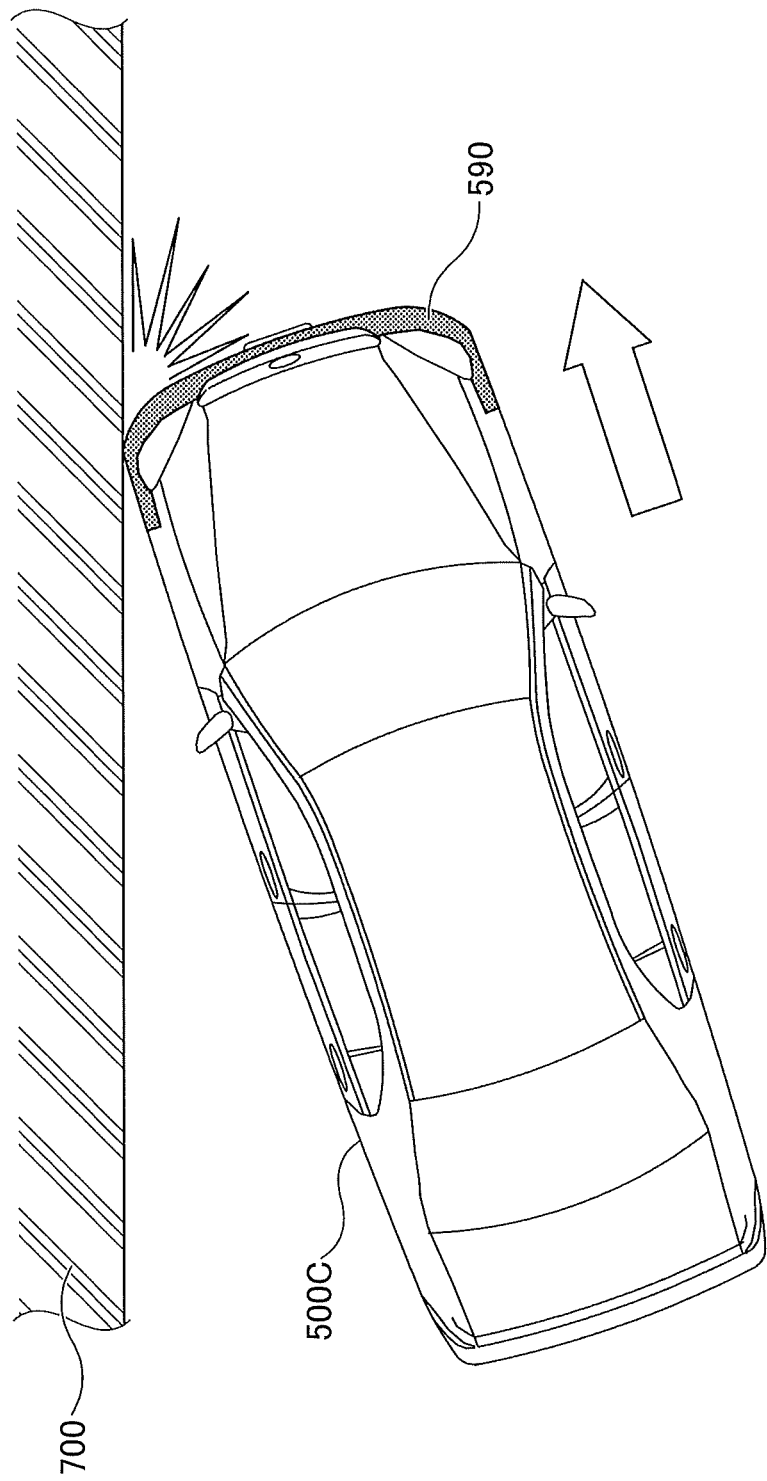
FIG. 36 is a schematic diagram illustrating an example of an automobile bumper to which the strain gauge 3 is attached.

FIG. 36 is a schematic diagram illustrating an example of an automobile bumper to which the strain gauge 3 is attached, and illustrates an example of a manner of a crashed automobile into a wall. In FIG. 36, the strain gauge 3 is attached to a bumper 590 of an automobile 500C. Alternatively, the strain gauge 3 may be embedded in the bumper 590. In FIG. 36, the left side of the bumper 590 of the automobile 500C hits a wall 700.

By attaching the strain gauge 3 to the bumper 590, an impact of the automobile 500C is detected, thereby enabling the airbag to be activated. Alternatively, when the strain gauge 3 is attached to a given airbag, the strain gauge 3 can also detect whether pressure applied when the airbag is actuated is appropriate.

Figure 37:
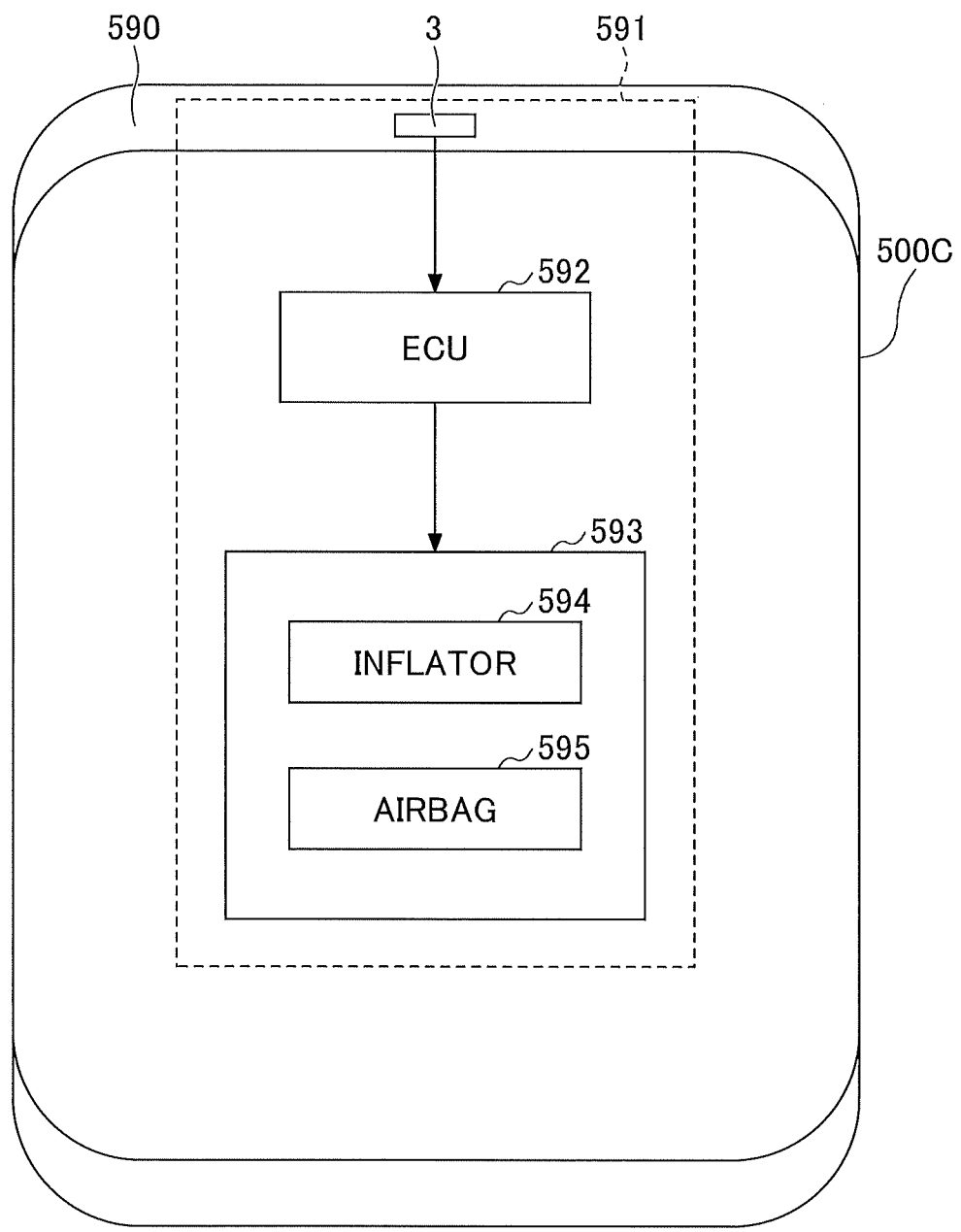
FIG. 37 is a schematic diagram illustrating an example of an airbag control system.

FIG. 37 is a schematic diagram illustrating an example of an airbag control system. As illustrated in FIG. 37, an airbag system 591 is mounted on an automobile 500G. The airbag system 591 includes a strain gauge 3, an electronic control unit (ECU) 592, and an airbag controller 593.

The airbag controller 593 includes an inflator 594 filled with an igniting agent and gas-forming agent, and an airbag 595 to be filled with gas that is formed from the gas-forming agent. The strain gauge 3 is disposed at the bumper 590, and the airbag 595 is disposed in front of a driver's seat of the automobile, on the side of the driver's seat, or the like.

The ECU 592 is electrically connected to the strain gauge 3. The ECU 592 includes an interface circuit for an on-board LAN such as a controller area network (CAN), and receives various information about the automobile, including the output of the strain gauge 3.

The ECU 592 is a control unit that operates the airbag controller 593 based on a detected result by the strain gauge 3. The ECU 592 is connected to the airbag controller 593, and transmits an instruction to expand the airbag to the inflator 594, based on the output of the strain gauge 3. In such a manner, the igniting agent in the inflator 594 is ignited to thereby expand the airbag 595.

For example, as illustrated in FIG. 36, when the left side of the bumper 590 of the automobile 500C hits the wall 700, the strain gauge 3 detects the impact of the body of the automobile 500C as changes in a resistance value of a given resistor, and then output the detected impact to the ECU 592. The ECU 592 controls the airbag controller 593 based on the output of the strain gauge 3, and the airbag 595 is thereby expanded.

Note that in the above example, although the strain gauge 3 is provided on the bumper 590 of the automobile 500C, the impact of the automobile body does not necessarily occur on the bumper. Accordingly, the strain gauge 3 can be provided at a predetermined location of the automobile body where the impact is assumed to occur. For example, the predetermined location may be set with respect to a door, a rear bumper, a spoiler, or other portions.

Further, the ECU 592 may have a function of controlling the open or close of a given door, which is used in the system for opening or closing a door, as described in the example of the fourth application, or may have a function of controlling a given wiper, as described in the example of the sixth application.

Note that one or more strain gauges 3 may be used. Alternatively, instead of a given strain gauge 3, the strain gauge 1A, 2, 2A, or 2B, or the sensor 6A, 6B, or 6C, in which a Cr composite film is used as material of a given resistor, may be used.

Example of Eighth Application

In the example of the eighth application, an example in which the strain gauge 3 is used to detect a malfunction of an engine or a supercharger is illustrated.

Figure 38:
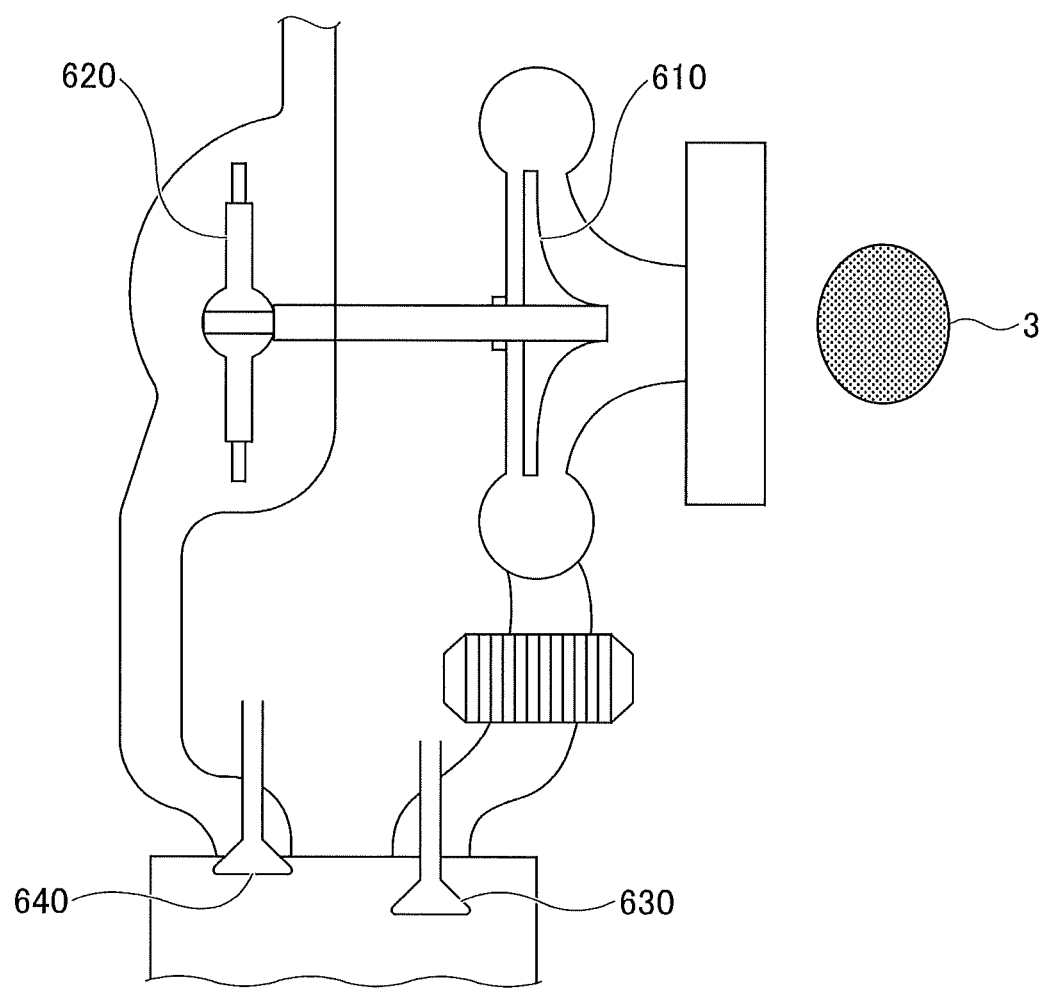
FIG. 38 is a schematic diagram illustrating an example of the strain gauge 3 disposed proximal to an automobile engine and supercharger.

FIG. 38 is a schematic diagram illustrating an example of the strain gauge 3 arranged proximal to an automobile engine and supercharger. In FIG. 38, the numeral 610 represents the supercharger, the numeral 620 represents an exhaust turbine, the numeral 630 represents an intake valve, and the numeral 640 represents an exhaust valve. The strain gauge 3 is disposed proximal to the supercharger 610.

By disposing the strain gauge 3 proximal to a given engine, or a given supercharger such as a turbocharger or supercharger, malfunctions of the engine or the supercharger can be detected based on changes in pressure, for example. An engine speed can be decreased based on a detected result by the strain gauge 3, or the engine can be stopped based on the detected result by the strain gauge 3.

When temperature of the engine becomes high, a highly heat-resistant material such as ceramic (for example, alumina, zirconia, or a sapphire) is preferably used as the substrate 10 of the strain gauge 3, instead of resin.

Note that one or more strain gauges 3 may be used. Alternatively, instead of a given strain gauge 3, the strain gauge 1A, 2, 2A, or 2B, or the sensor 6A, 6B, or 6C, in which a Cr composite film is used as material of a given resistor, may be used.

The preferred embodiments and the like have been described above in detail, but are not limited thereto. Various modifications and alternatives to the above embodiments and the like can be made without departing from a scope set forth in the claims.

This International application claims priority to Japanese Patent Application No. 2018-199285, filed Oct. 23, 2018, the contents of which are incorporated herein by reference in their entirety.

REFERENCE SIGNS LIST

1, 1A, 2, 2A, 2B, 3 strain gauge, 5 sensor module, 6A, 6B, 6C sensor, 7 controller, 10 substrate, 10a upper surface, 20 functional layer, 30, 30B, 30C resistor, 31B, 31C, 32B, 32C resistive portion, 41, 41B, 42B terminal section, 40A, 40B, 40C electrode, 42, 43, 44, 44A, 45, 45A metallic layer, 50 insulating layer, 60 cover layer, 70 individual sensor, 71 analog front end unit, 72 signal processing unit, 110 flexure element, 120 adhesive layer, 500, 500A, 500B, 500C automobile, 510, 510A front spoiler, 520, 520A side spoiler, 530, 530A rear spoiler, 540 accelerator, 550 steering wheel, 551 core, 552 resin portion, 553 outer sheath, 560 door, 561 inner panel, 562 outer panel, 570 six-axial force sensor, 571 flexure element, 572 outer frame, 573 beam, 574 weight, 580 wiper, 581 wiper arm, 582 wiper blade, 583 wiper rubber portion, 590 bumper, 591 airbag system, 592 ECU, 593 airbag controller, 594 inflator, 595 airbag, 610 supercharger, 620 exhaust turbine, 630 intake valve, 640 exhaust valve, wall 700

The invention claimed is:

1. An automotive accelerator comprising:
a sensor configured to detect a force to press the accelerator,
wherein the sensor includes:
a flexible substrate; and
a functional layer formed of metal, an alloy, or a metal compound, the functional layer being provided directly on one surface of the substrate;
a resistor formed of a film containing Cr, CrN, and $Cr_2N$, the resistor being provided directly on one surface of the functional layer,
wherein a main component of the resistor is α-Cr,
wherein the functional layer includes a function of promoting crystal growth of the α-Cr and depositing a film of which a main component is α-Cr, and
wherein the sensor is configured to detect the force to press the accelerator as a change in a resistance value of the resistor.

2. The accelerator according to claim 1, wherein the sensor is provided on a side surface of the accelerator.

3. The accelerator according to claim 1, wherein the accelerator is formed of a material having great stiffness.

4. The accelerator according to claim 1, wherein the resistor includes:
multiple first resistive portions of which a longitudinal direction of each is directed to a first direction and that are juxtaposed on one side of the substrate; and
multiple second resistive portions of which a longitudinal direction of each is directed to a second direction intersecting with the first direction and that are juxtaposed on another side of the substrate.

5. An automotive steering wheel comprising:
a sensor configured to detect a force to grip the steering wheel,
wherein the sensor includes:
a flexible substrate; and
a functional layer formed of metal, an alloy, or a metal compound, the functional layer being provided directly on one surface of the substrate;
a resistor formed of a film containing Cr, CrN, and $Cr_2N$, the resistor being provided directly on one surface of the functional layer,
wherein a main component of the resistor is α-Cr,
wherein the functional layer includes a function of promoting crystal growth of the α-Cr and depositing a film of which a main component is α-Cr, and
wherein the sensor is configured to detect the force to grip the steering wheel as a change in a resistance value of the resistor.

6. The steering wheel according to claim 5, further comprising a core formed of a material having great stiffness; and
a resin portion with which the outer periphery of the core is coated,
wherein the sensor is provided inside the core.

7. The steering wheel according to claim 6, wherein the sensor is provided around an entirety of a circumference inside the core.

8. The steering wheel according to claim 5, wherein the resistor includes:
multiple first resistive portions of which a longitudinal direction of each is directed to a first direction and that are juxtaposed on one side of the substrate; and
multiple second resistive portions of which a longitudinal direction of each is directed to a second direction intersecting with the first direction and that are juxtaposed on another side of the substrate.

9. An automotive door comprising:
an inner panel;
an outer panel; and
at least one sensor provided at a predetermined location inside the outer panel, the sensor being configured to detect a force to press the outer panel at the predetermined location,
wherein the sensor includes:
  a flexible substrate;
  a functional layer formed of metal, an alloy, or a metal compound, the functional layer being provided directly on one surface of the substrate; and
  a resistor formed of a film containing Cr, CrN, and $Cr_2N$, the resistor being provided directly on one surface of the functional layer,
wherein a main component of the resistor is $\alpha$-Cr,
wherein the functional layer includes a function of promoting crystal growth of the $\alpha$-Cr and depositing a film of which a main component is $\alpha$-Cr, and
wherein the sensor is configured to detect the force to press the outer panel as a change in a resistance value of the resistor.

10. The door according to claim 9, wherein multiple sensors are provided at locations inside the outer panel.

11. The door according to claim 9, wherein the resistor includes:
  multiple first resistive portions of which a longitudinal direction of each is directed to a first direction and that are juxtaposed on one side of the substrate; and
  multiple second resistive portions of which a longitudinal direction of each is directed to a second direction intersecting with the first direction and that are juxtaposed on another side of the substrate.

12. A system for opening and closing a door, comprising:
the door according to claim 9; and
an opening and closing mechanism configured to open or close the door based on the detecting of the force to press the outer panel.

13. A system for opening and closing a door, comprising:
the door according to claim 9; and
an opening and closing mechanism configured to unlock the door or to open or close the door, upon occurrence of a condition in which multiple sensors are pressed in a predetermined specific order.

14. A system for opening and closing a door, comprising:
the door according to claim 9; and
an opening and closing mechanism configured to unlock the door or to open or close the door, upon occurrence of a condition in which the sensor is traced in a predetermined specific input pattern.

* * * * *